(12) United States Patent
Mitsunaga

(10) Patent No.: US 8,654,221 B2
(45) Date of Patent: Feb. 18, 2014

(54) IMAGE PROCESSING DEVICE AND METHOD, AND PROGRAM

(75) Inventor: Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1105 days.

(21) Appl. No.: 12/100,187

(22) Filed: Apr. 9, 2008

(65) Prior Publication Data

US 2008/0252791 A1    Oct. 16, 2008

(30) Foreign Application Priority Data

Apr. 13, 2007  (JP) ................ P2007-105540

(51) Int. Cl.
*H04N 5/202* (2006.01)

(52) U.S. Cl.
USPC ........................................ 348/254; 382/274

(58) Field of Classification Search
USPC .......... 348/241, 254, 255, 256; 382/168, 169, 382/274
See application file for complete search history.

(56) References Cited

U.S. PATENT DOCUMENTS

| | | | | |
|---|---|---|---|---|
| 4,825,297 | A * | 4/1989 | Fuchsberger et al. ......... | 358/447 |
| 6,766,064 | B1 * | 7/2004 | Langan et al. ................ | 382/274 |
| 6,915,024 | B1 * | 7/2005 | Maurer ......................... | 382/274 |
| 7,042,522 | B2 * | 5/2006 | Kim .............................. | 348/671 |
| 7,194,142 | B2 * | 3/2007 | Maurer ......................... | 382/258 |
| 7,319,787 | B2 * | 1/2008 | Trifonov et al. .............. | 382/168 |
| 7,483,081 | B2 * | 1/2009 | Wu ................................ | 348/625 |
| 7,684,640 | B2 * | 3/2010 | Zhao et al. .................... | 382/274 |
| 8,023,733 | B2 * | 9/2011 | Monobe et al. ............... | 382/168 |
| 2007/0053607 | A1 * | 3/2007 | Mitsunaga .................... | 382/274 |
| 2007/0109447 | A1 * | 5/2007 | Yamashita et al. ........... | 348/602 |

FOREIGN PATENT DOCUMENTS

| | | |
|---|---|---|
| JP | 2003-162715 | 6/2003 |
| JP | 2004-221645 | 8/2004 |
| JP | 2007-49540 | 2/2007 |
| JP | 2007-049540 | 2/2007 |

* cited by examiner

*Primary Examiner* — Lin Ye
*Assistant Examiner* — Chriss Yoder, III
(74) *Attorney, Agent, or Firm* — Finnegan, Henderson, Farabow, Garrett & Dunner, L.L.P.

(57) ABSTRACT

An image processing device extracting a contrast component for each pixel of an input image by removing a low-frequency component of the input image and correcting the contrast component for each pixel based on a gain value, including: an input/output-property generating unit for generating an input/output-property curve, assuming an input contrast component which is the pre-correction contrast component as input, and an output contrast component which is the post-correction contrast component as output, which is an input/output-property curve of which the output contrast component monotonously increases as to the input contrast component; a gain properties generating unit for generating a gain property curve representing properties as to the input contrast component of the gain value for correcting the input contrast component to obtain the output contrast component based on the input/output-property curve; and a gain-value calculating unit for calculating the gain value for each pixel of the input image based on the gain property curve.

9 Claims, 44 Drawing Sheets

FIG. 1 —Prior Art—

—Prior Art—

--Prior Art--

--Prior Art--

IMAGE PROCESSING DEVICE AND METHOD, AND PROGRAM

CROSS REFERENCES TO RELATED APPLICATIONS

The present invention contains subject matter related to Japanese Patent Application JP 2007-105540 filed in the Japanese Patent Office on Apr. 13, 2007, the entire contents of which are incorporated herein by reference.

BACKGROUND OF THE INVENTION

1. Field of the Invention

The present invention relates to an image processing device and method, and a program, and particularly, relates to an image processing device and method, and a program which are suitable in the case of correcting the contrast of an image.

2. Description of the Related Art

Image processing for reducing gray levels of an image to compress the dynamic range thereof are called gray level compression or gray level transformation or the like, and in recent years, a variety of gray level compression or gray level transformation technology has been proposed (e.g., see Japanese Unexamined Patent Application Publication No. 2007-049540).

Now, description will be made with reference to FIGS. 1 through 3 regarding the gray level transformation processing performed with the invention described in Japanese Unexamined Patent Application Publication No. 2007-049540.

FIG. 1 is a block diagram illustrating a functional configuration example of a gray level transformation unit 11 for performing gray level transformation processing with the invention described in Japanese Unexamined Patent Application Publication No. 2007-049540. The gray level transformation unit 11 is configured of a brightness calculating unit 21, nonlinear transforming units 22L through 22B, a tone-curve calculating unit 23, tone-curve memory 24, γ_comp parameter memory 25, a reduction image generating unit 26, reduction image memory 27, an interpolation unit 28, mapping units 29-1 and 29-2, a contrast correction unit 30, gray level correction units 31R through 31B, and nonlinear inverse transforming units 32R through 32B.

With the gray level transformation unit 11, gray level compression processing for compressing the gray level of an image using a tone curve, and contrast correction processing for correcting contrast lost at the gray level compression processing are performed, wherein the gray level compression processing is performed by the tone-curve calculating unit 23, tone-curve memory 24, and mapping units 29-1 and 29-2, and the contrast correction processing is performed by the γ_comp parameter memory 25, reduction image generating unit 26, reduction image memory 27, interpolation unit 28, and contrast correction unit 30.

With the contrast correction processing, a low-frequency filter, which is realized by a combination of image reduction processing by the reduction image generating unit 26 and image correction processing by the interpolation unit 28, is employed to separate the components of a gray level-compressed image into overall brightness components made up of low-frequency components and contrast components, and subject the contrast components including not only high-frequency components but also low-or-medium-frequency components of the image to contrast correction. Thus, contrast correction, which is very natural even in appearance, can be performed without emphasizing the details of the image needlessly.

FIG. 2 is a block diagram illustrating a functional configuration example of the contrast correction unit 30. The contrast correction unit 30 is configured of a gain-value calculating unit 51 and a contrast emphasizing unit 52.

With brightness value $L_c^{(n1)}(p)$ of the gray level-compressed image input to the contrast correction unit 30, the contrast components are compressed with a tone curve. The compression level thereof depends on the inclination of the tone curve, so the more moderate the inclination slope is, the greater the compression level is. Accordingly, in order to restore the contrast of the image, it is desirable to emphasize the contrast components depending on the inverse number of the inclination of the tone curve. Note however, in such a case, there is a case wherein with around the saturation level and noise level of the brightness value, saturation in brightness is caused due to excessively strong contrast correction, and blackout or whiteout occurs on the corrected image.

Therefore, with the contrast correction unit 30, the gain-value calculating unit 51 obtains a gain value $g(p)$ based on the brightness value $L_c^{(n1)}(p)$ after gray level compression using the gain properties shown in FIG. 3, and the contrast emphasizing unit 53 performs contrast correction using the gain value $g(p)$ obtained by the gain-value calculating unit 51. Note that the horizontal axis direction of a graph shown in FIG. 3 represents the brightness value $L_c^{(n1)}(p)$ after gray level compression, and the vertical axis direction represents the gain value $g(p)$.

With the gain properties shown in FIG. 3, when the brightness value $L_c^{(n1)}(p)$ is a predetermined intermediate brightness level $L_{mid}^{(n1)}$ which is generally equivalent to the middle of a range where the brightness value $L_c^{(n1)}(p)$ can take, the gain value $g(p)$ is the maximum value, and as the brightness value $L_c^{(n1)}(p)$ approaches the minimum value $L_{min}^{(n1)}$ or the maximum value $L_{max}^{(n1)}$ of the range where the brightness value $L_c^{(n1)}(p)$ can take, the gain value $g(p)$ is attenuated linearly, and with ranges where the brightness value $L_c^{(n1)}(p)$ is below the minimum brightness level $L_{min}^{(n1)}$ and above the maximum value $L_{max}^{(n1)}$, the gain value $g(p)$ is zero. The gain value $g(p)$ at the intermediate value $L_{mid}^{(n1)}$ is determined with γ_comp parameter which is determined with a predetermined constant contrastGain and the shape of the tone curve, which is contrastGain/γ_comp−1. The gain properties can be represented with the following Expression (1) and Expression (2).

$$k(p) = \begin{cases} 1 & L_c^{(n1)}(p) > L_{max}^{(n1)} \\ \frac{L_c^{(n1)}(p) - L_{mid}^{(n1)}}{L_{max}^{(n1)} - L_{min}^{(n1)}} & L_{mid}^{(n1)} \le L_c^{(n1)}(p) \le L_{max}^{(n1)} \\ \frac{L_c^{(n1)}(p) - L_{mid}^{(n1)}}{L_{min}^{(n1)} - L_{mid}^{(n1)}} & L_{min}^{(n1)} \le L_c^{(n1)}(p) < L_{mid}^{(n1)} \\ 1 & L_c^{(n1)}(p) < L_{min}^{(n1)} \end{cases} \quad (1)$$

$$g(p) = \left(\frac{contrastGain}{\gamma_{comp}} - 1\right) \cdot (1 - k(p)) \quad (2)$$

The contrast emphasizing unit 52 employs the gain value $g(p)$ calculated by the gain-value calculating unit 51 to calculate a brightness value $L_u^{(n1)}(p)$ subjected to contrast correction using the following Expression (3).

$$\begin{aligned} L_u^{(n1)}(p) &= (g(p) + 1) \cdot (L_c^{(n1)}(p) - L_{c1}^{(n1)}(p)) + L_{c1}^{(n1)}(p) \\ &= g(p) \cdot (L_c^{(n1)}(p) - L_{c1}^{(n1)}(p)) + L_c^{(n1)}(p) \end{aligned} \quad (3)$$

Note that $L_{c1}^{(n1)}(p)$ represents the overall brightness value of the pixel at a pixel position p.

Accordingly, the contrast of the brightness component around the intermediate brightness level $L_{mid}^{(n1)}$ is emphasized as compared with the contrast of the brightness component around the minimum value $L_{min}^{(n1)}$ or maximum value $L_{max}^{(n1)}$. More strictly, the contrast of the brightness component around the intermediate brightness level $L_{mid}^{(n1)}$ is emphasized as the brightness level approaches the intermediate brightness level $L_{mid}^{(n1)}$, and most contrast of the brightness component around the minimum value $L_{min}^{(n1)}$ or maximum value $L_{max}^{(n1)}$ is not emphasized. Thus, with the contrast-corrected image, whiteout or blackout due to saturation of brightness is prevented from occurring.

Also, an image contrast correction technique is also employed for other than an application wherein the contrast of a gray level-compressed image having a wide dynamic range is corrected. For example, in the photo-retouching field, in the case of an image shot by a camera being out of focus, correction has been generally performed wherein contrast correction is performed so as to particularly emphasize high-frequency contrast components, thereby approximating the image thereof to a focused image, and most photo-retouching software which provides a photo-retouching function implements the correction function thereof.

Incidentally, this kind of processing for emphasizing the high-frequency contrast of an image is frequently realized with image processing called unsharp masking. The unsharp masking is processing wherein, with each pixel of an image, the difference is calculated between the relevant pixel value and the weighted average value of neighborhood pixel values, and the difference value thereof is multiplied by an appropriate gain value, and the result thereof is added to the relevant pixel value. Here, the weighted average value of neighborhood pixel values is equivalent to a low-frequency component of the relevant pixel, and this is subtracted from the relevant pixel value, whereby the high-frequency contrast component of the relevant pixel is extracted. Also, the gain value is a parameter for emphasizing the extracted contrast component.

Also, of the unsharp masking processing implemented in existing photo-retouching software, some software includes a function for suitably adjusting the gain value so as to obtain more desirable effects.

For example, heretofore, there has been marketed photo-retouching software capable of setting the lower limit value of a contrast component to which contrast emphasis is applied as a threshold value. With this software, when the high-frequency contrast component of the relevant pixel is greater than a threshold value, the contrast component is emphasized with the specified gain value, and when the contrast component is below the threshold value, the gain value is set to zero, and consequently, the contrast component is not emphasized. Thus, a case can be prevented wherein a high-frequency noise component is also emphasized together with the contrast component.

Also, heretofore, there has been marketed photo-retouching software capable of setting the properties of the gain value further in detail. FIG. 4 is a graph illustrating the properties of the gain value of the unsharp masking processing of the photo-retouching software thereof. The horizontal axis of FIG. 4 indicates a local contrast value of an image, and the vertical axis indicates an emphasis rate of a contrast component, i.e., the gain value. With this software, as shown in FIG. 4, in addition to a lower limit value, respective parameters can be set, such as an upper limit value, a lower-limit gradual adjustment area, an upper-limit gradual adjustment area, an entire area effect, and an effect. Thus, in addition to the lower limit value of a contrast component to which contrast correction is applied, the upper limit can be set, whereby occurrence of brightness saturation with a strong contrast area subjected to excessive contrast emphasis, and occurrence of an image having excessively strong contrast to an unnatural extent, can be prevented.

SUMMARY OF THE INVENTION

Note however, with the invention described in Japanese Unexamined Patent Application Publication No. 2007-049540, there is a possibility that gray level inversion occurs wherein the size relation of brightness values is inverted due to contrast correction processing. Now, let us consider conditions wherein gray level inversion occurs.

Both sides of the above-mentioned Expression (3) are differentiated with $L_c^{(n1)}$, whereby the following Expression (4) can be obtained.

$$\frac{\partial}{\partial L_c^{(n1)}} L_u^{(n1)} = \frac{\partial g}{\partial L_c^{(n1)}} \cdot (L_c^{(n1)} - L_{c1}^{(n1)}) + (g+1) \tag{4}$$

Note here that gray level inversion within a local area is taken into consideration, so let us consider in Expression (4) that the overall brightness value $L_c^{(n1)}$ is taken as a constant. Also, in Expressing (4), the indication of (p) is omitted, which represents the pixel value position of each variable.

In order to prevent local gray level inversion from occurring, there is a need to set the gain value g such that the value of the right side of Expression (4) is greater than zero within the range of valid brightness values (hereafter, referred to as the valid brightness range) from the minimum value $L_{min}^{(n1)}$ to the maximum value $L_{max}^{(n1)}$.

With invention described in Japanese Unexamined Patent Application Publication No. 2007-049540, the property of the gain value g is represented with the above-mentioned FIG. 3, Expression (1), and Expression (2), but in order to simplify explanation here, let us consider a range alone where the brightness value $L_c^{(n1)}$ is brighter than the intermediate brightness level $L_{mid}^{(n1)}$. Thus, the gain value g of Expression (4) is represented with the following Expression (5).

$$g = -g_{mid} \cdot \frac{L_c^{(n1)} - L_{mid}^{(n1)}}{L_{max}^{(n1)} - L_{mid}^{(n1)}} + g_{mid} \tag{5}$$

Here, $g_{mid}$ represents the peak value of the gain value g in the intermediate brightness level $L_{mid}^{(n1)}$, and is a constant represented with the following Expression (6).

$$g_{mid} = \frac{contrastGain}{\gamma_{comp}} - 1 \tag{6}$$

Expression (5) is substituted for Expression (4), whereby the following Expression (7) is obtained.

$$\frac{\partial}{\partial L_c^{(n1)}} L_u^{(n1)} = -g_{mid} \cdot \frac{L_c^{(n1)} - L_{c1}^{(n1)}}{L_{max}^{(n1)} - L_{mid}^{(n1)}} - g_{mid} \cdot \frac{L_c^{(n1)} - L_{mid}^{(n1)}}{L_{max}^{(n1)} - L_{mid}^{(n1)}} + g_{mid} + 1 \tag{7}$$

For example, in the case of $g_{mid}=1$ and $L_{c1}^{(n1)}=L_{mid}^{(n1)}$, when $L_c^{(n1)}=L_{max}^{(n1)}$ holds, the right side of Expression (7) is zero.

The value of $g_{mid}$ is approximately determined with the histogram shape of the brightness value of an input image before gray level compression, and the value of contrastGain is usually set to one, so with an usual natural image, the value of $g_{mid}$ is experientially found to be included in a range of zero to one. Also, the overall brightness value $L_{c1}^{(n1)}$ is the brightness value of an extremely low-frequency component of an image before contrast correction, so it is rare that $L_{c1}^{(n1)}$ is greater than $L_{mid}^{(n1)}$. Accordingly, with a usual natural image, the monotonous increase nature of $L_u^{(n1)}$ at a local area is secured within a valid brightness range, and there is almost no possibility that gray level inversion occurs.

Note however, in the case of setting the value of contrastGain to a value greater than one to emphasize the contrast of the image as compared with the original image according to reasons for improving the appearance of the image, or the like, with a usual natural image as well, there is a case wherein $g_{mid}$ exceeds one, and with a range of $L_c^{(n1)} < L_{max}^{(n1)}$, there is a case wherein the right side of Expression (7) is equal to or smaller than zero. This indicates that with an image of which the contrast component $(L_c^{(n1)} - L_c^{(n1)})$ includes a great pixel, there is a possibility that gray level inversion occurs.

Also, with the above-mentioned gain properties in FIG. 4 as well, similar to the gain properties in FIG. 3, the gain attenuation properties which are the side greater than the upper limit value are linear, and there is a possibility that gray level inversion occurs locally for the same reasons.

Further, with the invention described in Japanese Unexamined Patent Application Publication No. 2007-049540, in a case wherein the value of contrastGain is set to a value greater than one, and the gain value g(p) becomes great, with the above-mentioned Expression (3), there is a possibility that the contrast component $(L_c^{(n1)}(p) - L_{c1}^{(n1)}(p))$ is emphasized too much, and the brightness value $L_u^{(n1)}(p)$ exceeds the brightness value of a black level, or is below the brightness value of a noise level. That is to say, with the image after contrast correction, there is a possibility that brightness is saturated, and whiteout or blackout occurs.

For example, in the case of an image of which the low brightness area includes a spot-shaped high brightness area, the overall brightness value $L_{c1}^{(n1)}(p)$ becomes small, so the contrast component becomes very great. In this case, when the value of contrastGain is set to one, as described above, the gain value g(p) does not exceed one, and saturation of brightness does not occur in most cases, but when the value of contrastGain is set greater than one, the gain value g(p) exceeds one, and as a result thereof, with the image after contrast correction, there is a possibility that brightness is saturated, and whiteout or blackout occurs.

Also, with the photo-retouching software having gain properties in FIG. 4, contrast correction is suppressed according to a local contrast value, and saturation of brightness is suppressed, but for example, there is a remaining possibility that brightness is saturated in the case of applying contrast correction to a high brightness area where the contrast component is not so strong.

That is to say, with the invention described in Japanese Unexamined Patent Application Publication No. 2007-049540, and marketed photo-retouching software, there is a possibility that gray level inversion or saturation of brightness is caused with contrast correction according to a level of emphasizing an image to be processed and contrast.

There has been recognized a need to enable contrast correction to be suitably performed according to each image.

According to an embodiment of the present invention, an image processing device configured to extract a contrast component for each pixel of an input image by removing a low-frequency component of the input image and to correct the contrast component for each pixel based on a gain value, includes: an input/output-property generating unit configured to generate an input/output property curve, assuming an input contrast component which is the contrast component before correction as input, and an output contrast component which is the contrast component after correction as output, which is an input/output property curve of which the output contrast component monotonously increases as to the input contrast component; a gain properties generating unit configured to generate a gain property curve representing properties as to the input contrast component of the gain value for correcting the input contrast component to obtain the output contrast component based on the input/output property curve; and a gain-value calculating unit configured to calculate the gain value for each pixel of the input image based on the gain property curve.

The input/output property generating unit may generate the input/output property curve of which the inclination is the maximum and greater than one when the value of the input contrast component is around zero, becomes moderate as the absolute value of the input contrast component becomes great when the value of the input contrast component is within a predetermined correction range, and is generally one in a range where the absolute value of the output contrast component as to the input contrast component is equal to or greater than the absolute value of the input contrast component, and the input contrast value exceeds the correction range.

The image processing device may further include: an obtaining unit configured to obtain the maximum inclination which is the inclination of the input/output property curve when the value of the input contrast component is around zero and the correction range, which are specified by a user, wherein the input/output property generating unit can generate the input/output property curve based on the maximum inclination and the correction range specified by the user.

The gain-value calculating unit may calculate the gain value regarding each pixel of the input image based on the difference value between the brightness value of the pixel thereof and an intermediate brightness value which is generally a central value of the range that the brightness value of the input image can take.

The gain-value calculating unit may calculate the gain value regarding each pixel of the input image based on the contrast component of the pixel thereof.

The gain-value calculating unit may calculate a first gain value regarding each pixel of the input image based on the difference value between the brightness value of the pixel thereof and an intermediate brightness value which is generally a central value of the range that the brightness value of the input image can take, calculate a second gain value based on the contrast component of the pixel thereof, and calculate an ultimate third gain value based on the first gain value and the second gain value.

An image processing method or program according an embodiment of the present invention is an image processing method for an image processing device configured to extract a contrast component for each pixel of an input image by removing a low-frequency component of the input image and to correct the contrast component for each pixel based on a gain value, or a program causing a computer to execute processing for extracting a contrast component for each pixel from an input image by removing a low-frequency component of the input image and correcting the contrast component for each pixel based on a gain value, including the steps of: generating an input/output property curve, assuming that an input contrast component which is the contrast component before correction is taken as input, and an output contrast component which is the contrast component after correction is taken as output, which is an input/output property curve of which the output contrast component monotonously increases as to the input contrast component; generating a gain property curve representing properties as to the input contrast component of the gain value for correcting the input contrast component to obtain the output contrast component based on the input/output property curve; and calculating the gain value for each pixel of the input image based on the gain property curve.

With the above configuration, an input/output property curve is generated, assuming an input contrast component which is the contrast component before correction as input, and an output contrast component which is the contrast component after correction as output, which is an input/output property curve of which the contrast component monotonously increases as to the input contrast component, a gain property curve representing properties as to the input contrast component of the gain value for correcting the input contrast component to obtain the output contrast component is generated based on the input/output property curve, and the gain value is calculated for each pixel of the input image based on the gain property curve.

Thus, the gain value employed for contrast correction can be controlled for each pixel. Also, contrast correction can be suitably performed according to each image particularly so as not to cause gray level inversion.

According to an embodiment of the present invention, an image processing device configured to extract a contrast component for each pixel of an input image by removing a low-frequency component of the input image and to correct the contrast component for each pixel based on a gain value indicating a level emphasizing the contrast component, includes: a first gain-value calculating unit configured to calculate a first gain value regarding each pixel of the input image based on a first gain property curve representing the properties of the gain value, and the brightness value of the pixel thereof; a second gain-value calculating unit configured to calculate a second gain value regarding each pixel of the input image based on a second gain property curve representing the properties of the gain value, and the contrast component of the pixel thereof; and a third gain-value calculating unit configured to calculate an ultimate third gain value regarding each pixel of the input image based on the first gain value and the second gain value.

The third gain-value calculating unit may set the smaller one of the first gain value and the second gain value as the third gain value.

The third gain-value calculating unit may set the value obtained by multiplying the first gain value by the second gain value as the third gain value.

The first gain property curve and the second gain property curve may be the same property curve, which is a gain property curve wherein the value of the contrast component is the maximum at around zero, and with a predetermined correction range of the value of the contrast component, the greater the absolute value of the contrast component becomes, the smaller the gain value becomes, and with a range where the value of the contrast component exceeds the correction range, the gain value is generally zero, wherein the first gain-value calculating unit can calculate the gain value regarding each pixel of the input image based on the difference value between the brightness value of the pixel thereof and a predetermined brightness value of the input image.

An image processing method or program according to an embodiment of the present invention is an image processing method for an image processing device configured to extract a contrast component for each pixel of an input image by removing a low-frequency component of the input image and to correct the contrast component for each pixel based on a gain value indicating a level emphasizing the contrast component, or a program causing a computer to execute processing for extracting a contrast component for each pixel of an input image by removing a low-frequency component of the input image and correcting the contrast component for each pixel based on a gain value indicating a level emphasizing the contrast component, including the steps of: calculating a first gain value regarding each pixel of the input image based on a first gain property curve representing the properties of the gain value, and the brightness value of the pixel thereof; calculating a second gain value regarding each pixel of the input image based on a second gain property curve representing the properties of the gain value, and the contrast component of the pixel thereof; and calculating an ultimate third gain value regarding each pixel of the input image based on the first gain value and the second gain value.

With the above configuration, a first gain value is calculated regarding each pixel of the input image based on a first gain property curve representing the properties of the gain value, and the brightness value of the pixel thereof, a second gain value is calculated regarding each pixel of the input image based on a second gain property curve representing the properties of the gain value, and the contrast component of the pixel thereof, and an ultimate third gain value is calculated regarding each pixel of the input image based on the first gain value and the second gain value.

Thus, the gain value employed for contrast correction can be controlled for each pixel. Also, contrast correction can be suitably performed according to each image particularly so as not to cause saturation of brightness.

DESCRIPTION OF THE PREFERRED EMBODIMENTS

Figure 1:
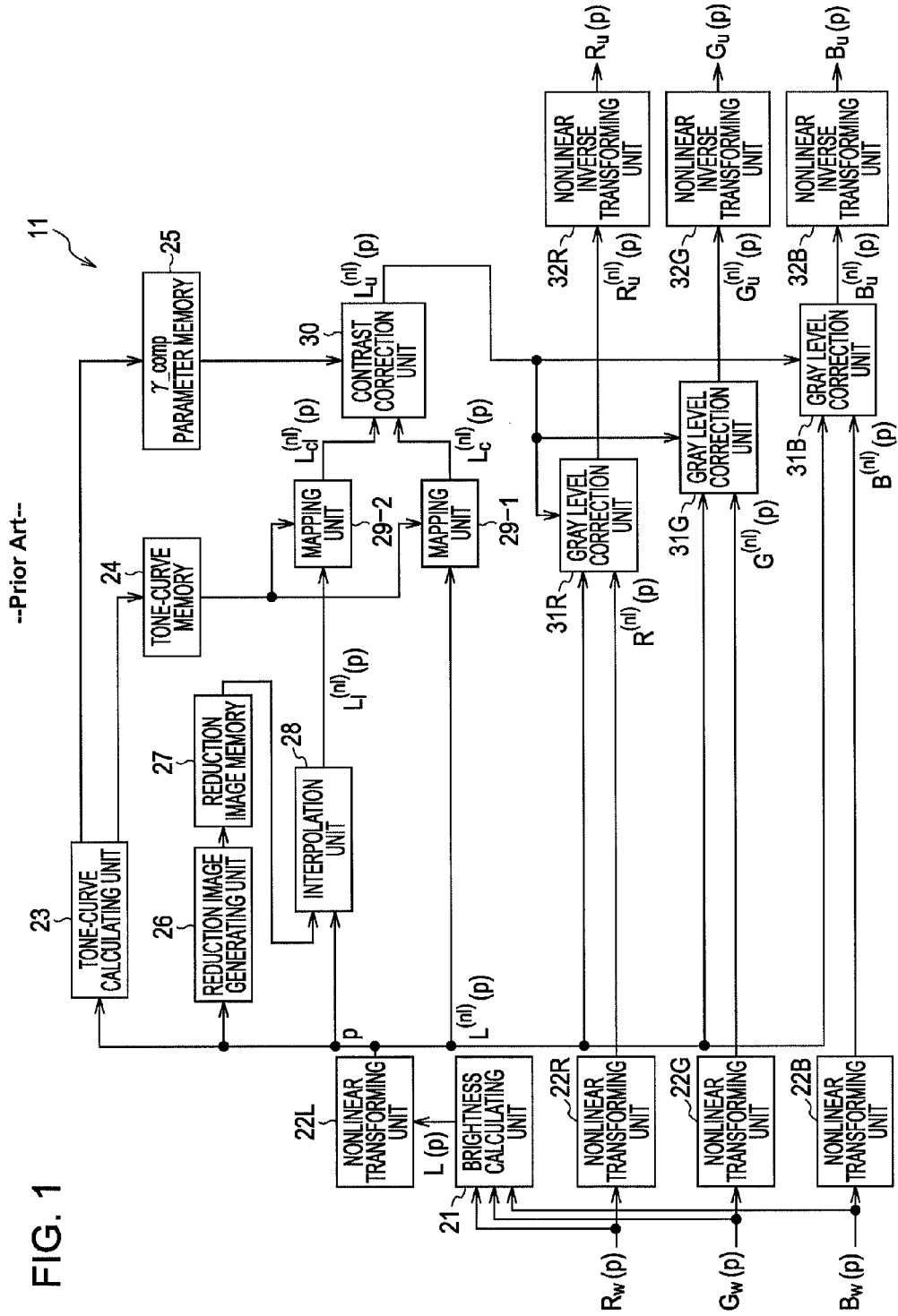
FIG. 1 is a block diagram illustrating a functional configuration example of a gray level transformation unit for performing existing gray level transformation processing.
Figure 2:
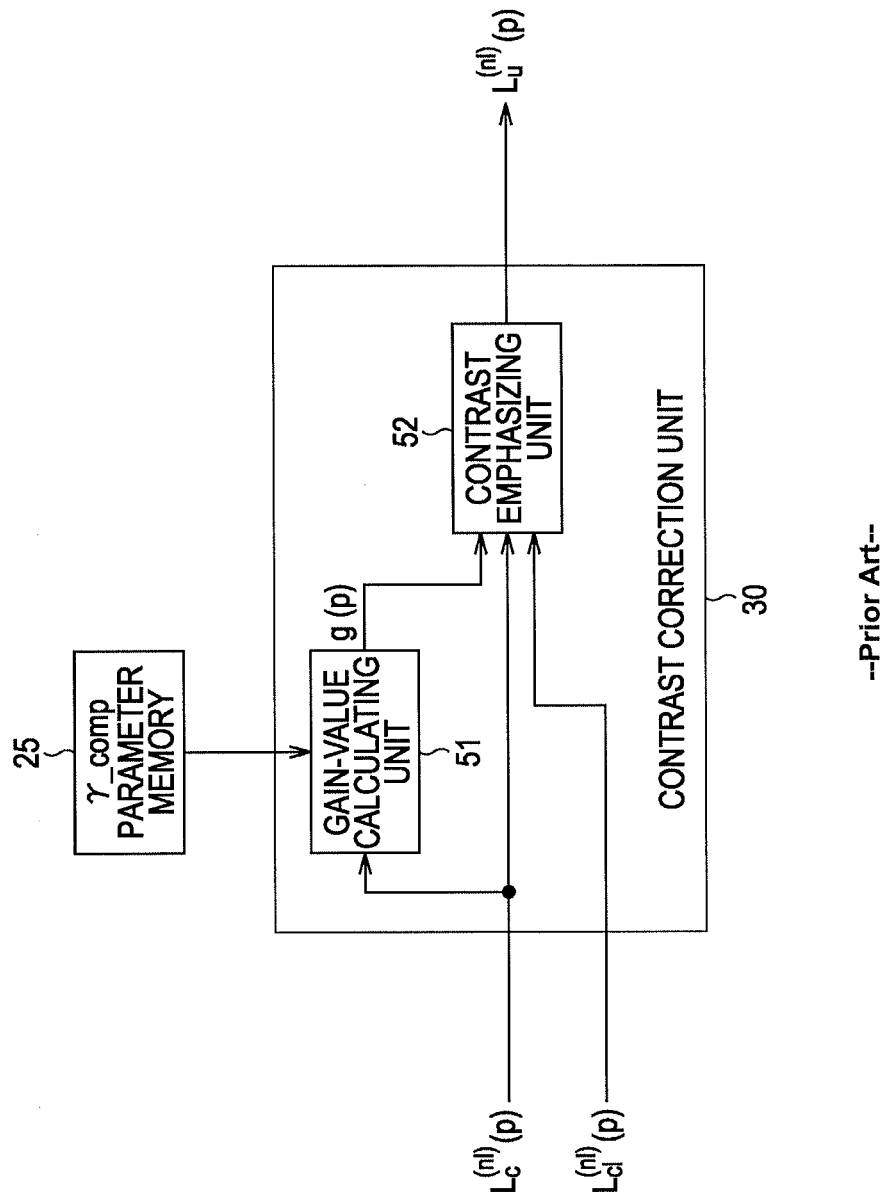
FIG. 2 is a block diagram illustrating a functional configuration example of the contrast correction unit in FIG. 1.

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

An image processing device according to a first embodiment of the present invention (e.g., gray level transformation unit 143 in FIG. 7 or CPU 621 in FIG. 38) is, first, an image processing device configured to extract a contrast component for each pixel of an input image by removing a low-frequency component of the input image and to correct the contrast component for each pixel based on a gain value, including: an input/output-property generating unit (e.g., input/output property setting unit 341 in FIG. 14 or input/output property setting unit 643 in FIG. 39) configured to generate an input/output property curve (e.g., input/output property curve CL21 in FIG. 33), assuming an input contrast component which is the contrast component before correction as input, and an output contrast component which is the contrast component after correction as output, which is an input/output property curve of which the output contrast component monotonously increases as to the input contrast component; a gain properties generating unit (e.g., gain properties calculating unit 343 in FIG. 14 or FIG. 39) configured to generate a gain property curve (e.g., contrast gain curve CL31 in FIG. 34) representing properties as to the input contrast component of the gain value for correcting the input contrast component to obtain the output contrast component based on the input/output property curve; and a gain-value calculating unit (e.g., gain-value calculating unit 391 in FIG. 17 or FIG. 39) configured to calculate the gain value for each pixel of the input image based on the gain property curve.

The image processing device according to the first embodiment of the present invention, secondly, further includes an obtaining unit (e.g., UI processing unit 633 in FIG. 39) configured to obtain the maximum inclination which is the inclination of the input/output property curve when the value of the input contrast component is around zero and the correction range, which are specified by a user, wherein the input/output property generating unit can generate the input/output property curve based on the maximum inclination and the correction range specified by the user.

Figure 28:
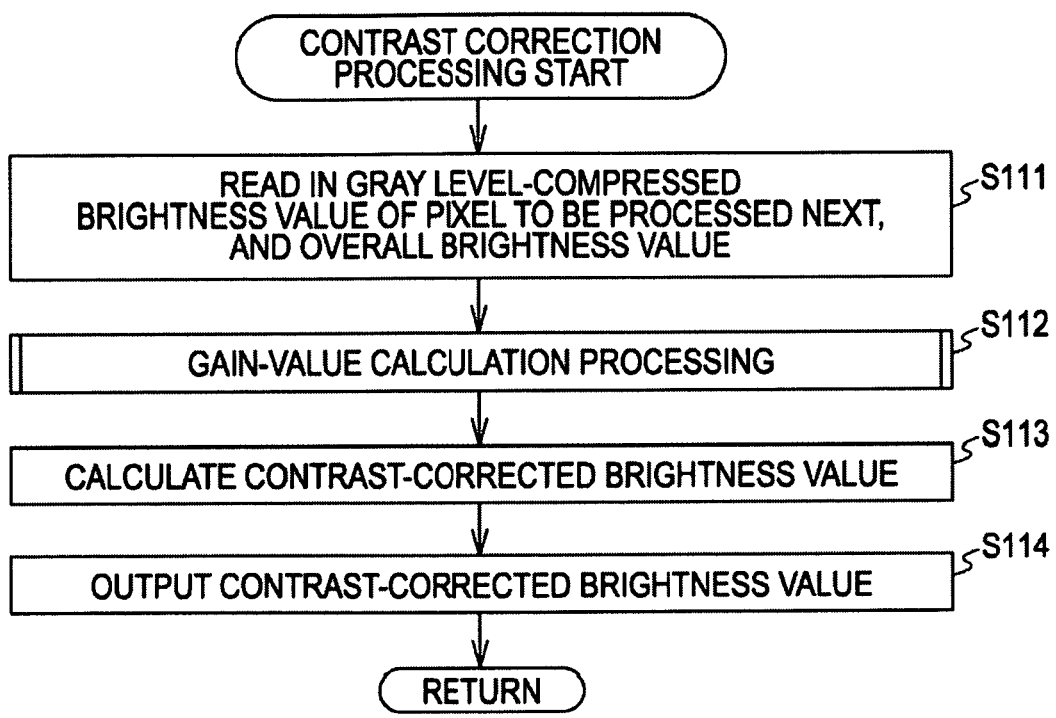
FIG. 28 is a flowchart for describing the details of the contrast correction processing in step S30 in FIG. 22.
Figure 43:
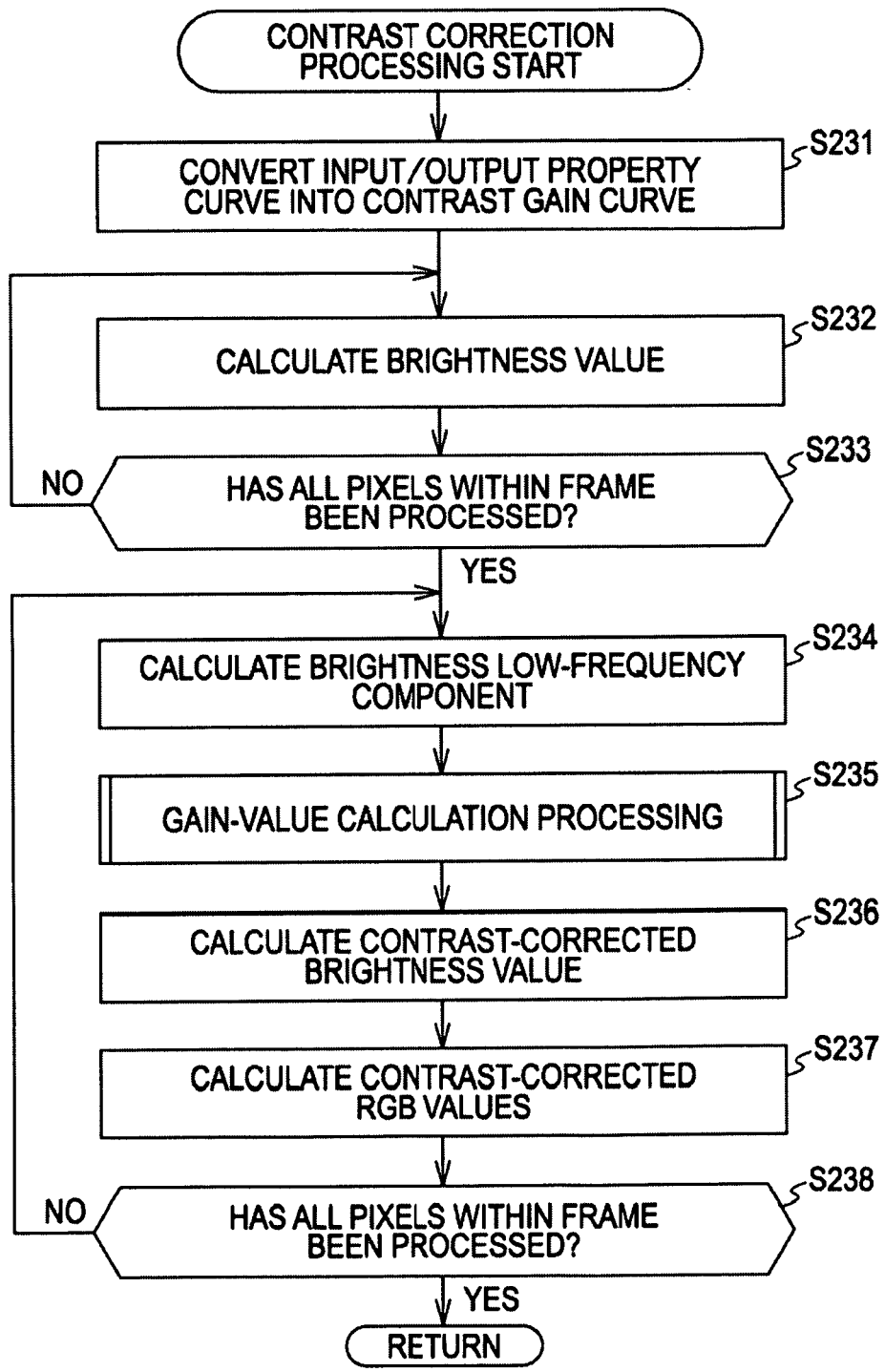
FIG. 43 is a flowchart for describing the details of the contrast correction processing in step S214 in FIG. 41.

An image processing method or program according to the first embodiment of the present invention is an image processing method for an image processing device configured to extract a contrast component for each pixel of an input image by removing a low-frequency component of the input image and to correct the contrast component for each pixel based on a gain value, or a program causing a computer to execute processing for extracting a contrast component for each pixel of an input image by removing a low-frequency component of the input image and correcting the contrast component for each pixel based on a gain value, including the steps of: generating an input/output property curve (e.g., input/output property curve CL21 in FIG. 33), assuming that an input contrast component which is the contrast component before correction is taken as input, and an output contrast component which is the contrast component after correction is taken as output, which is an input/output property curve of which the output contrast component monotonously increases as to the input contrast component (e.g., step S141 in FIG. 32 or step S212 in FIG. 41); generating a gain property curve (e.g., contrast gain curve CL31 in FIG. 34) representing properties as to the input contrast component of the gain value for correcting the input contrast component to obtain the output contrast component based on the input/output property curve (e.g., step S142 in FIG. 32 or step S231 in FIG. 43); and calculating the gain value for each pixel of the input image based on the gain property curve (e.g., step S112 in FIG. 28 or step S235 in FIG. 43).

Figure 3:
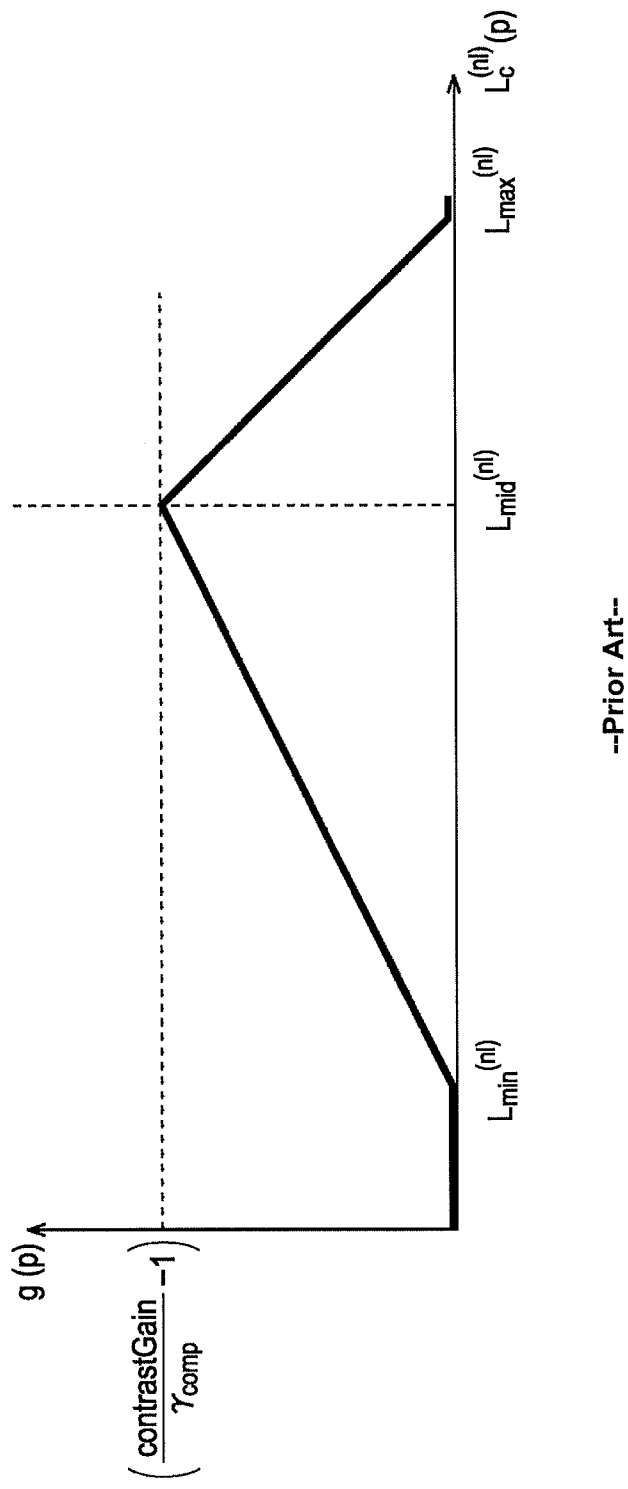
FIG. 3 is a graph illustrating the properties of a gain value employed for existing contrast correction.
Figure 4:
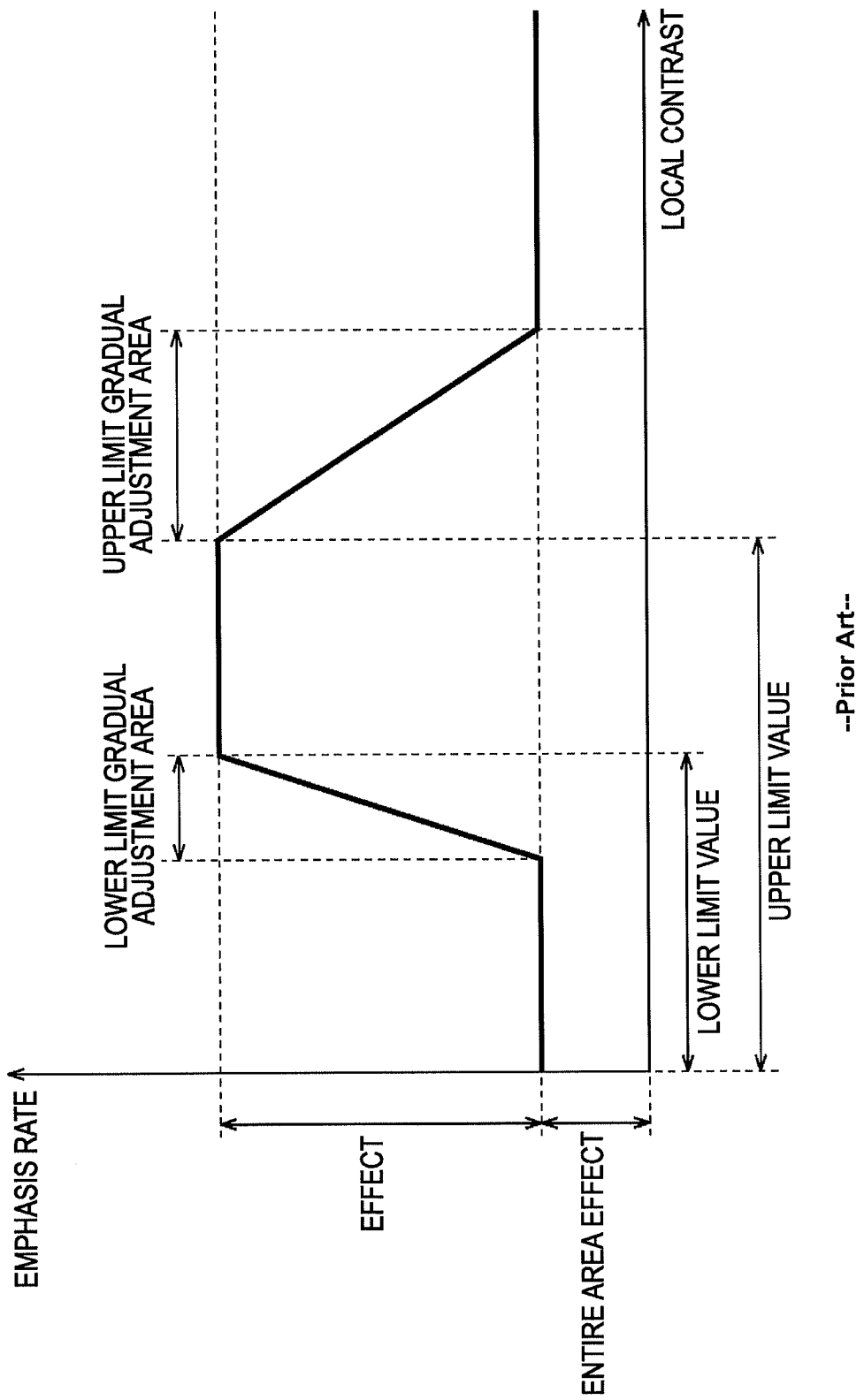
FIG. 4 is a graph illustrating a property example of a gain value employed for unsharp masking processing of existing photo-retouching software.

An image processing device according to a second embodiment of the present invention (e.g., gray level transformation unit 143 in FIG. 7 or CPU 621 in FIG. 38) is an image processing device configured to extract a contrast component for each pixel of an input image by removing a low-frequency component of the input image and to correct the contrast component for each pixel based on a gain value indicating a level emphasizing the contrast component, including: a first gain-value calculating unit (e.g., mapping unit 412-1 in FIG. 18 or FIG. 36) configured to calculate a first gain value regarding each pixel of the input image based on a first gain property curve (e.g., curve representing gain properties in FIG. 3 or contrast gain curve CL31 in FIG. 34) representing the properties of the gain value, and the brightness value of the pixel thereof; a second gain-value calculating unit (e.g., mapping unit 412-2 in FIG. 18 or FIG. 36) configured to calculate a second gain value regarding each pixel of the input image based on a second gain property curve (e.g., contrast gain curve CL31 in FIG. 34) representing the properties of the gain value, and the contrast component of the pixel thereof; and a third gain-value calculating unit (e.g., selection unit 414 in FIG. 18 or multiplying unit 501 in FIG. 36) configured to calculate an ultimate third gain value regarding each pixel of the input image based on the first gain value and the second gain value.

Figure 29:
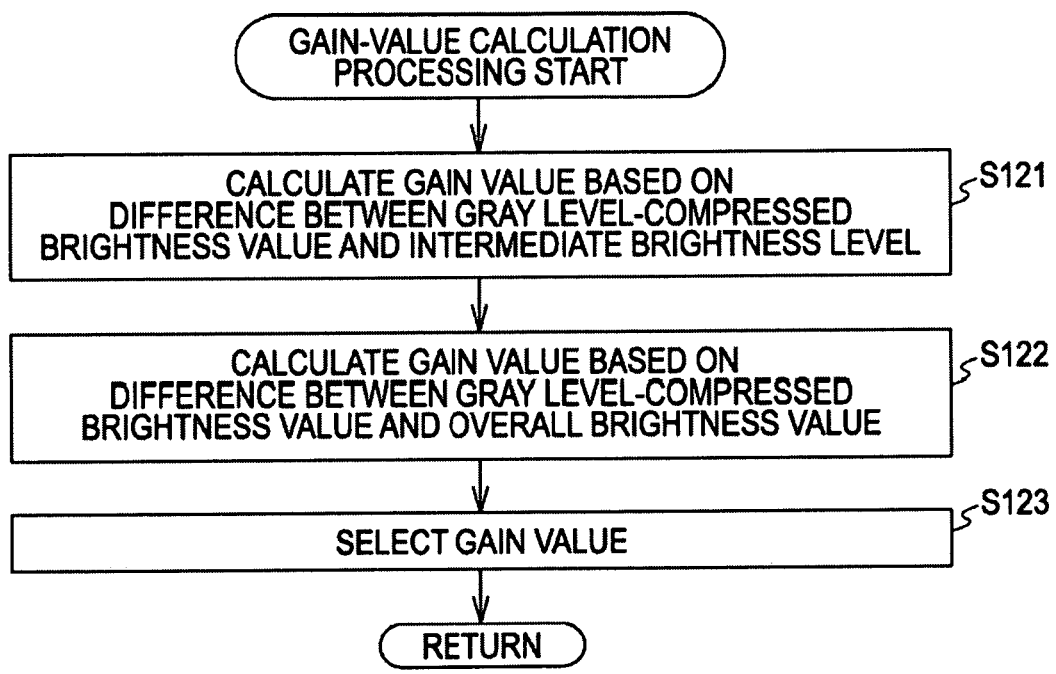
FIG. 29 is a flowchart for describing the details of the gain-value calculation processing in step S112 in FIG. 28.

An image processing method or program according to the second embodiment of the present invention is an image processing method for an image processing device configured to extract a contrast component for each pixel of an input image by removing a low-frequency component of the input image and to correct the contrast component for each pixel based on a gain value indicating a level emphasizing the contrast component, or a program causing a computer to execute processing for extracting a contrast component for each pixel of an input image by removing a low-frequency component of the input image and correcting the contrast component for each pixel based on a gain value indicating a level emphasizing the contrast component, including the steps of: calculating a first gain value regarding each pixel of the input image based on a first gain property curve (e.g., curve representing gain properties in FIG. 3 or contrast gain curve CL31 in FIG. 34) representing the properties of the gain value, and the brightness value of the pixel thereof (e.g., step 3121 in FIG. 29); calculating a second gain value regarding each pixel of the input image based on a second gain property curve (e.g., contrast gain curve CL31 in FIG. 34) representing the properties of the gain value, and the contrast component of the pixel thereof (e.g., step S122 in FIG. 29); and calculating an ultimate third gain value regarding each pixel of the input image based on the first gain value and the second gain value (e.g., step S123 in FIG. 29).

Description will be made below regarding embodiments of the present invention with reference to the drawings.

Figure 5:
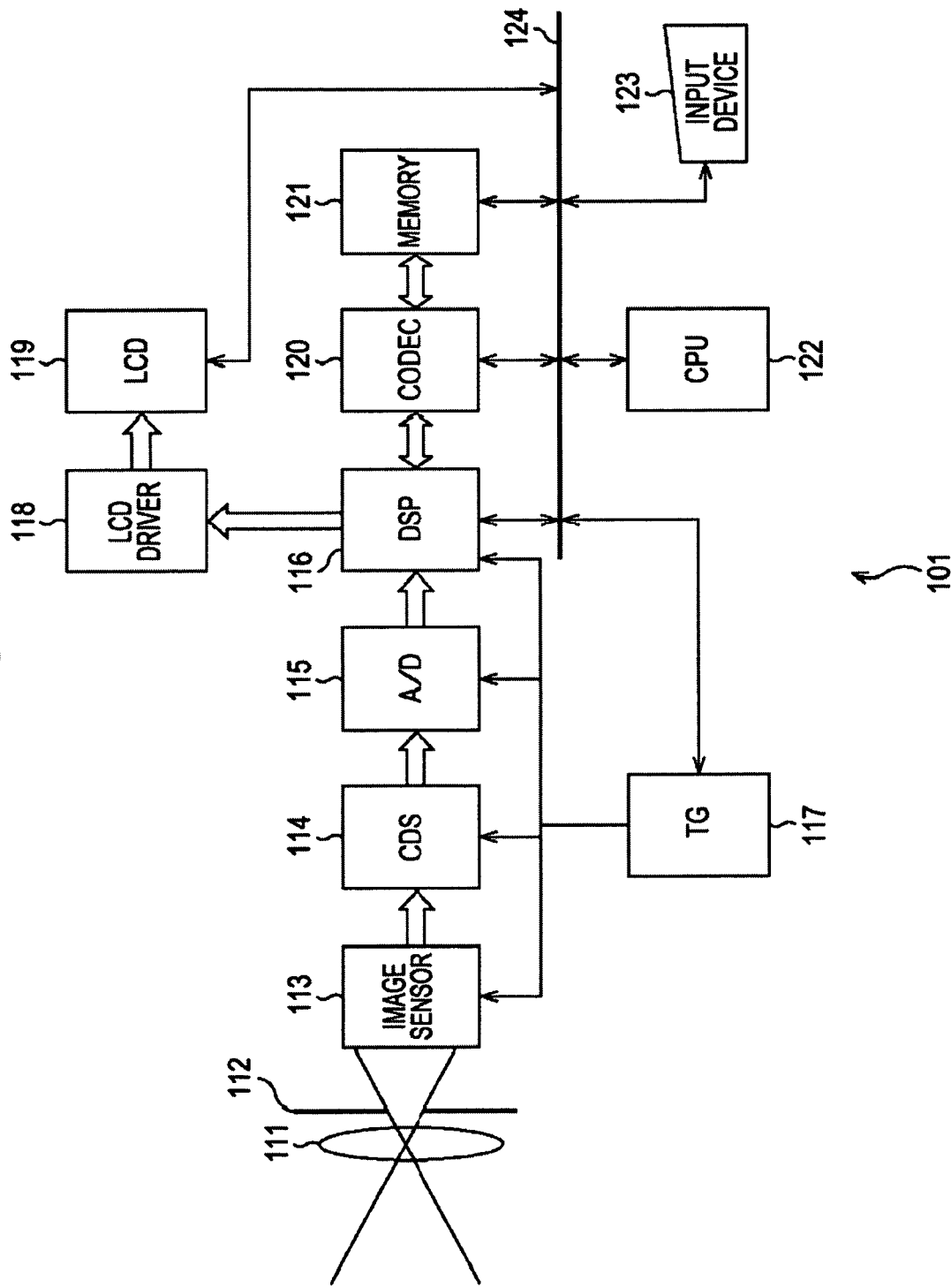
FIG. 5 is a block diagram illustrating an embodiment of a digital video camera to which the present invention is applied.

FIG. 5 is a block diagram illustrating an embodiment of a digital video camera to which the present invention is applied. A digital video camera 101 is configured so as to include a lens 111, an aperture 112, an image sensor 113, a correlation double sampling circuit (CDS) 114, an A/D converter 115, a DSP (Digital Signal Processor) block 116, a timing generator (TG) 117, an LCD (Liquid Crystal Display) driver 118, an LCD 119, CODEC (Compression/Decompression) 120, memory 121, CPU 122, and an input device 123. Note that the DSP block 116 is a block made up of a signal processing processor (e.g., DSP) and memory such as RAM (Random Access Memory) or the like for holding image data, and so forth. Later-described image processing is performed by the processor executing a predetermined program. Note that the DSP block 116 is simply referred to as DSP 116.

The incident light from a subject which has passed through an optical system made up of the lens 111, aperture 112, and so forth, first reaches each photoreceptor on the imaging surface of the image sensor 113, and is converted into an electric signal with photoelectric conversion by the photoreceptor. The electric signal output from the image sensor 113, from which noise is removed by the correlation double sampling circuit 114, is digitalized by the A/D converter 115, following which the digitalized image is temporarily stored in the memory within the DSP 116. The timing generator 117 controls a signal processing system made up of the correlation double sampling circuit 114, A/D converter 115, and DSP 116 such that image data is acquired at a fixed frame rate. That is to say, the stream of image data is supplied to the DSP 116 at a fixed frame rate.

Note that the image sensor 113 of which the dynamic range is wider than that of an image sensor such as a common CCD (Charge Coupled Device) or the like can perform imaging from the dark portion to the bright portion of a subject without causing saturation and noise. Accordingly, the A/D converter 115 converts an input electric signal into image data having a greater number of gray levels (e.g., the number of gray levels that can be represented with data of 14 through 16 bits or so) than the number of gray levels (e.g., the number of gray levels that can be represented with data of 10 through 12 bits or so) of a common digital video camera.

The DSP 116 subjects image data to later-described image processing, for example, such that the dynamic range of the image data becomes a dynamic range that the LCD 119 can display, and then supplies the image data subjected to the image processing to the LCD driver 118 or CODEC 120 as necessary.

The LCD driver 118 converts the image data supplied from the DSP 116 into an analog image signal. The LCD driver 118 supplies the analog image signal to the LCD 119 which is the viewfinder of the digital video camera 101 to display an image based on the image signal.

The CODEC 120 encodes the image data supplied from the DSP 116 using a predetermined system, and stores the encoded image data to the memory 121 made up of semiconductor, a magnetic recording medium, a magneto-optical recording medium, or an optical recording medium.

The CPU 122 controls the entire processing of the digital video camera 101, for example, based on the instructions input from a user by operating the input device 123 made up of operating buttons such as a shutter button and so forth.

Figure 6:
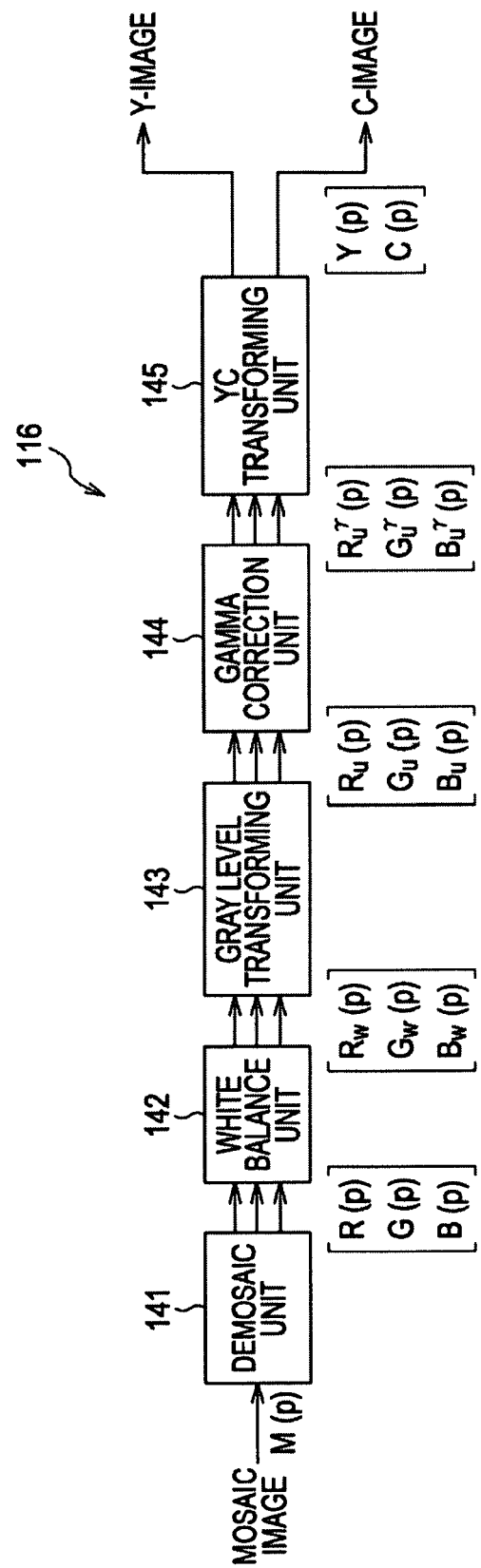
FIG. 6 is a block diagram illustrating a functional configuration example of the DSP block in FIG. 2.

FIG. 6 is a block diagram illustrating a functional configuration example realized by the internal processor (arithmetic unit) of the DSP 116 executing a predetermined program. The internal processor of the DSP 116 executes a predetermined program, whereby functions including a demosaic unit 141, a white balance unit 142, a gray level transformation unit 143, a gamma correction unit 144, and an YC conversion unit 145 are realized.

The demosaic unit 141 acquires a mosaic image which is the image data analog-to-digital-converted by the A/D converter 115. The mosaic image is an image wherein data corresponding to one of color components of R, G, and B is stored in one pixel, and such each pixel is disposed in accordance with a color array called the Bayer array, for example. The demosaic unit 141 subjects the mosaic image to demosaic processing for allowing one pixel to include all of the R, G, and B components. Thus, three pieces of image data of an R image, G image, and B image each corresponding to the three color components of R, G, and B are generated. The demosaic unit 141 supplies the three pieces of image data of the generated R image, G image, and B image to the white balance unit 142.

Note that hereafter, the three pieces of image data of the R image, G image, and B image will collectively be referred to an RGB image. Also, hereafter, the pixel value at a pixel position p of the mosaic image is assumed to be M(p). Further, hereafter, the pixel values at the pixel position p of the image data subjected to the demosaic processing will be expressed as [R(p), G(p), B(p)]. Note that R(p) is the pixel value of the R component, G(p) is the pixel value of the G component, and B(p) is the pixel value of the B component.

The white balance unit 142 adjusts the white balance of the RGB image such that the color balance of the achromatic color portion of a subject becomes an actual achromatic color by multiplying a suitable coefficient to each pixel value of the RGB image. The white balance unit 142 supplied the RGB image of which the white balance has been adjusted to the gray level transformation unit 143. Note that hereafter, the pixel values at the pixel position p of the image data of which the white balance has been adjusted will be expressed as [$R_w(p)$, $G_w(p)$, $B_w(p)$]. Note that $R_w(p)$ is the pixel value of the R component, $G_w(p)$ is the pixel value of the G component, and $B_w(p)$ is the pixel value of the B component.

As described later with reference to FIGS. 22 and 23 and so forth, the gray level transformation unit 143 subjects the RGB image of which the white balance has been adjusted to gray level transformation processing. The gray level transformation unit 143 supplies the RGB image subjected to the gray level transformation processing to the gamma correction unit 144. Note that hereafter, the pixel values at the pixel position p of the image data subjected to the gray level transformation processing will be expressed as [$R_u(p)$, $G_u(p)$, $B_u(p)$]. Note that $R_u(p)$ is the pixel value of the R component, $G_u(p)$ is the pixel value of the G component, and $B_u(p)$ is the pixel value of the B component.

The gamma correction unit 144 subjects the RGB image subjected to the gray level transformation to gamma correction. The gamma correction unit 144 supplies the RGB image subjected to the gamma correction to the YC conversion unit 145. Note that hereafter, the pixel values at the pixel position p of the image data subjected to the gamma correction will be expressed as [$R_u^\gamma(p)$, $G_u^\gamma(p)$, $B_u^\gamma(p)$]. Note that $R_u^\gamma(p)$ is the pixel value of the R component, $G_u^\gamma(p)$ is the pixel value of the G component, and $B_u^\gamma(p)$ is the pixel value of the B component.

The YC conversion unit 145 generates a Y image made up of a brightness component (Y component), and a C image made up of a color difference component (Cb or Cr component) by performing YC matrix processing and band limiting as to a chroma component for an RGB image subjected to gamma correction. The YC conversion unit 145 supplies the generated Y image and C image to the LCD driver 118 or CODEC 120 as necessary. Note that hereafter, the pixel values at the pixel position p of the image data output from the YC conversion unit 145 will be expressed as [Y(p), C(p)]. Note that Y(p) is the brightness component of the Y image, and C(p) is the color difference component of the C image.

Figure 7:
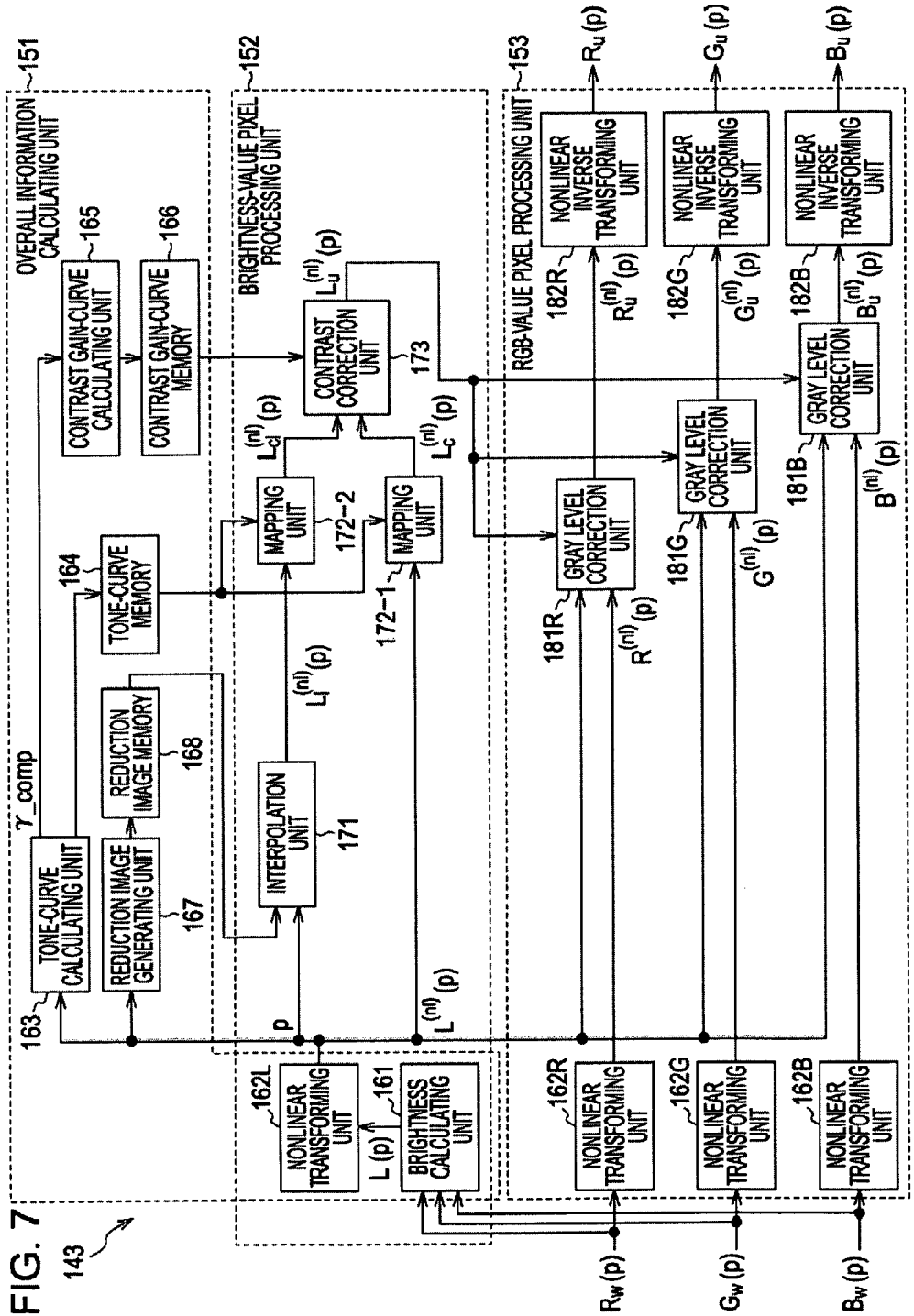
FIG. 7 is a block diagram illustrating a functional configuration example of the gray level transformation unit in FIG. 6.

FIG. 7 is a block diagram illustrating a functional configuration example of the gray level transformation unit 143. The gray level transformation unit 143 is configured so as to include an overall information calculating unit 151, a brightness value pixel processing unit 152, and an RGB-value pixel processing unit 153.

The overall information calculating unit 151 generates a reduction image obtained by reducing an image made up of the brightness value of the RGB image, and also generates (calculates) a tone curve for suitably compressing the gray level of the brightness value of the RGB image, and a contrast gain curve for suitably subjecting the brightness value of the RGB image to contrast correction, and supplies the generated reduction image, tone curve, and contrast gain curve to the brightness-value pixel processing unit 152.

The brightness-value pixel processing unit 152 employs the reduction image, tone curve, and contrast gain curve generated by the overall information calculating unit 151 to subject the brightness value of each pixel of the RGB image to gray level transformation and contrast correction, and supplies the brightness values obtained as a result thereof to the RGB-value pixel processing unit 153.

The RGB-value pixel processing unit 153 employs the brightness value calculated by the brightness-value pixel processing unit 152 to perform correction of the RGB values of each pixel of the RGB image.

The overall information calculating unit 151 is configured so as to include a brightness calculating unit 161, a nonlinear transforming unit 162L, a tone-curve calculating unit 163, tone-curve memory 164, a contrast gain-curve calculating unit 165, contrast gain-curve memory 166, a reduction image generating unit 167, and reduction image memory 168.

As described later with reference to FIG. 22, the brightness calculating unit 161 calculates, from the pixel values $R_w(p)$, $G_w(p)$, and $B_w(p)$ of the RGB image of which the white balance has been adjusted, the value (brightness value L(p)) of the brightness component corresponding to the pixel position thereof. The brightness calculating unit 161 outputs the calculated brightness value L(p) to the nonlinear transforming unit 162L.

As described later with reference to FIG. 22, the nonlinear transforming unit 162L subjects the brightness value L(p) to nonlinear transforming. The nonlinear transforming unit 162L outputs the brightness value $L^{(n1)}(p)$ calculated by the nonlinear transforming to the tone-curve calculating unit 163, the reduction image generating unit 167, an interpolation unit 171, a mapping unit 172-1, and gray level correction units 181R through 181B.

Figure 30:
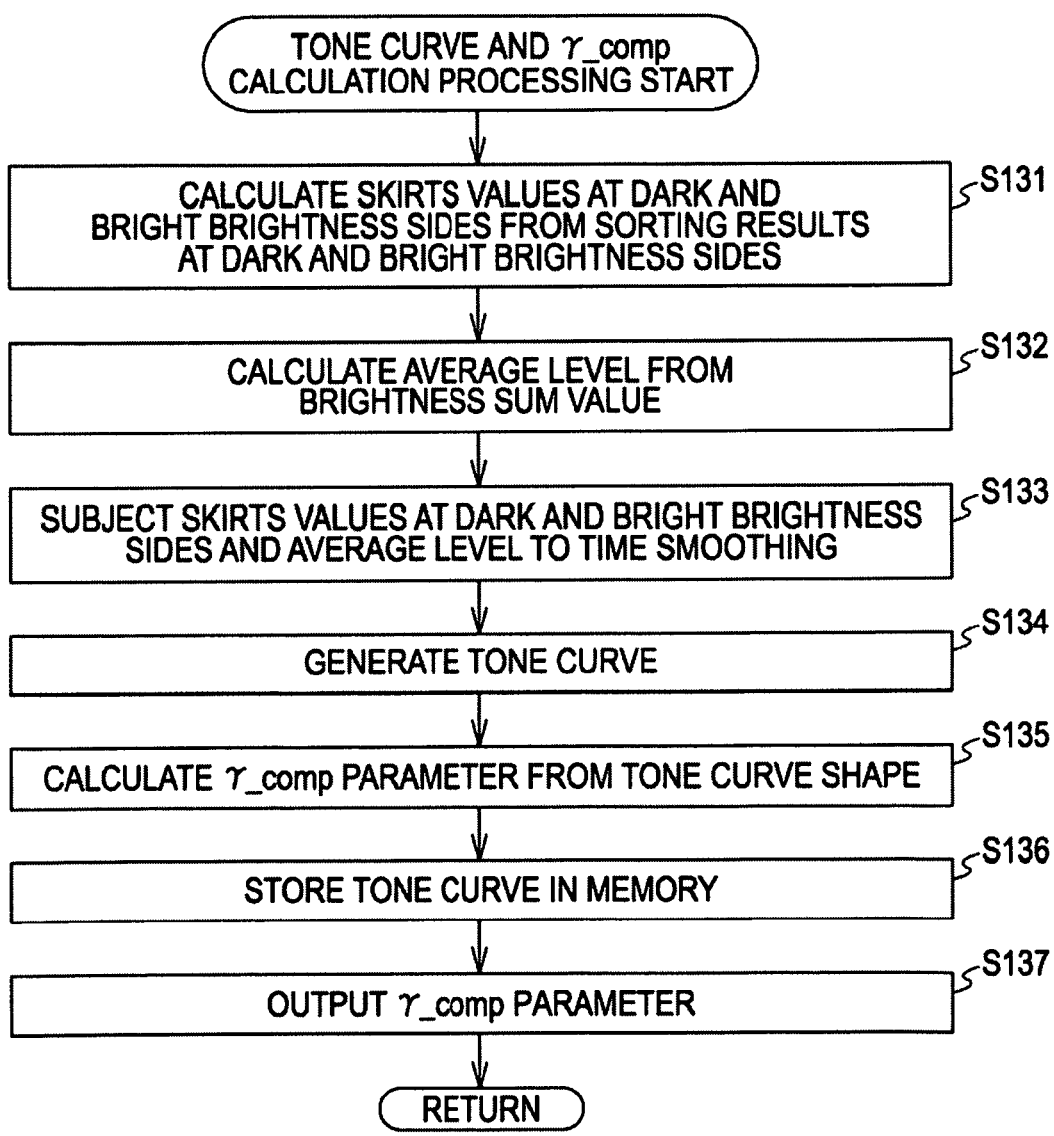
FIG. 30 is a flowchart for describing the details of the tone curve and γ_comp calculation processing in step S36 in FIG. 23.

As described later with reference to FIG. 30, the tone-curve calculating unit 163 calculates a tone curve employed for compressing the gray levels of the nonlinear-transformed brightness value $L^{(n1)}(p)$, and later-described overall brightness value $L_1^{(n1)}(p)$. The tone-curve calculating unit 163 stores a look-up table (conversion table of brightness values) representing the calculated tone curve in the tone-curve memory 164. Also, as described later with reference to FIG. 30, the tone-curve calculating unit 163 calculates a $\gamma$_comp parameter that is the representative value of the inclination of the tone curve. The tone-curve calculating unit 163 supplies the $\gamma$_comp parameter to the contrast gain-curve calculating unit 165.

As described later with reference to FIG. 32, the contrast gain-curve calculating unit 165 generates a contrast gain curve. The contrast gain-curve calculating unit 165 stores the look-up table representing the generated contrast gain curve in the contrast gain-curve memory 166.

Figure 35:
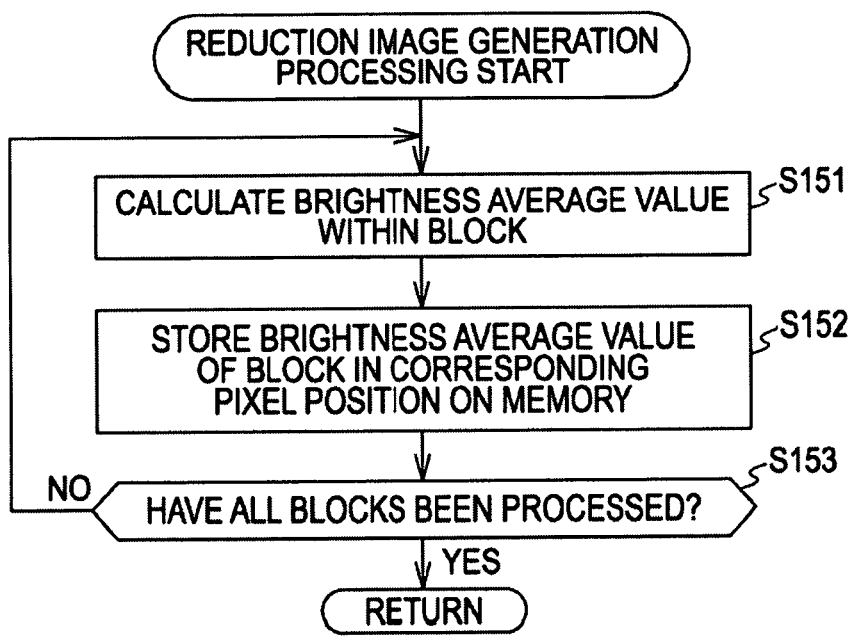
FIG. 35 is a flowchart for describing the details of the reduction image generation processing in step S38 in FIG. 23.

As described later with reference to FIG. 35, the reduction image generating unit 167 generates a reduction image by reducing the image made up of the brightness value $L^{(n1)}(p)$. Specifically, the reduction image generating unit 167 divides the image made up of the brightness value $L^{(n1)}(p)$ into horizontally $w_r \times$ vertically $h_r$ blocks, and generates a reduction image of horizontally $w_r \times$ vertically $h_r$ pixels wherein the average value of the brightness value $L^{(n1)}(p)$ for each divided block is arrayed in the same order as the corresponding block. The reduction image generating unit 167 stores the generated reduction image in the reduction image memory 168.

The brightness-value pixel processing unit 152 is configured so as to include the brightness calculating unit 161, nonlinear transforming unit 162L, interpolation unit 171, mapping units 172-1 and 172-2, and contrast correction unit 173. Note that the brightness calculating unit 161 and nonlinear transforming unit 162L are included in both of the overall information calculating unit 151 and brightness-value pixel processing unit 152.

As described later with reference to FIG. 26, the interpolation unit 171 calculates an overall brightness value $L_1^{(n1)}(p)$ making up an image obtained by enlarging a reduction image with cubic interpolation so as to have the same number of pixels as the original image. The interpolation unit 171 outputs the calculated overall brightness value $L_1^{(n1)}(p)$ to the mapping unit 172-2. Note that hereafter, the image made up of the overall brightness value $L_1^{(n1)}(p)$ will be referred to as an overall brightness image.

The mapping unit 172-1 reads in the look-up table representing a tone curve from the tone-curve memory 164. The mapping unit 172-1 compresses the gray level of the brightness value $L^{(n1)}(p)$ based on the read out look-up table, i.e., the tone curve. The mapping unit 172-1 outputs the brightness value $L_c^{(n1)}(p)$ of which the gray level has been compressed to the contrast correction unit 173.

The mapping unit 172-2 reads in the look-up table representing a tone curve from the tone-curve memory 164. The mapping unit 172-2 compresses the gray level of the overall brightness value $L_1^{(n1)}(p)$ based on the read out look-up table, i.e., the tone curve. The mapping unit 172-2 outputs the overall brightness value $L_{c1}^{(n1)}(p)$ of which the gray level has been compressed to the contrast correction unit 173.

The contrast correction unit 173 reads out the look-up table representing a contrast gain curve from the contrast gain-curve memory 166. As described later with reference to FIG. 28, the contrast correction unit 173 corrects the contrast of the image made up of the brightness value $L_c^{(n1)}(p)$ of which the gray level has been compressed with the tone curve based on the overall brightness value $L_{c1}^{(n1)}(p)$ of which the gray level has been compressed with the read look-up table, i.e., contrast gain curve, and the tone curve. The contrast correction unit 173 outputs the brightness value $L_u^{(n1)}(p)$ of which the contrast has been corrected to the gray level correction units 181R through 181B.

The RGB-value pixel processing unit 153 is configured so as to include the nonlinear transforming units 162R through 162B, gray level correction units 181R through 181B, and nonlinear inverse transforming units 182R through 182B.

As described later with reference to FIG. 22, the nonlinear transforming units 162R through 162B subject the pixel values $R_w(p)$, $G_w(p)$, and $B_w(p)$ of the RGB image of which the white balance has been adjusted, respectively, to nonlinear transforming. The nonlinear transforming units 162R through 162B output the pixel values $R^{(n1)}(p)$, $G^{(n1)}(p)$, and $B^{(n1)}(p)$ calculated through the nonlinear transforming to the gray level correction units 181R through 181B, respectively.

Note that hereafter, in a case wherein there is no need to distinguish each of the nonlinear transforming units 162L through 162B, the nonlinear transforming units 162L through 162B will simply be referred to as the nonlinear transforming unit 162.

As described later with reference to FIG. 23, the gray level correction units 181R through 181B correct (transform) the gray levels of the pixel values $R^{(n1)}(p)$, $G^{(n1)}(p)$, and $B^{(n1)}(p)$ subjected to nonlinear transforming, respectively. The gray level correction units 181R through 181B output the pixel values $R_u^{(n1)}(p)$, $G_u^{(n1)}(p)$, and $B_u^{(n1)}(p)$ subjected to the gray level correction to the nonlinear inverse transforming units 182R through 182B.

Note that hereafter, in a case wherein there is no need to distinguish each of the gray level correction units 181R through 181B, the gray level correction units 181R through 181B will simply be referred to as the gray level correction unit 181.

The nonlinear inverse transforming units 182R through 182B subject the gray level-corrected pixel values $R_u^{(n1)}(p)$, $G_u^{(n1)}(p)$, and $B_u^{(n1)}(p)$ to nonlinear inverse transforming which is the inverse transforming of the nonlinear transforming by the nonlinear transforming units 162R through 162B, respectively. The nonlinear inverse transforming units 182R through 182B output the nonlinear-inverse transformed pixel values $R_u(p)$, $G_u(p)$, and $B_u(p)$ respectively, to the gamma correction unit 144.

Note that hereafter, in a case wherein there is no need to distinguish each of the nonlinear inverse transforming units 182R through 182B, the nonlinear inverse transforming units 182R through 182B will simply be referred to as the nonlinear inverse transforming unit 182.

Figure 8:
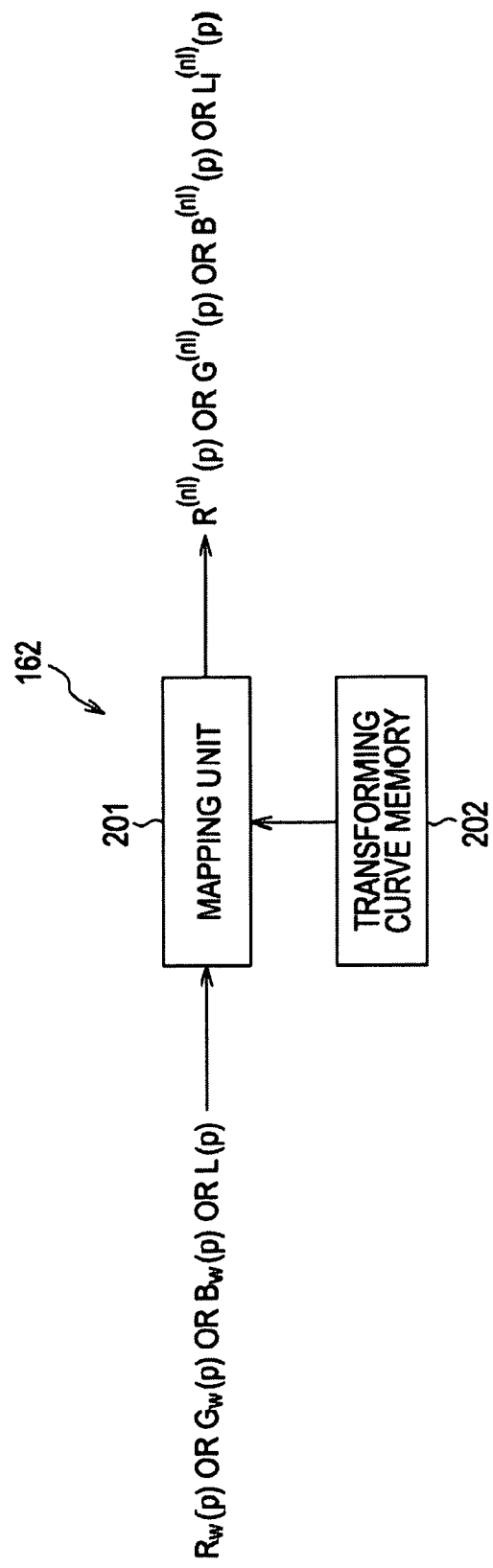
FIG. 8 is a block diagram illustrating a functional configuration example of the nonlinear transforming unit in FIG. 7.

FIG. 8 is a block diagram illustrating a functional configuration example of the nonlinear transforming unit 162 in FIG. 7. The nonlinear transforming unit 162 is configured so as to include a mapping unit 201 and transforming curve memory 202.

The mapping unit 201 subjects a pixel value or brightness value input externally to nonlinear transforming based on the look-up table representing the transforming curve stored in the transforming curve memory 202. The mapping unit 201 externally outputs the nonlinear-transformed pixel value or brightness value.

Figure 9:
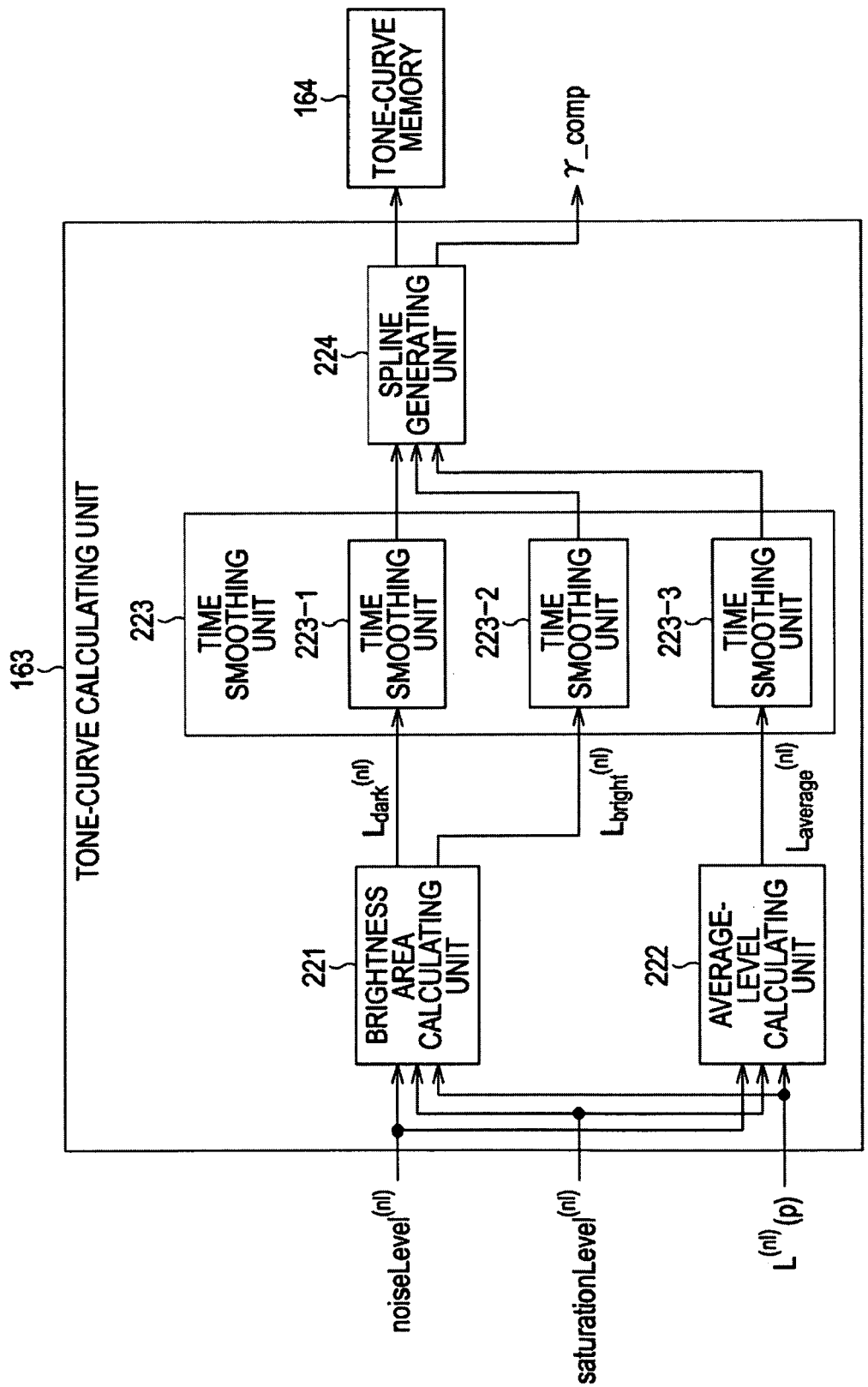
FIG. 9 is a block diagram illustrating a functional configuration example of the tone curve calculating unit in FIG. 7.

FIG. 9 is a block diagram illustrating a functional configuration example of the tone-curve calculating unit 163 in FIG. 7. The tone-curve calculating unit 163 is configured so as to include a brightness area calculating unit 221, an average-level calculating unit 222, a time smoothing unit 223, and a spline generating unit 224. Also, the time smoothing unit 223 includes three time smoothing units of time smoothing units 223-1 through 223-3.

The brightness area calculating unit 221 acquires the brightness value $L^{(n1)}(p)$ from the nonlinear transforming unit 162L. Also, the brightness area calculating unit 221 reads in noiseLevel$^{(n1)}$ indicating the noise level of a brightness value, and saturationLevel$^{(n1)}$ indicating the saturation level of a brightness value from the unshown internal memory of the DSP 116. As described later with reference to FIG. 30, with the distribution of the brightness value $L^{(n1)}(p)$, the brightness area calculating unit 221 calculates a base value $L_{dark}^{(n1)}$ which is a boundary value wherein the rate of the number of pixels of brightness, which is equal to or smaller than a predetermined boundary value, occupied to the entire number of pixels is generally a predetermined value (e.g., 0.5), and a base value $L_{brigt}^{(n1)}$ which is a boundary value wherein the rate of the number of pixels of brightness, which is equal to or greater than a predetermined boundary value, occupied to the entire number of pixels is generally a predetermined value (e.g., 0.5). The brightness area calculating unit 221 outputs the base value $L_{dark}^{(n1)}$ to the time smoothing unit 223-1, and outputs the base value $L_{bright}^{(n1)}$ to the time smoothing unit 223-2.

The average-level calculating unit 222 acquires the brightness value $L^{(n1)}(p)$ from the nonlinear transforming unit 162L. Also, the average-level calculating unit 222 reads in noiseLevel$^{(n1)}$ and saturationLevel$^{(n1)}$ from the unshown internal memory of the DSP 116. As described later with reference to FIG. 30, the average-level calculating unit 222 calculates the average level $L_{average}^{(n1)}$ of the brightness value $L^{(n1)}(p)$. The average-level calculating unit 222 outputs the calculated average level $L_{average}^{(n1)}$ to the time smoothing unit 223-3.

The time smoothing units 223-1 through 223-3 are configured of, for example, an IIR (Infinite Impulse Response) filter. The time smoothing unit 223-1 subjects the base value $L_{dark}^{(n1)}$ to time smoothing, and outputs the base value $L_{dark}^{(n1)}$ subjected to time smoothing to the spline generating unit 224. The time smoothing unit 223-2 subjects the base value $L_{bright}^{(n1)}$ to time smoothing, and outputs the base value $L_{bright}^{(n1)}$ subjected to time smoothing to the spline generating unit 224. The time smoothing unit 223-3 subjects the average level $L_{average}^{(n1)}$ to time smoothing, and outputs the average level $L_{average}^{(n1)}$ subjected to time smoothing to the spline generating unit 224.

Note that hereafter, in a case wherein there is no need to distinguish each of the time smoothing units 223-1 through 223-3, the time smoothing units 223-1 through 223-3 will simply be referred to as the time smoothing unit 223.

As described later with reference to FIG. 30, the spline generating unit 224 generates (calculates) a tone curve based on a base value $L_{dark-ts}^{(n1)}$ base value $L_{bright-ts}^{(n1)}$, and average level $L_{average}^{(n1)}$. The spline generating unit 224 stores the look-up table representing the generated tone curve in the tone-curve memory 164. Also, the spline generating unit 224 outputs the γ_comp parameter to the contrast gain-curve calculating unit 165.

Figure 10:
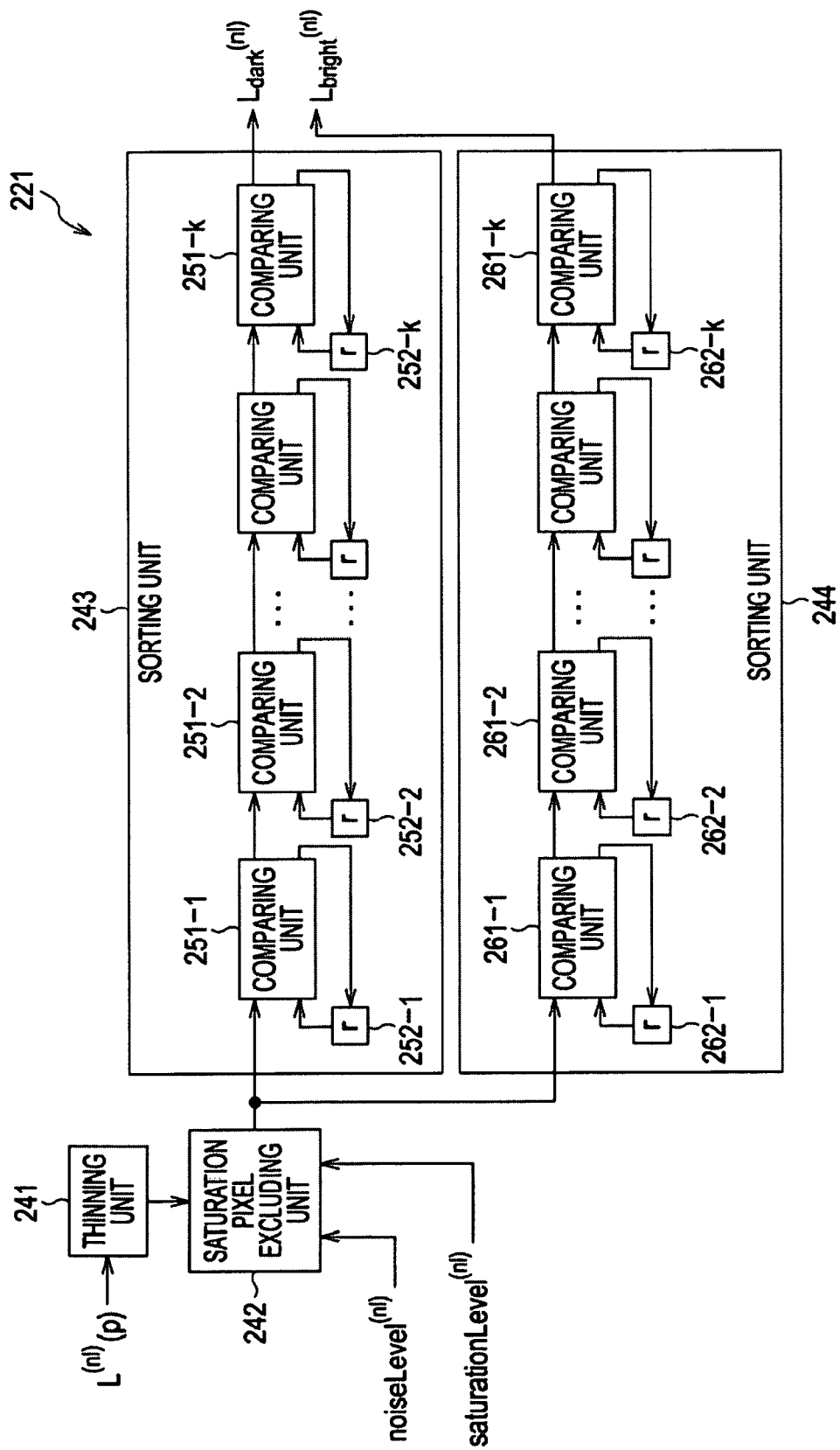
FIG. 10 is a block diagram illustrating a functional configuration example of the brightness-area calculating unit in FIG. 9.

FIG. 10 is a diagram illustrating a functional configuration example of the brightness area calculating unit 221 in FIG. 9. The brightness area calculating unit 221 is configured so as to include a thinning unit 241, a saturation pixel excluding unit 242, a sorting unit 243, and a sorting unit 244.

The thinning unit 241 determines whether or not the pixel position p of the brightness value $L^{(n1)}(p)$ input from the nonlinear transforming unit 162L is identical to a sampling position provided for each predetermined interval, and in the case of determining that the pixel position p is identical to a sampling position, outputs the brightness value $L^{(n1)}(p)$ to the saturation pixel excluding unit 242.

The saturation pixel excluding unit 242 reads in noiseLevel$^{(n1)}$ and saturationLevel$^{(n1)}$ from the unshown internal memory of the DSP 116. In the case of determining that the brightness value $L^{(n1)}(p)$ is equal to or greater than a predetermined noiseLevel$^{(n1)}$ and also equal to or smaller than saturationLevel$^{(n1)}$, the saturation pixel excluding unit 242 outputs the brightness value $L^{(n1)}(p)$ to the sorting units 243 and 244.

The sorting unit 243 is configured so as to include comparing units 251-1 through 251-$k$, and resistors 252-1 through 252-$k$ corresponding to the respective comparing units. Note that hereafter, in a case wherein there is no need to distinguish each of the comparing units 251-1 through 251-$k$, the comparing units 251-1 through 251-$k$ will simply be referred to as the comparing unit 251, and in a case wherein there is no need to distinguish each of the resistors 252-1 through 252-$k$, the resistors 252-1 through 252-$k$ will simply be referred to as the resistor 252.

The comparing unit 251-1 compares the brightness value $L^{(n1)}(p)$ input from the saturation pixel excluding unit 242 and the value of the resistor 252-1. In a case wherein the brightness value $L^{(n1)}(p)$ is smaller than the value of the resistor 252-1, the comparing unit 251-1 outputs the current value of the resistor 252-1 to the comparing unit 251-2 of the subsequent stage, and stores the brightness value $L^{(n1)}(p)$ to the resistor 252-1. In a case wherein the brightness value $L^{(n1)}(p)$ is equal to or greater than the value of the resistor 252-1, the comparing unit 251-1 outputs the brightness value $L^{(n1)}(p)$ as is to the comparing unit 251-2 of the subsequent stage.

The comparing unit 251-2 compares the value input from the comparing unit 251-1 of the previous stage and the value of the resistor 252-2. In a case wherein the value input from the comparing unit 251-1 is smaller than the value of the resistor 252-2, the comparing unit 251-2 outputs the value of the resistor 252-2 to the comparing unit 251-3 of the subsequent stage, and stores the value input from the comparing unit 251-1 to the resistor 252-2. In a case wherein the value input from the comparing unit 251-1 is equal to or greater than the value of the resistor 252-2, the comparing unit 251-2 outputs the value input from the comparing unit 251-1 as is to the comparing unit 251-3 of the subsequent stage. The comparing units 251-3 through 251-$k$ also perform the same processing as that of the comparing unit 251-2. As a result thereof, of the input brightness value $L^{(n1)}(p)$, from the minimum value to the k'th small value are stored in the registers 252-1 through 252-$k$ in ascending order.

After sorting of the brightness value $L^{(n1)}(p)$ of an image equivalent to one frame, the sorting unit 243 outputs the value stored in the resistor 252-$k$ to the time smoothing unit 223-1 as the base value $L_{dark}^{(n1)}$.

The sorting unit 244 is configured so as to include comparing units 261-1 through 261-$k$, and resistors 262-1 through 262-$k$ corresponding to the respective comparing units. Note that hereafter, in a case wherein there is no need to distinguish each of the comparing units 261-1 through 261-$k$, the comparing units 261-1 through 261-$k$ will simply be referred to as the comparing unit 261, and in a case wherein there is no need to distinguish each of the resistors 262-1 through 262-$k$, the resistors 262-1 through 262-$k$ will simply be referred to as the resistor 262.

The comparing unit 261-1 compares the brightness value $L^{(n1)}(p)$ input from the saturation pixel excluding unit 242 and the value of the resistor 262-1. In a case wherein the brightness value $L^{(n1)}(p)$ is greater than the value of the resistor 262-1, the comparing unit 261-1 outputs the current value of the resistor 262-1 to the comparing unit 261-2 of the subsequent stage, and stores the brightness value $L^{(n1)}(p)$ to the resistor 262-1. In a case wherein the brightness value $L^{(n1)}(p)$ is equal to or smaller than the value of the resistor 262-1, the comparing unit 261-1 outputs the brightness value $L^{(n1)}(p)$ as is to the comparing unit 261-2 of the subsequent stage.

The comparing unit 261-2 compares the value input from the comparing unit 261-1 of the previous stage and the value of the resistor 262-2. In a case wherein the value input from the comparing unit 261-1 is greater than the value of the resistor 262-2, the comparing unit 261-2 outputs the value of the resistor 262-2 to the comparing unit 261-3 of the subsequent stage, and stores the value input from the comparing unit 261-1 to the resistor 262-2. In a case wherein the value input from the comparing unit 261-1 is equal to or smaller than the value of the resistor 262-2, the comparing unit 261-2 outputs the value input from the comparing unit 261-1 as is to the comparing unit 261-3 of the subsequent stage. The comparing units 261-3 through 261-$k$ also perform the same processing as that of the comparing unit 261-2. As a result thereof, of the input brightness value $L^{(n1)}(p)$, from the maximum value to the k'th great value are stored in the registers 262-1 through 262-$k$ in descending order.

After sorting of the brightness value $L^{(n1)}(p)$ of an image equivalent to one frame, the sorting unit 244 outputs the value stored in the resistor 262-$k$ to the time smoothing unit 223-2 as the base value $L_{bright}^{(n1)}$.

Figure 11:
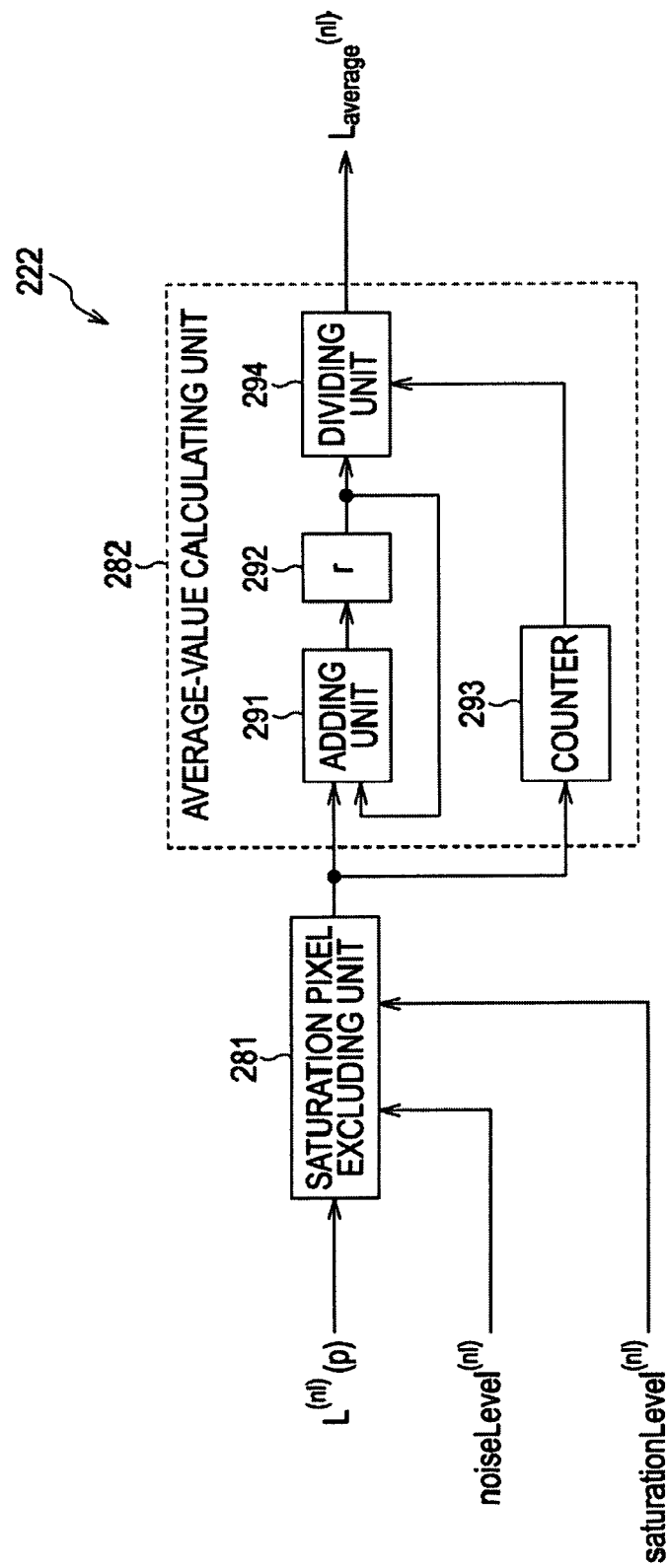
FIG. 11 is a block diagram illustrating a functional configuration example of the average-level calculating unit in FIG. 9.

FIG. 11 is a block diagram illustrating a functional configuration example of the average-level calculating unit 222 in FIG. 9. The average-level calculating unit 222 is configured so as to include a saturation pixel excluding unit 281 and an average-value calculating unit 282.

The saturation pixel excluding unit 281 reads in noise-Level$^{(n1)}$ and saturationLevel$^{(n1)}$ from the unshown internal memory of the DSP 116. In the case of determining that the brightness value $L^{(n1)}(p)$ input from the nonlinear transforming unit 162L is equal to or greater than a predetermined noiseLevel$^{(n1)}$ and also equal to or smaller than saturationLevel$^{(n1)}$, the saturation pixel excluding unit 281 outputs the brightness value $L^{(n1)}(p)$ to the adding unit 291 and counter 293 of the average-value calculating unit 282.

The average-value calculating unit 282 is configured so as to include the adding unit 291, resistor 292, counter 293, and dividing unit 294.

The adding unit 291 adds the brightness value $L^{(n1)}(p)$ input from the saturation pixel excluding unit 281 to the value stored in the resistor 292, and stores the result thereof in the resistor 292. That is to say, a brightness sum value that is the sum value of the brightness value $L^{(n1)}(p)$ is stored in the resistor 292.

The counter 293 increments the value of the counter by one each time the brightness value $L^{(n1)}(p)$ is input from the saturation pixel excluding unit 281, and counts the number of the brightness value $L^{(n1)}(p)$ added to the brightness sum value stored in the resistor 292.

The dividing unit 294 calculates the average level $L_{average}^{(n1)}$ of the brightness value $L^{(n1)}(p)$ by dividing the value of the resistor 292 by the counter value of the counter 293 after adding the brightness value $L^{(n1)}(p)$ of an image equivalent to one frame. The diving unit 294 outputs the average level $L_{average}^{(n1)}$ to the time smoothing unit 223-3.

Figure 12:
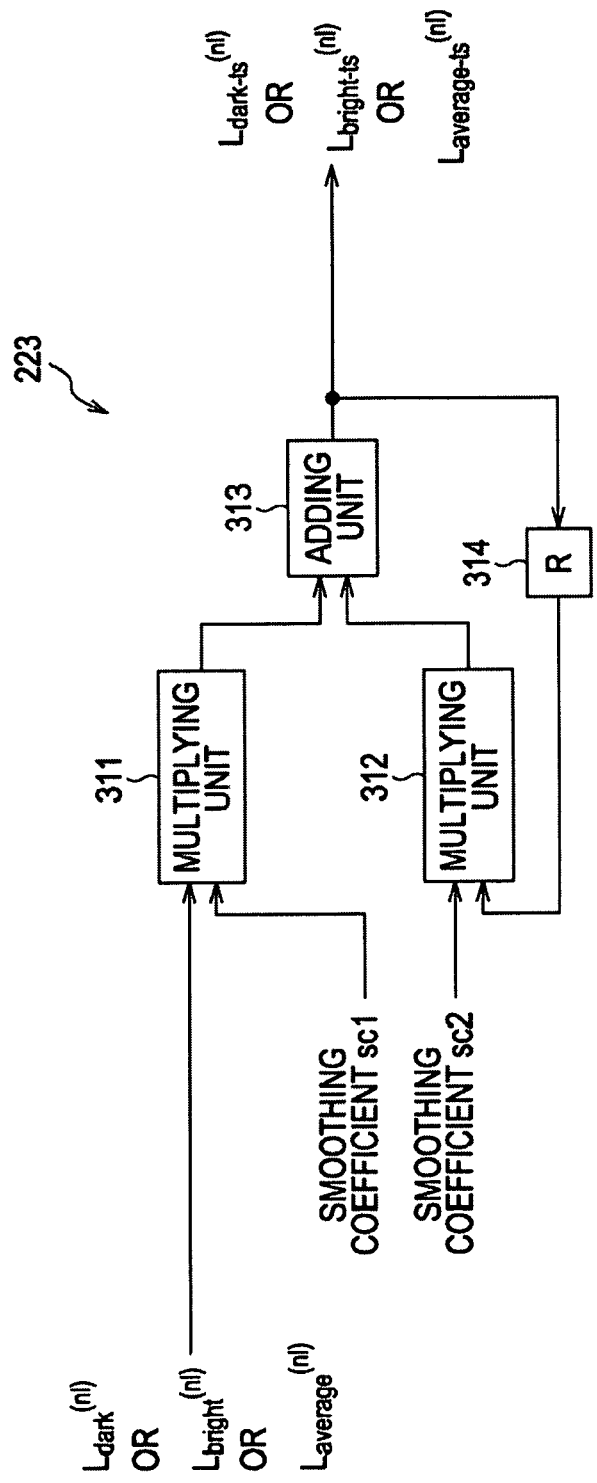
FIG. 12 is a block diagram illustrating a functional configuration example of the time smoothing unit in FIG. 9.

FIG. 12 is a block diagram illustrating a functional configuration example of the time smoothing unit 223 in FIG. 9. The time smoothing unit 223 is configured so as to include a multiplying unit 311, a multiplying unit 312, an adding unit 313, and a resistor 314.

The multiplying unit 311 reads in a predetermined smoothing coefficient sc1 from the unshown internal memory of the DSP 116. The multiplying unit 311 outputs the value obtained by multiplying the value externally input (e.g., base value $L_{dark}^{(n1)}$ base value $L_{bright}^{(n1)}$, or average level $L_{average}^{(n1)}$) by the smoothing coefficient sc1 to the adding unit 313.

The multiplying unit 311 reads in a predetermined smoothing coefficient sc2 from the unshown internal memory of the DSP 116. The multiplying unit 311 outputs the value obtained by multiplying the value stored in the resistor 314 (e.g., base value $L_{dark\text{-}ts\text{-}pre}^{(n1)}$, base value $L_{bright\text{-}ts\text{-}pre}^{(n1)}$, or average level $L_{average\text{-}ts\text{-}pre}^{(n1)}$ subjected to time smoothing corresponding to the frame before the current frame) by the smoothing coefficient sc2 to the adding unit 313.

The adding unit 313 externally outputs the value to which the value input from the multiplying units 311 and 312 is added (e.g., base value $L_{dark\text{-}ts}^{(n1)}$, base value $L_{bright\text{-}ts}^{(n1)}$, or average level $L_{average\text{-}ts}^{(n1)}$ subjected to time smoothing), and stores this to the resistor 314.

Figure 13:
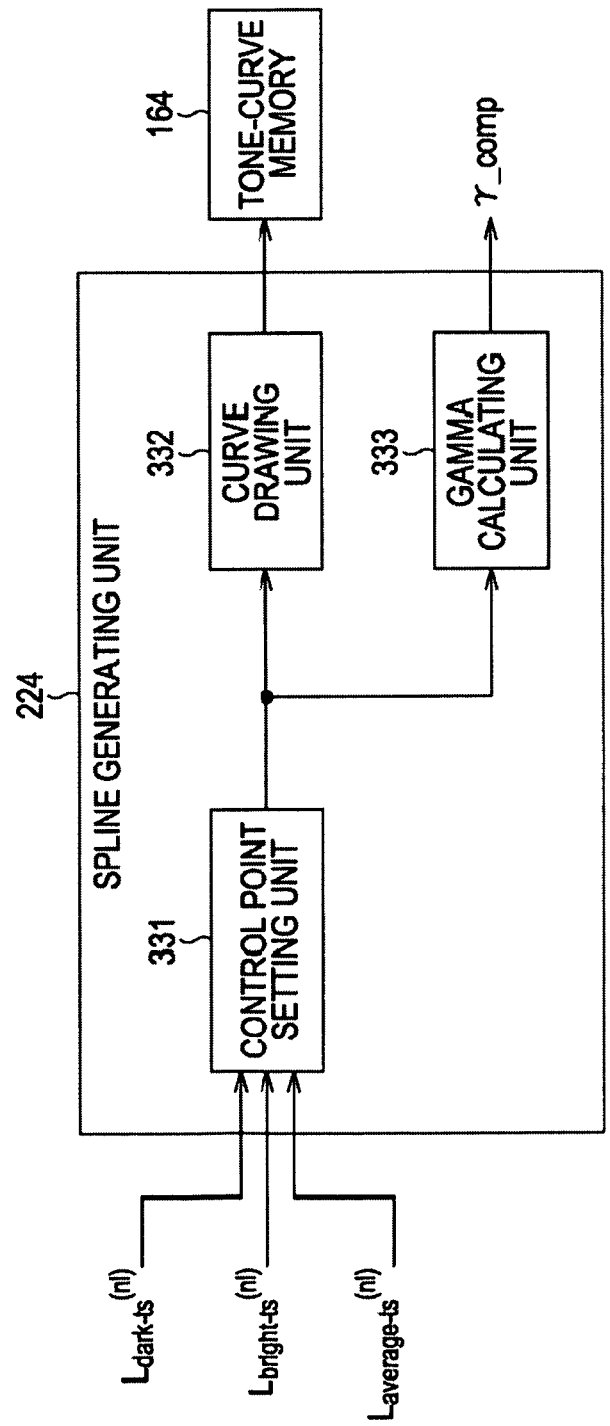
FIG. 13 is a block diagram illustrating a functional configuration example of the spline generating unit in FIG. 9.

FIG. 13 is a block diagram illustrating a functional configuration example of the spline generating unit 224 in FIG. 9. The spline generating unit 224 is configured so as to include a control point setting unit 331, a curve drawing unit 332, and a gamma calculating unit 333.

The control point setting unit 331 acquires the base value $L_{dark\text{-}ts}^{(n1)}$ from the time smoothing unit 223-1, acquires the base value $L_{bright\text{-}ts}^{(n1)}$ from the time smoothing unit 223-2, and acquires the average level $L_{average\text{-}ts}^{(n1)}$ from the time smoothing unit 223-3. As described later with reference to FIG. 30, the control point setting unit 331 sets a control point for generating (calculating) a tone curve, and outputs a control point set indicating the position of the set control point to the curve drawing unit 332 and gamma calculating unit 333.

As described later with reference to FIG. 30, the curve drawing unit 332 generates (calculates) a tone curve based on the control point set by the control point setting unit 331. The curve drawing unit 332 stores the look-up table representing the generated tone curve in the tone-curve memory 164.

As described later with reference to FIG. 30, the gamma calculating unit 333 calculates a γ_comp parameter. The gamma unit 333 outputs the γ_comp parameter to the contrast gain-curve calculating unit 163.

Figure 14:
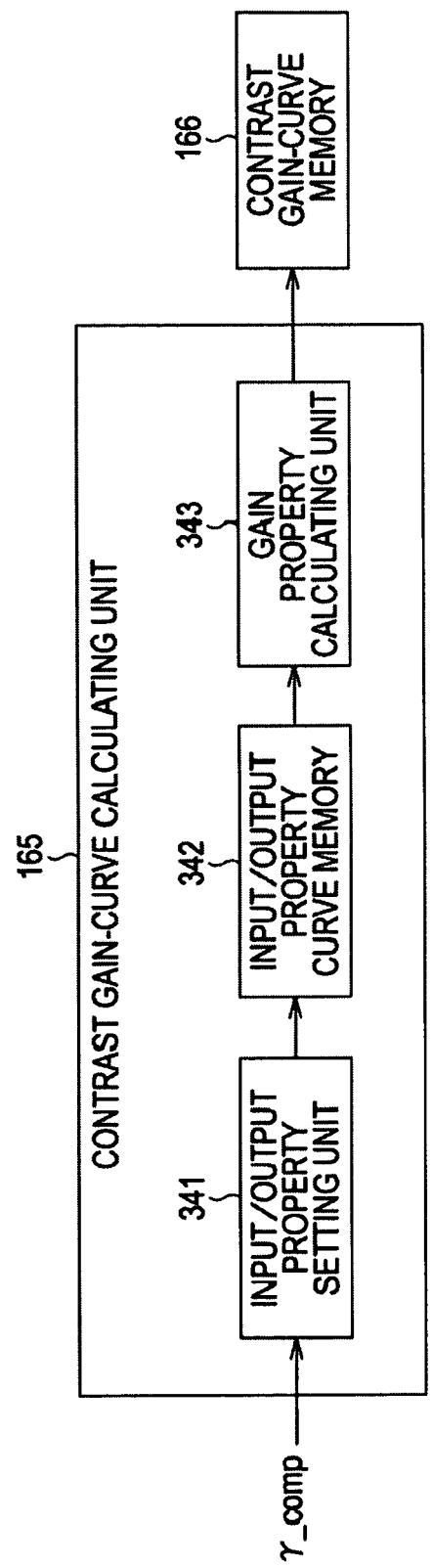
FIG. 14 is a block diagram illustrating a functional configuration example of the contrast gain curve calculating unit in FIG. 7.

FIG. 14 is a diagram illustrating a functional configuration example of the contrast gain-curve calculating unit 165 in FIG. 7. The contrast gain-curve calculating unit 165 is configured so as to include an input/output property setting unit 341, an input/output property curve memory 342, and a gain properties calculating unit 343.

As described later with reference to FIGS. 32 and 33, the input/output property setting unit 341 generates an input/output property curve representing input/output properties, assuming that the difference value (hereafter, also referred to as the input contrast component) between the brightness value $L_c^{(n1)}(p)$ before the contrast correction and the overall brightness value $L_{c1}^{(n1)}(p)$ is taken as input, and the difference value (hereafter, also referred to as the output contrast component) between the brightness value $L_c^{(n1)}(p)$ after the contrast correction and the overall brightness value $L_{c1}^{(n1)}(p)$ is taken as output. The input/output property setting unit 341 stores the look-up table representing the generated input/output property curve in the input/output property curve memory 342.

The gain properties calculating unit 343 reads out the look-up table representing the input/output property curve from the input/output property curve memory 342. As described later with reference to FIGS. 32 and 33, the gain properties calculating unit 343 generates a contrast gain curve representing the relation between an input contrast component and the gain value g(p) employed for subjecting the brightness value $L_c^{(n1)}$(p) to contrast correction based on the input/output property curve. The gain properties calculating unit 343 stores the look-up table representing the generated contrast gain curve in the contrast gain-curve memory 166.

Figure 15:
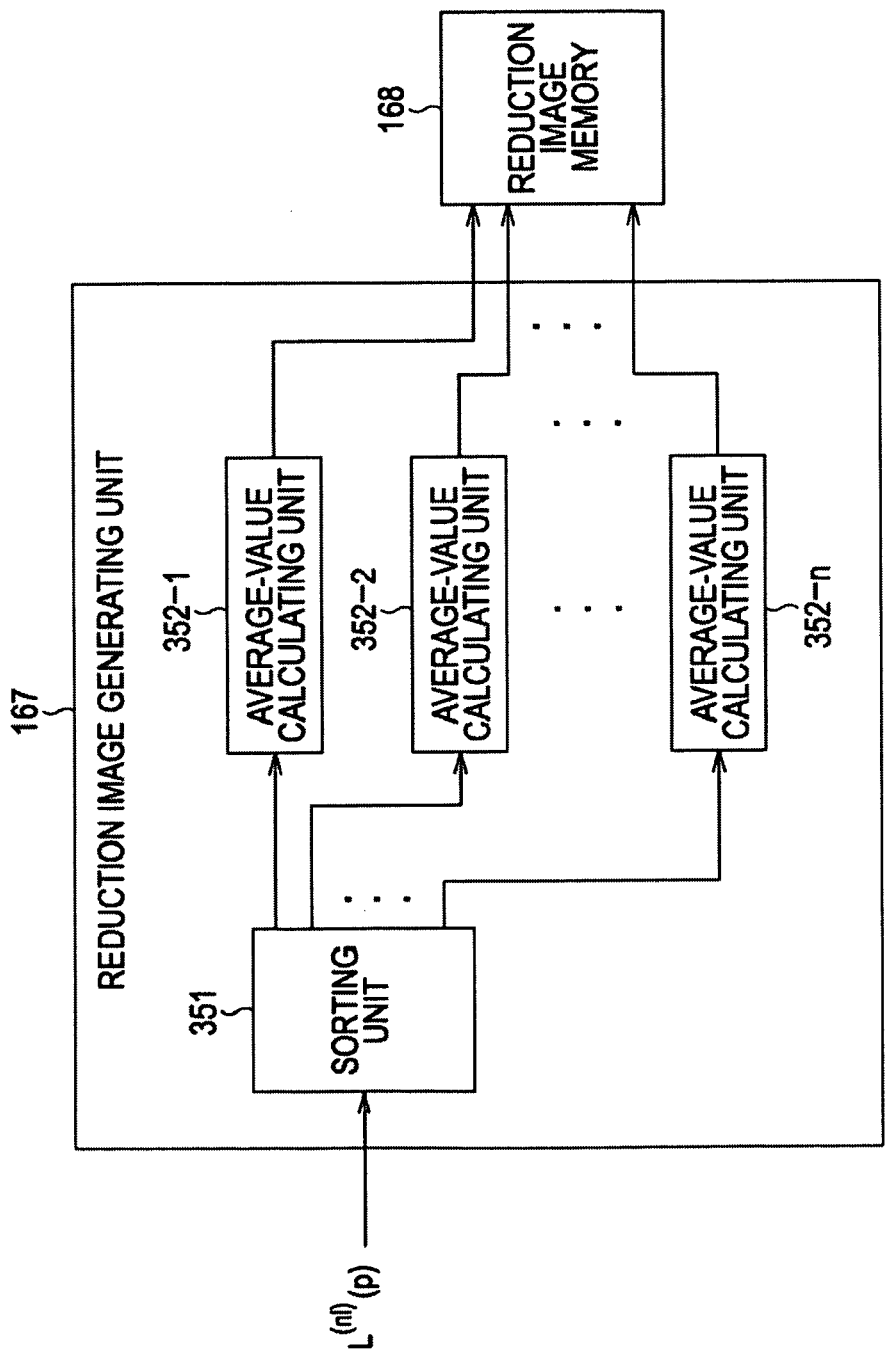
FIG. 15 is a block diagram illustrating a functional configuration example of the reduction image generating unit in FIG. 7.

FIG. 15 is a diagram illustrating a functional configuration example of the reduction image generating unit 167 in FIG. 7. The reduction image generating unit 167 is configured so as to include a sorting unit 351, and average-value calculating units 352-1 through 352-*n*.

The sorting unit 351 divides the image made up of the brightness value $L^{(n1)}(p)$ into horizontally $w_r$ × vertically $h_r$ blocks, and determines whether the pixel position p of the brightness value $L^{(n1)}(p)$ input from the nonlinear transforming unit 162L is included in which block. Of the average-value calculating units 352-1 through 352-*n*, the sorting unit 351 outputs the brightness value $L^{(n1)}(p)$ to the average-value calculating unit for calculating the average value of the brightness values of the block including the pixel position p.

The average-value calculating units 352-1 through 352-*n* have the same configuration as the average-value calculating unit 282 in FIG. 11, and calculate the average value of the brightness value $L^{(n1)}(p)$ included in the block to be processed by each of the average-value calculating units. The average-value calculating units 352-1 through 352-*n* store the average value of the brightness of the calculated block so as to be disposed in the same order as the corresponding block on the reduction image memory 168. Thus, the reduction image of horizontally $w_r$ × vertically $h_r$ pixels made up of the average value of the brightness value $L^{(n1)}(p)$ for each block is generated on the reduction image memory 168.

Figure 16:
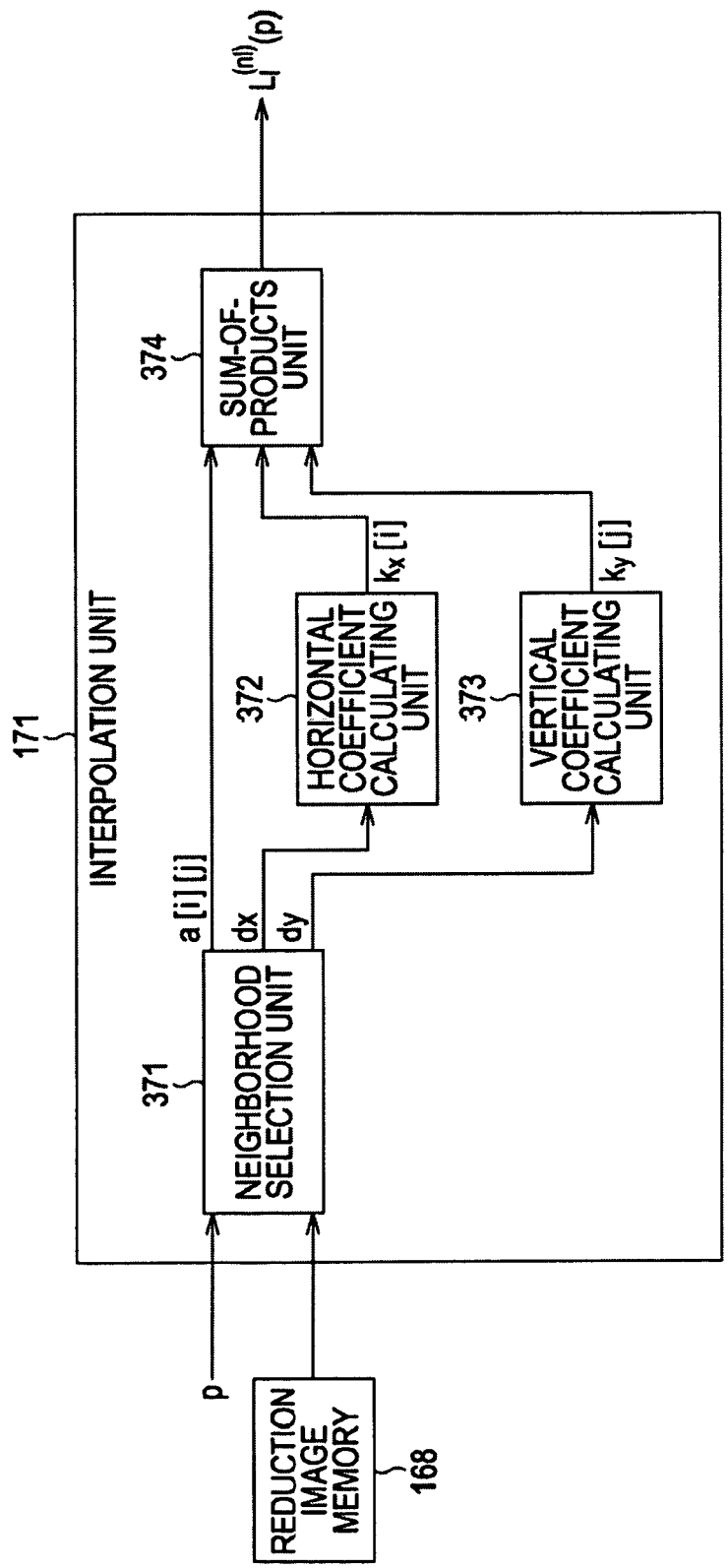
FIG. 16 is a block diagram illustrating a functional configuration example of the interpolation unit in FIG. 7.

FIG. 16 is a block diagram illustrating a functional configuration example of the interpolation unit 171. The interpolation unit 171 is configured so as to include a neighborhood selection unit 371, a horizontal coefficient calculating unit 372, a vertical coefficient calculating unit 373, and a sum-of-products unit 374.

The neighborhood selection unit 371 acquires from the nonlinear transforming unit 162L the pixel position p of the pixel nonlinear-transformed by the nonlinear transforming unit 162L. As described later with reference to FIG. 26, the neighborhood selection unit 371 calculates a position q on the reduction image corresponding to the pixel position p. The neighborhood selection unit 371 extracts a neighborhood pixel which is a pixel disposed within a range of horizontally 4×vertically 4 pixels near the position p. The neighborhood selection unit 371 outputs the pixel values of the neighborhood pixel a [i][j] (1≤i≤4, 1≤j≤4, however, i and j are natural numbers) to the sum-of-products unit 374. Also, the neighborhood selection unit 371 calculates a positional deviation amount dx in the horizontal direction between the pixel position p and the neighborhood pixel, and a positional deviation amount dy in the vertical direction. The neighborhood selection unit 371 outputs the positional deviation amount dx in the horizontal direction to the horizontal coefficient calculating unit 372, and outputs the positional deviation amount dy in the vertical direction to the vertical coefficient calculating unit 373.

As described later with reference to FIG. 26, the horizontal coefficient calculating unit 372 calculates a cubic interpolation coefficient kx[i] in the horizontal direction (1≤i≤4, however, i is a natural number) based on the positional deviation amount dx in the horizontal direction. The horizontal coefficient calculating unit 372 outputs the interpolation coefficient kx[i] to the sum-of-products unit 374.

As described later with reference to FIG. 26, the vertical coefficient calculating unit 373 calculates a cubic interpolation coefficient ky[j] in the vertical direction (1≤j≤4, however, j is a natural number) based on the positional deviation amount dy in the vertical direction. The vertical coefficient calculating unit 373 outputs the interpolation coefficient ky[j] to the sum-of-products unit 374.

As described later with reference to FIG. 26, the sum-of-products unit 374 calculates an overall brightness value $L_1^{(n1)}(p)$ which is the brightness value of an overall brightness image enlarged to the original size (the number of pixels) by subjecting the reduction image to cubic interpolation using the pixel value a[i][j] of the neighborhood pixel, the interpolation coefficient kx[i] in the horizontal direction, and the interpolation coefficient ky[j] in the vertical direction. The sum-of-products unit 374 outputs the overall brightness value $L_1^{(n1)}(p)$ to the mapping unit 172-2.

Figure 17:
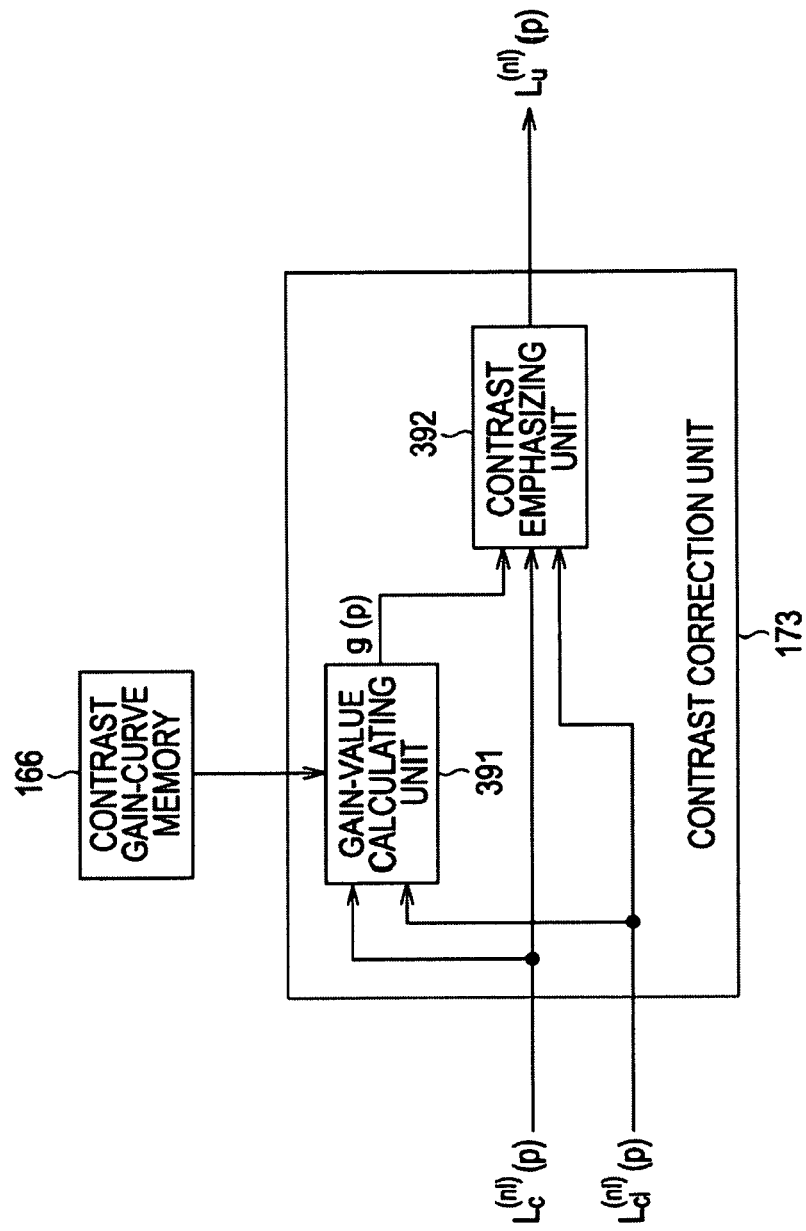
FIG. 17 is a block diagram illustrating a functional configuration example of the contrast correction unit in FIG. 7.

FIG. 17 is a block diagram illustrating a functional configuration example of the contrast correction unit 173 in FIG. 7. The contrast correction unit 173 is configured so as to include a gain-value calculating unit 391, and a contrast emphasizing unit 392.

The gain-value calculating unit 391 acquires the brightness value $L_c^{(n1)}(p)$ from the mapping unit 172-1, and acquires the overall brightness value $L_{c1}^{(n1)}(p)$ from the mapping unit 172-2. Also, the gain-value calculating unit 391 reads out the look-up table representing the contrast gain curve from the contrast gain-curve memory 166. As described later with reference to FIG. 29, the gain-value calculating unit 391 calculates the gain value g(p) employed for subjecting the brightness value $L_c^{(n1)}(p)$ to contrast correction based on the brightness value $L_c^{(n1)}(p)$, overall brightness value $L_{c1}^{(n1)}(p)$, and the contrast gain curve. The gain-value calculating unit 391 outputs the calculated gain value g(p) to the contrast emphasizing unit 392.

The contrast emphasizing unit 392 acquires the brightness value $L_c^{(n1)}(p)$ from the mapping unit 172-1, and acquires the overall brightness value $L_{c1}^{(n1)}(p)$ from the mapping unit 172-2. As described later with reference to FIG. 28, the contrast emphasizing unit 392 performs contrast correction so as to emphasize the contrast of the image made up of the suppressed brightness value $L_c^{(n1)}(p)$ of which the gray level has been compressed. The contrast emphasizing unit 392 outputs the contrast-corrected brightness value $L_u^{(n1)}(p)$ to the gray level correction units 181R through 181B.

Figure 18:
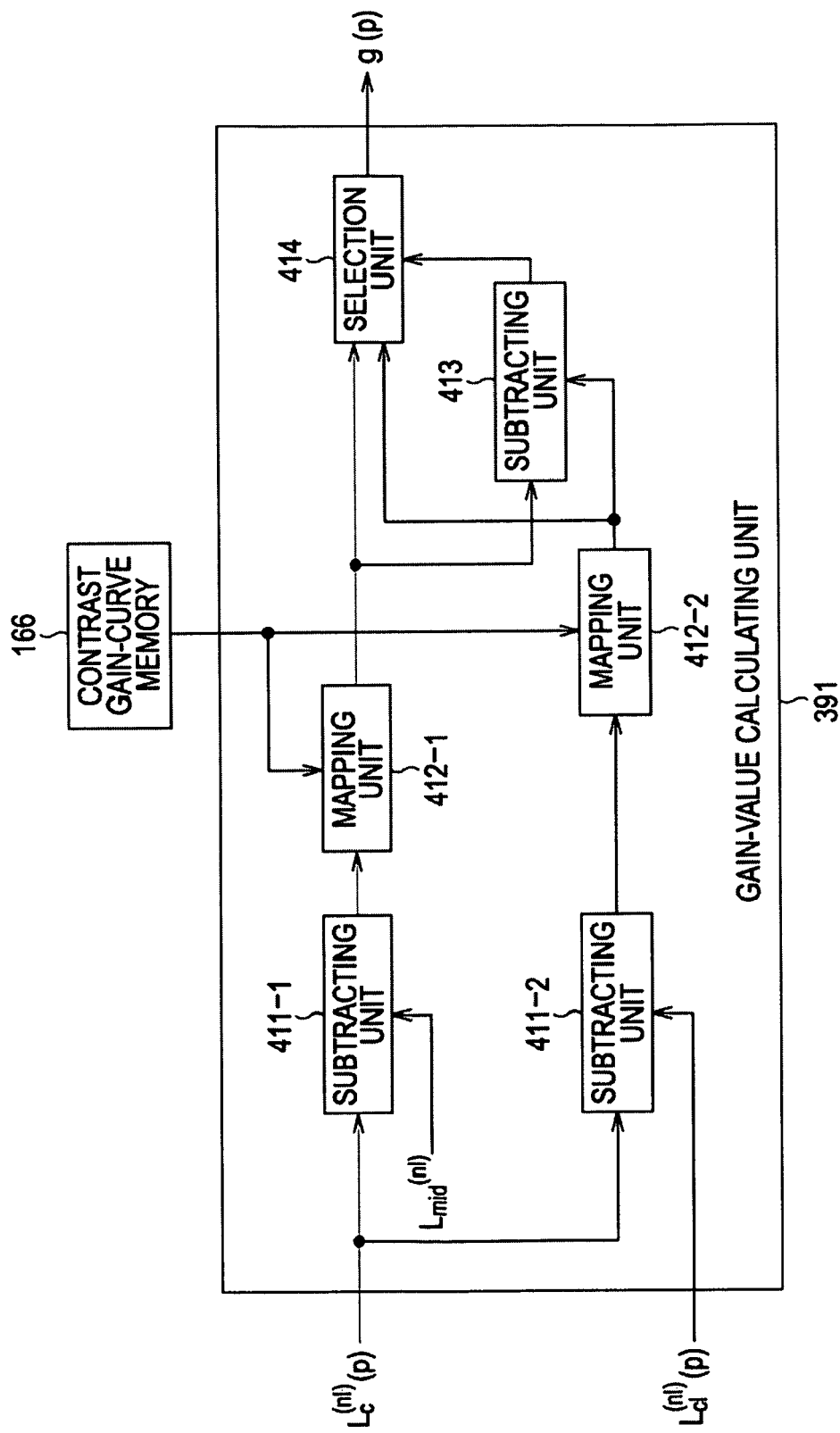
FIG. 18 is a block diagram illustrating a functional configuration example of the gain-value calculating unit in FIG. 17.

FIG. 18 is a block diagram illustrating a functional configuration example of the gain-value calculating unit 391 in FIG. 17. The gain-value calculating unit 391 is configured so as to include subtracting units 411-1 and 411-2, mapping units 412-1 and 412-2, a subtracting unit 413, and a selection unit 414.

The subtracting unit 411-1 calculates the difference between the brightness value $L_c^{(n1)}(p)$ of which the gray level has been compressed, and a predetermined intermediate brightness level $L_c^{(n1)}$ equivalent to generally the middle of the range that the brightness value $L_c^{(n1)}(p)$ can take, and supplies the calculated difference value to the mapping unit 412-1.

The subtracting unit 411-2 calculates the difference between the brightness value $L_c^{(n1)}(p)$ of which the gray level has been compressed and the overall brightness value $L_{c1}^{(n1)}(p)$, and supplies the calculated difference value to the mapping unit 412-2.

The mapping unit 412-1 reads in the look-up table representing the contrast gain curve from the contrast gain-curve memory 166. The mapping unit 412-1 obtains the gain value g(p) corresponding to the difference value between the brightness value $L_c^{(n1)}(p)$ and the intermediate brightness level $L_{mid}^{(n1)}$ based on the read look-up table, and supplies this to the subtracting unit 413 and selection unit 414.

The mapping unit 412-2 reads in the look-up table representing the contrast gain curve from the contrast gain-curve memory 166. The mapping unit 412-2 obtains the gain value g(p) corresponding to the difference value between the brightness value $L_c^{(n1)}(p)$ and the overall brightness value $L_{c1}^{(n1)}(p)$ based on the read look-up table, and supplies this to the subtracting unit 413 and selection unit 414.

The subtracting unit 413 calculates the difference between the gain value g(p) from the mapping unit 412-1 and the gain value g(p) from the mapping unit 412-2, and supplies the calculated difference value to the selection unit 414.

The selection unit 414 selects the smaller one of the gain value g(p) from the mapping unit 412-1 and the gain value g(p) from the mapping unit 412-2 based on the signs of the obtained difference values, and supplies this to the contrast emphasizing unit 392.

Figure 19:
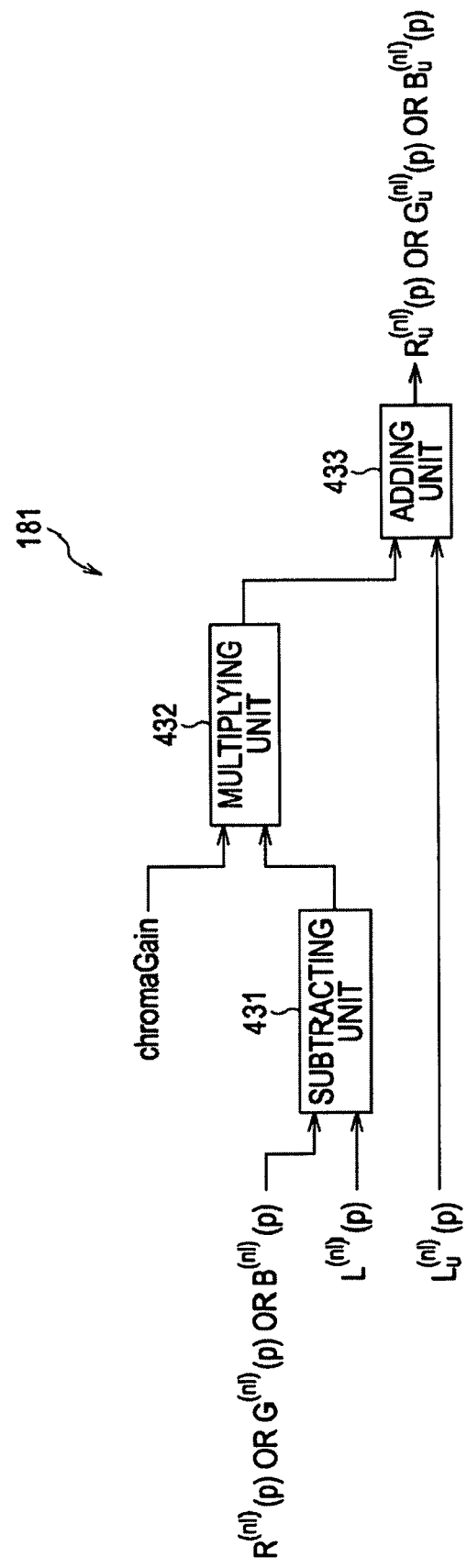
FIG. 19 is a block diagram illustrating a functional configuration example of the contrast emphasizing unit in FIG. 17.

FIG. 19 is a block diagram illustrating a functional configuration example of the gray level correction unit 181 in FIG. 7. The gray level correction unit 181 is configured so as to include a subtracting unit 431, a multiplying unit 432, and an adding unit 433.

The subtracting unit 431 calculates the difference value obtained by subtracting the nonlinear-transformed brightness value $L^{(n1)}(p)$ before gray level correction from the nonlinear-transformed pixel value $R^{(n1)}(p)$, $G^{(n1)}(p)$, or $B^{(n1)}(p)$, and supplies the calculated difference value to the multiplying unit 432.

The multiplying unit 432 multiplies the difference value calculated at the subtracting unit 431 by chromaGain which is the coefficient of a predetermined value for adjusting the saturation of each component of R, G, and B, and supplies the multiplication value obtained as a result thereof to the adding unit 433.

The adding unit 433 adds the multiplication value calculated by the multiplying unit 432 and the brightness value $L_u^{(n1)}(p)$ after contrast correction, thereby obtaining a pixel value $R_u^{(n1)}(p)$, $G_u^{(n1)}(p)$, or $B_u^{(n1)}(p)$ wherein the brightness value $L_u^{(n1)}(p)$ after contrast correction is reflected on the nonlinear-transformed pixel value $R^{(n1)}(p)$, $G^{(n1)}(p)$, or $B^{(n1)}(p)$, and outputs this to the nonlinear inverse transforming units 182R through 182B.

Figure 20:
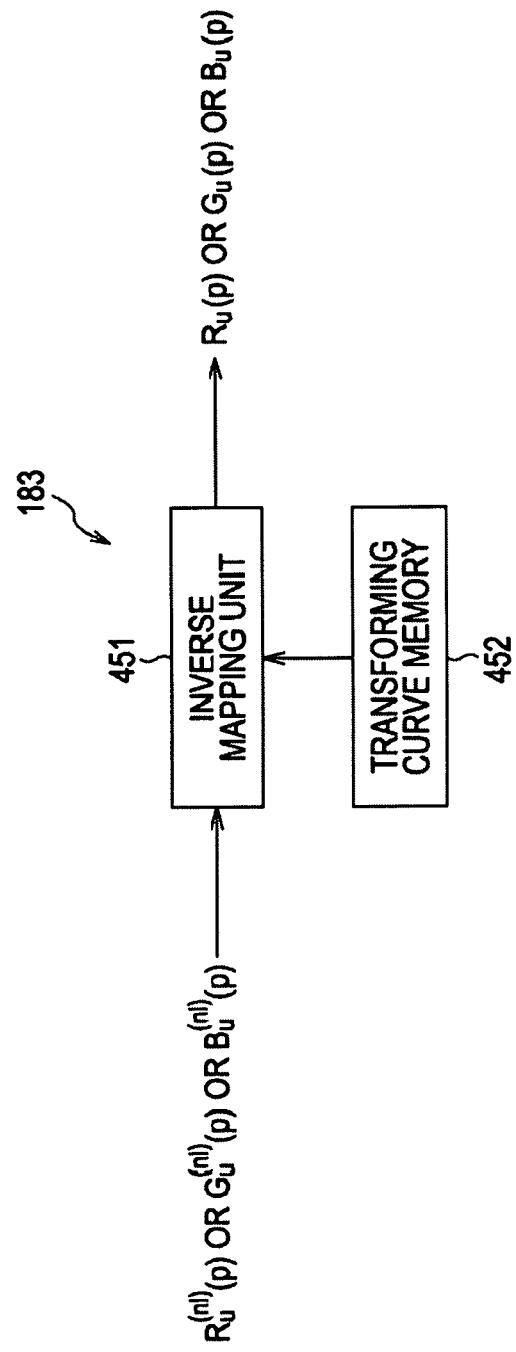
FIG. 20 is a block diagram illustrating a functional configuration example of the nonlinear inverse transforming unit in FIG. 7.

FIG. 20 is a block diagram illustrating a functional configuration example of the nonlinear inverse transforming unit 182. The nonlinear inverse transforming unit 182 is configured so as to include an inverse mapping unit 451, and transforming curve memory 452.

The inverse mapping unit 451 subjects a pixel value externally input to nonlinear transforming inverse transforming which is the inverse transforming of the nonlinear transforming by the nonlinear transforming unit 162 based on the look-up table representing the transforming curve stored in the transforming curve memory 452. The inverse mapping unit 451 externally outputs the nonlinear-inverse transformed pixel value.

Figure 21:
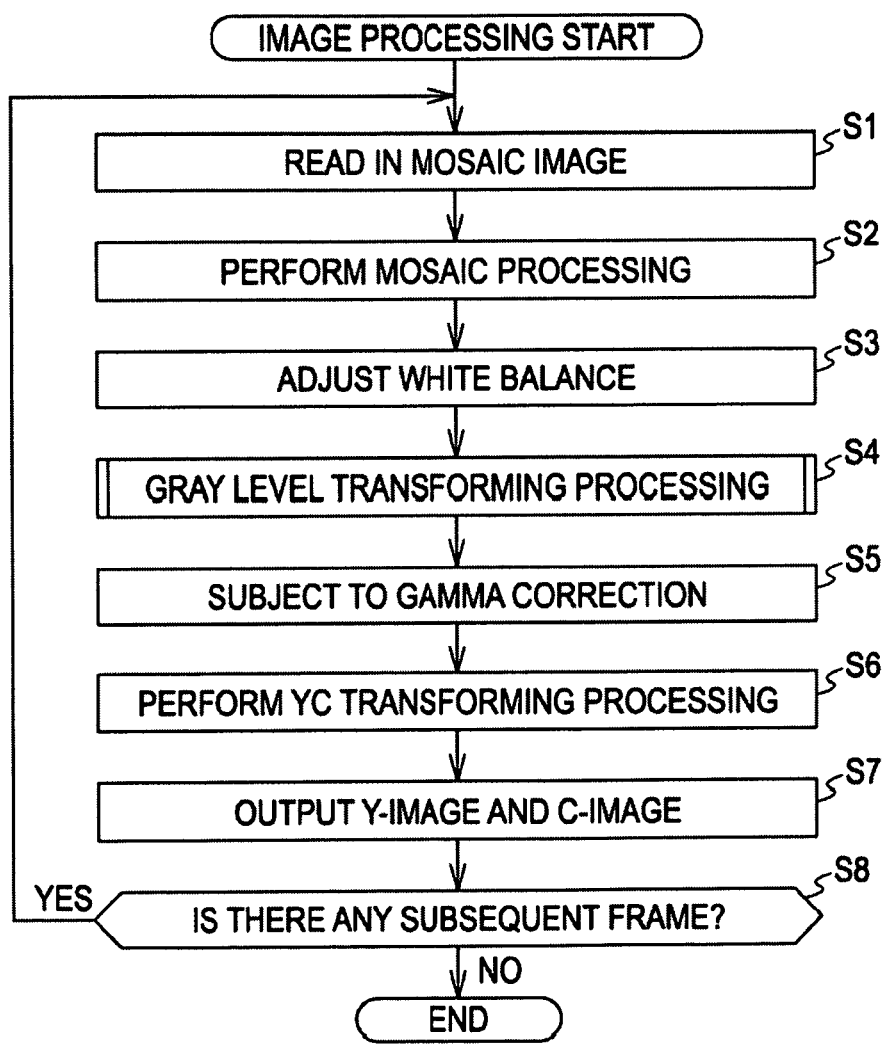
FIG. 21 is a flowchart for describing image processing performed by the DSP block in FIG. 5.

Next, image processing executed by the DSP 116 will be described with reference to the flowchart in FIG. 21. Note that this processing is started, for example, when shooting by the digital video camera 101 is started, and supply of the stream of image data (mosaic image) from the A/D converter 115 to the DSP 116 is started. Note that the image data supplied to the DSP 116 is successively stored in the unshown internal memory of the DSP 116.

In step S1, the demosaic unit 141 reads in a mosaic image. Specifically, the demosaic unit 141 reads in the mosaic image of the top frame stored in the unshown internal memory of the DSP 116.

In step S2, the demosaic unit 141 performs demosaic processing. Specifically, the demosaic unit 141 subjects the read mosaic image to demosaic processing to generate an RGB image. The demosaic unit 141 supplies the generated RGB image to the white balance unit 142.

In step S3, the white balance unit 142 adjusts the white balance of the obtained RGB image. The white balance unit 142 supplies the white-balance-adjusted RGB image to the gray level transformation unit 143.

In step S4, the gray level transformation unit 143 performs gray level transformation processing. The details of the gray level transformation processing will be described later with reference to FIGS. 22 and 23, but according to this processing, the gray level of the RGB image is transformed, and the RGB image of which the gray level has been transformed is supplied to the gamma correction unit 144.

In step S5, the gamma correction unit 144 subjects the RGB image to gamma correction. The gamma correction unit 144 supplies the RGB image subjected to the gamma correction to the YC conversion unit 145.

In step S6, the YC conversion unit 145 performs YC conversion processing. Specifically, the YC conversion unit 145 performs YC matrix processing and band limiting as to a chroma component, thereby generating a Y image and a C image from the RGB image.

In step S7, the YC conversion unit 145 outputs the Y image and C image. Specifically, the YC conversion unit 145 outputs the Y image and C image to the LCD driver 118 or CODEC 120 as necessary.

In step S8, the demosaic unit 141 determines whether or not there is a subsequent frame. In a case wherein the mosaic image of the subsequent frame is accumulated in the unshown internal memory of the DSP 116, the demosaic unit 141 determines that there is a subsequent frame, and the processing returns to step S1.

In step S1, the mosaic image of the next frame is read in, and the read mosaic image is subjected to the processing in step S2 and thereafter.

Subsequently, in step S8, the processing in step S1 through S8 is repeatedly executed until determination is made that there is no subsequent frame, wherein the mosaic image supplied from the A/D converter 115 is subjected to image processing in order one frame at a time.

In step S8, in the case of determining that there is no subsequent frame, the image processing ends.

Next, the details of the gray level transformation processing in step S4 in FIG. 21 will be described with reference to the flowcharts in FIGS. 22 and 23.

In step S21, the gray level transformation unit 143 reads in the tone curve, reduction image, and contrast gain curve from the memory. Specifically, the neighborhood selection unit 371 (FIG. 16) of the interpolation unit 171 of the gray level transformation unit 143 reads in the reduction image generated at the gray level transformation processing of the frame before the current frame from the reduction image memory 168. The mapping units 172-1 and 172-2 read in the look-up table representing the tone curve calculated at the gray level transformation processing of the frame before the current frame from the tone-curve memory 164. The mapping units 412-1 and 412-2 (FIG. 18) of the gain-value calculating unit 391 of the contrast correction unit 173 reads in the look-up table representing the contrast gain curve at the gray level transformation processing of the frame before the current frame from the contrast gain-curve memory 166.

In step S22, the tone-curve calculating unit 163 reads in noiseLevel and saturationLevel. Specifically, the saturation pixel excluding unit 242 (FIG. 10) of the brightness area calculating unit 221 of the tone-curve calculating unit 163, and the saturation pixel excluding unit 281 (FIG. 11) of the average-level calculating unit 222 read in noiseLevel$^{(n1)}$ and saturationLevel$^{(n1)}$ from the unshown internal memory of the DSP 116.

In step S23, the gray level transformation unit 143 reads in the RGB values of the pixel to be gray level-transformed next. Specifically, the brightness calculating unit 161 and nonlinear transforming units 162R through 162B of the gray level transformation unit 143 read in the pixel values $R_w(p)$, $G_w(p)$, and $B_w(p)$ of the pixel position p to be gray level-transformed next from the unshown internal memory of the DSP 116.

In step S24, the brightness calculating unit 161 calculates a brightness value. Specifically, the brightness calculating unit 161 calculates the brightness value L(p) corresponding to the pixel position p, e.g., using the following Expression (8).

$$L(p) = \frac{c_R \cdot R_w(p) + c_G \cdot G_w(p) + c_B \cdot B_w(p)}{c_R + c_G + c_B} \quad (8)$$

Note that the coefficients $c_R$, $c_g$, and $c_b$ of Expression (8) are coefficients for balancing the respective components of R, G, and B, and for example, a combination of values such as $(c_R, c_g, c_b)$=(0.3, 0.6, 0.1) or (0.25, 0.5, 0.25) is employed.

Also, the method for calculating the brightness value L(p) is not restricted to the above-mentioned method, and for example, values other than the linear sum of the respective components of R, G, and B may be employed, such as the following Expression (9).

$$L(p) = \max(R_w(p), G_w(p), B_w(p)) \quad (9)$$

The brightness calculating unit 161 outputs the calculated brightness value L(p) to the nonlinear transforming unit 162L.

In step S25, the nonlinear transforming unit 162L subjects the brightness value to nonlinear transforming. Specifically, the mapping unit 201 (FIG. 8) of the nonlinear transforming unit 162L reads in the look-up table representing the transforming curve from the transforming curve memory 202, and subjects the brightness value L(p) to nonlinear transforming (e.g., logarithmic transforming or gamma transforming) based on the look-up table.

Note that there is necessarily no need to perform nonlinear transforming processing in step S25, but in a case wherein the brightness value before nonlinear transforming is taken as the horizontal axis, and the brightness value after nonlinear transforming is taken as the vertical axis, nonlinear transforming is performed using a transforming curve which protrudes upward and increases monotonously, whereby the histogram shape of the brightness value is prevented from being enormously biased towards the dark brightness side or bright brightness side, and the histogram can be readily analyzed. For example, the transforming curve employed for nonlinear transforming is assumed to be an exponentiation curve employed for gamma correction (however, an index is assumed to be smaller than one), a logarithmic curve, or a curve represented with an exponentiation function or a function based on logarithm.

The mapping unit 201 outputs the nonlinear-transformed brightness value $L^{(n1)}(p)$ to the tone-curve calculating unit 163, reduction image generating unit 167, mapping unit 172-1, and gray level correction units 181R through 181B.

In step S26, the tone-curve calculating unit 163 performs pixel processing for calculating a tone curve. The details of the pixel processing for calculating a tone curve will be described later with reference to FIG. 24, but according to this processing, sorting of the brightness value $L^{(n1)}(p)$ and calculation of the brightness sum value of the entire image are performed to calculate a tone curve.

In step S27, the reduction image generating unit 167 performs pixel processing for generating a reduction image. The details of the pixel processing for generating a reduction image will be described later with reference to FIG. 25, but according to this processing, calculation of the brightness sum value of the brightness value $L^{(n1)}(p)$ for each block is performed to generate a reduction image.

In step S28, the interpolation unit 171 performs overall brightness value calculation processing. The details of the overall brightness value calculation processing will be described later with reference to FIG. 26, but according to this processing, the overall brightness value $L_1^{(n1)}(p)$ corresponding to the pixel position p is calculated.

In step S29, the gray level transformation unit 143 applies the tone curve to the nonlinear-transformed brightness value and the overall brightness value. Specifically, the mapping unit 172-1 of the gray level transformation unit 143 transforms the brightness value $L^{(n1)}(p)$ into a brightness value $L_c^{(n1)}(p)$ based on the tone curve calculated in the gray level transformation processing of the frame before the current frame, thereby compressing the gray level of the brightness value $L^{(n1)}(p)$. The mapping unit 172-1 outputs the brightness value $L_c^{(n1)}(p)$ to the contrast correction unit 173. Also, the mapping unit 172-2 converts the overall brightness value $L_1^{(n1)}(p)$ into an overall brightness value $L_{c1}^{(n1)}(p)$ based on the tone curve calculated in the gray level transformation processing of the frame before the current frame, thereby compressing the gray level of the overall brightness value $L_1^{(n1)}(p)$. The mapping unit 172-2 supplies the overall brightness value $L_{c1}^{(n1)}(p)$ to the contrast correction unit 173.

In step S30, the contrast correction unit 173 performs contrast correction processing. The details of the contrast correction processing will be described later with reference to FIG. 28, but according to this processing, the contrast of the image made up of the brightness value $L_c^{(n1)}(p)$ is corrected.

In step S31, the nonlinear transforming units 162R through 162B subject each of the RGB values to nonlinear transforming. Specifically, each of the mapping units 201 (FIG. 8) of the nonlinear transforming units 162R through 162B reads in the look-up table representing the transforming curve from the transforming curve memory 202, and subjects the pixel value $R_w(p)$, $G_w(p)$, or $B_w(p)$ read in step S23 to nonlinear transforming based on the look-up table. Each of the mapping units 201 of the nonlinear transforming units 162R through 162B outputs the nonlinear-transformed pixel value $R^{(n1)}(p)$, $G^{(n1)}(p)$, or $B^{(n1)}(p)$ to the gray level correction units 181R through 181B.

Note that the look-up table employed by the nonlinear transforming units 162R through 162B is assumed to be the same as that employed by the nonlinear transforming unit 162L in step S25. That is to say, the pixel values $R_w(p)$, $G_w(p)$, and $B_w(p)$ are subjected to the same nonlinear transforming as that employed for the brightness value L(p).

In step S32, the gray level correction units 181R through 181B subjected each of the nonlinear-transformed RGB values to gray level correction. Specifically, the subtracting unit 431 of the gray level correction unit 181R calculates a difference value by subtracting the nonlinear-transformed brightness value $L^{(n1)}(p)$ before gray level correction from the nonlinear-transformed pixel value $R^{(n1)}(p)$, and supplies the calculated difference value to the multiplying unit 432. The multiplying unit 432 multiplies the difference value calculated by the subtracting unit 431 by chromaGain which is the coefficient of a predetermined value for adjusting the saturation of the respective components of R, G, and B, and supplies the multiplication value obtained as a result thereof to the adding unit 433. The adding unit 433 adds the multiplication value calculated by the multiplying unit 432 and the brightness value $L_u^{(n1)}(p)$ after contrast correction. That is to say, the gray level correction unit 181R obtains a pixel value $R_u^{(n1)}(p)$ wherein the brightness value $L_u^{(n1)}(p)$ after contrast correction is reflected on the nonlinear-transformed pixel value $R^{(n1)}(p)$, using the following Expression (10).

$$R_u^{(n1)}(p) = \text{chromagain} \cdot (R^{(n1)}(p) - L^{(n1)}(p)) + L_u^{(n1)}(p) \qquad (10)$$

Similarly, the gray level correction units 181G and 181B obtains pixel values $G_u^{(n1)}(p)$ and $B_u^{(n1)}(p)$ wherein the gray level of the pixel value $G^{(n1)}(p)$ or $B^{(n1)}(p)$ is corrected using the following Expression (11) or (12), respectively.

$$G_u^{(n1)}(p) = \text{chromagain} \cdot (G^{(n1)}(p) - L^{(n1)}(p)) + L_u^{(n1)}(p) \qquad (11)$$

$$B_u^{(n1)}(p) = \text{chromagain} \cdot (B^{(n1)}(p) - L^{(n1)}(p)) + L_u^{(n1)}(p) \qquad (12)$$

Each of the gray level correction units 181R through 181B supplies the gray level-corrected pixel values $R_u^{(n1)}(p)$, $G_u^{(n1)}(p)$, or $B_u^{(n1)}(p)$ to the nonlinear inverse transforming units 182R through 182B.

In step S33, the nonlinear inverse transforming units 182R through 182B subject the gray level-corrected RGB values to nonlinear inverse transforming. Specifically, each of the inverse mapping units 451 (FIG. 20) of the nonlinear inverse transforming units 182R through 182B reads in the look-up table representing the transforming curve from the transforming curve memory 452, and subjects the pixel value $R_u^{(n1)}(p)$, $G_u^{(n1)}(p)$, or $B_u^{(n1)}(p)$ to nonlinear inverse transforming which is the inverse transforming of the nonlinear transforming in step S31.

In step S34, the nonlinear inverse transforming units 182R through 182B outputs the nonlinear-inverse transformed RGB values. Specifically, each of the inverse mapping units 451 of the nonlinear inverse transforming units 182R through 182B outputs the nonlinear-inverse transformed pixel value $R_u(p)$, $G_u(p)$, or $B_u(p)$ to the gamma correction unit 144.

In step S35, the brightness calculating unit 161 determines whether or not all the pixels within the frame have been processed. In the case of determining that all the pixels within the frame have not been processed, the processing returns to step S23, and the processing in steps S23 through S35 is repeatedly executed until determination is made in step S35 that all the pixels within the frame have been processed. That is to say, all the pixels within the frame being processed now are subjected to gray level transformation in order one pixel at a time (e.g., in raster scan order).

In the case of determination being made in step S35 that all the pixels within the frame have been processed, the processing proceeds to step S36.

In step S36, the tone-curve calculating unit 163 performs tone curve and γ_comp calculation processing. The details of the tone curve and γ_comp calculation processing will be described later with reference to FIG. 30, but according to this processing, the tone curve and γ_comp parameter according to the frame to be gray level-transformed this time are calculated.

In step S37, the contrast gain-curve calculating unit 165 performs contrast gain-curve calculation processing. The details of the contrast gain-curve calculation processing will be described later with reference to FIG. 32, but according to this processing, the contrast gain curve according to the frame to be gray level-transformed this time is calculated.

In step S38, the reduction image generating unit 167 performs reduction image generating processing, and the gray level transformation processing ends. The details of the reduction image generating processing will be described later with reference to FIG. 33, but according to this processing, a reduction image is generated.

Figure 24:
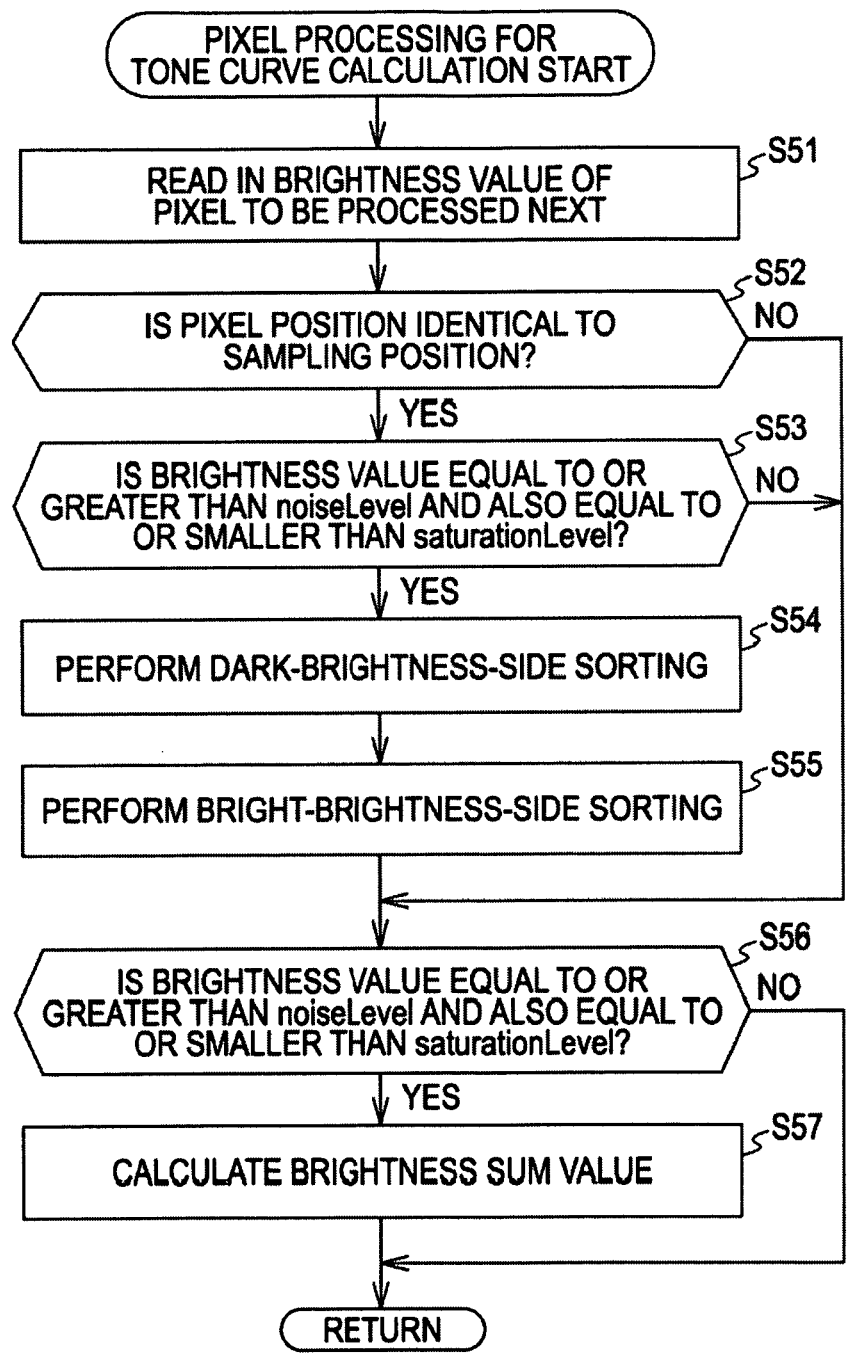
FIG. 24 is a flowchart for describing the details of pixel processing for calculating a tone curve in step S26 in FIG. 22.

Next, the details of the pixel processing for calculating a tone curve in step S26 in FIG. 22 will be described with reference to the flowchart in FIG. 24.

In step S51, the tone-curve calculating unit 163 reads in the brightness value of the pixel to be processed next. Specifically, the thinning unit 241 (FIG. 10) of the brightness area calculating unit 221 of the tone-curve calculating unit 163, and the saturation pixel excluding unit 281 (FIG. 11) of the average-level calculating unit 222 of the tone-curve calculating unit 163 read in the brightness value $L^{(n1)}(p)$ of the pixel at the pixel position p, which has been subjected to nonlinear transforming in the above-mentioned step S25 in FIG. 22, from the nonlinear transforming unit 162L.

In step S52, the thinning unit 241 determines whether or not the pixel position is identical to a sampling position. In the case of determining that the pixel position p of the read brightness value $L^{(n1)}(p)$ is identical to a sampling position provided for each predetermined interval, the thinning unit 241 outputs the brightness value $L^{(n1)}(p)$ to the saturation pixel excluding unit 242.

In step S53, the saturation pixel excluding unit 242 determines whether or not the brightness value is equal to or greater than noiseLevel and also equal to or smaller than saturationLevel. In the case of determining that the brightness value $L^{(n1)}(p)$ is equal to or greater than noiseLevel$^{(n1)}$ and also equal to or smaller than saturationLevel$^{(n1)}$, the saturation pixel excluding unit 242 outputs the brightness value $L^{(n1)}(p)$ to the sorting units 243 and 244, and the processing proceeds to step S54.

In step S54, the sorting unit 243 performs dark-brightness-side sorting. Specifically, the comparing unit 251-1 of the sorting unit 243 compares the value stored in the resistor 252-1 and the brightness value $L^{(n1)}(p)$ and in a case wherein the brightness value $L^{(n1)}(p)$ is smaller than the value of the resistor 252-1, outputs the value stored in the resistor 252-1 to the comparing unit 251-2 of the subsequent stage, and stores the brightness value $L^{(n1)}(p)$ in the resistor 252-1. On the other hand, in a case wherein the brightness value $L^{(n1)}(p)$ is equal to or greater than the value of the resistor 252-1, the comparing unit 251-1 outputs the brightness value $L^{(n1)}(p)$ as is to the comparing unit 251-2 of the subsequent stage. The comparing units 251-2 through 251-k of the subsequent stages perform the same processing. As a result thereof, ultimately, of the brightness value $L^{(n1)}(p)$ of the pixel at a sampling position within the frame, from the minimum brightness value $L^{(n1)}(p)$ to the k'th small brightness value $L^{(n1)}(p)$ are stored in the resistors 252-1 through 252-k in ascending order.

In step S55, the sorting unit 243 performs bright-brightness-side sorting. Specifically, the comparing unit 261-1 of the sorting unit 244 compares the value stored in the resistor 262-1 and the brightness value $L^{(n1)}(p)$, and in a case wherein the brightness value $L^{(n1)}(p)$ is greater than the value of the resistor 262-1, outputs the value stored in the resistor 262-1 to the comparing unit 261-2 of the subsequent stage, and stores the brightness value $L^{(n1)}(p)$ in the resistor 262-1. On the other hand, in a case wherein the brightness value $L^{(n1)}(p)$ is equal to or smaller than the value of the resistor 262-1, the comparing unit 261-1 outputs the brightness value $L^{(n1)}(p)$ as is to the comparing unit 261-2 of the subsequent stage. The comparing units 261-2 through 261-k of the subsequent stages perform the same processing. As a result thereof, ultimately, of the brightness value $L^{(n1)}(p)$ of the pixel at a sampling position within the frame, from the maximum brightness value $L^{(n1)}(p)$ to the k'th great brightness value $L^{(n1)}(p)$ are stored in the resistors 262-1 through 262-k in descending order.

In the case of determination being made in step S53 that the brightness value $L^{(n1)}(p)$ is smaller than noiseLevel$^{(n1)}$ or greater than saturationLevel$^{(n1)}$, the processing in steps S54 and S55 is skipped, the processing proceeds to step S56. That is to say, the brightness value $L^{(n1)}(p)$, which is smaller than noiseLevel$^{(n1)}$ or greater than saturationLevel$^{(n1)}$, is excluded from being subjected to dark-brightness-side sorting and bright-brightness-side sorting.

In the case of determining that the pixel position p of the read brightness value $L^{(n1)}(p)$ is not identical to a sampling position, the processing in steps S53 through S55 is skipped, and the processing proceeds to step S56. Thus, the number of pixels to be subjected to dark-brightness-side sorting and bright-brightness-side sorting is restricted.

In step S56, the saturation pixel excluding unit 281 (FIG. 11) of the average-level calculating unit 222 determines whether or not the brightness value is equal to or greater than noiseLevel and also equal to or smaller than saturationLevel, in the same way as with the processing by the saturation pixel excluding unit 242 of the brightness area calculating unit 221 in step S53. In the case of determining that the brightness value $L^{(n1)}(p)$ is equal to or greater than noiseLevel$^{(n1)}$ and also equal to or smaller than saturationLevel$^{(n1)}$, the saturation pixel excluding unit 281 outputs the brightness value $L^{(n1)}(p)$ to the adding unit 291 and counter 293 of the average-value calculating unit 282, and the processing proceeds to step S57.

In step S57, the average-level calculating unit 222 calculates a brightness sum value, and the pixel processing for calculating a tone curve ends. Specifically, the adding unit 291 reads in the brightness sum value stored in the resistor 292 which is the sum value of the brightness values which have been processed so far, and adds the input brightness value $L^{(n1)}(p)$ and the read brightness sum value. The adding unit 291 stores the calculated value in the resistor 292. Also, the counter 293 increments the value of the counter by one. That is to say, the counter value of the counter 293 indicates the number of pixels of which the brightness values $L^{(n1)}(p)$ have been added to the brightness sum value so far.

In the case of determination being made in step S56 that the brightness value $L^{(n1)}(p)$ is smaller than noiseLevel$^{(n1)}$ or greater than saturationLevel$^{(n1)}$, the processing in step S57 is skipped, and the pixel processing for calculating a tone curve ends. That is to say, the brightness value $L^{(n1)}(p)$, which is smaller than noiseLevel$^{(n1)}$ or greater than saturationLevel$^{(n1)}$, is excluded from being calculated to obtain the brightness average value.

Figure 25:
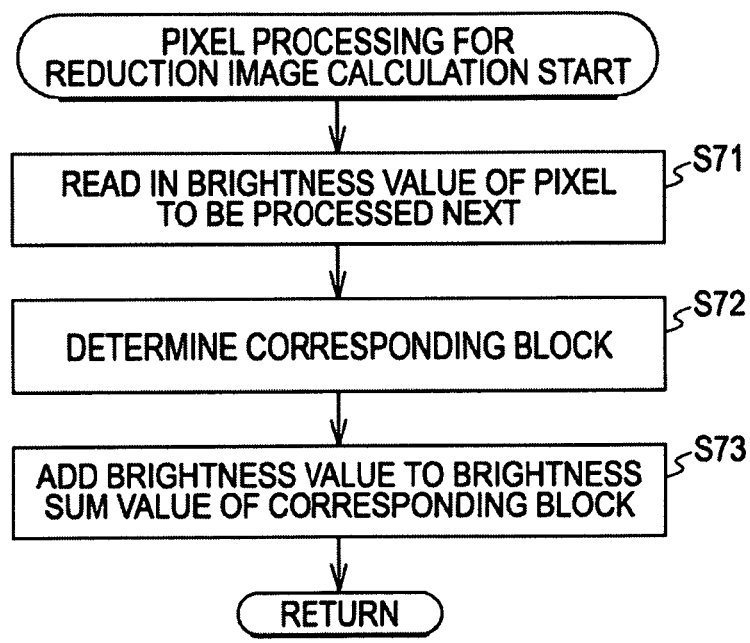
FIG. 25 is a flowchart for describing the details of the pixel processing for generating a reduction image in step S27 in FIG. 22.

Next, the details of the pixel processing for generating a reduction image in step S27 in FIG. 22 will be described with reference to the flowchart in FIG. 25.

In step S71, the sorting unit 351 (FIG. 15) of the reduction image generating unit 167 reads in the brightness value of the pixel to be processed next. Specifically, the sorting unit 351 reads in the brightness value $L^{(n1)}(p)$ of the pixel position p which has been nonlinear-transformed in the above-mentioned step S25 in FIG. 22 from the nonlinear transforming unit 162L.

In step S72, the sorting unit 351 determines the relevant block. Specifically, the sorting unit 351 determines whether or not the pixel position p is included in which block of predetermined horizontally $w_r$×vertically $h_r$ blocks into which an image is divided.

In step S73, the average-value calculating unit 352 adds the brightness value to the brightness sum value of the relevant block, and the pixel processing for generating a reduction image ends. Specifically, the sorting unit 351 outputs the brightness value $L^{(n1)}(p)$ to the average-value calculating unit 352 for calculating the average value of the brightness values of the block including the pixel position p. The average-value calculating unit 352 adds the brightness value $L^{(n1)}(p)$ to the brightness sum value which is the sum of the brightness values of the block to be processed.

Figure 22:
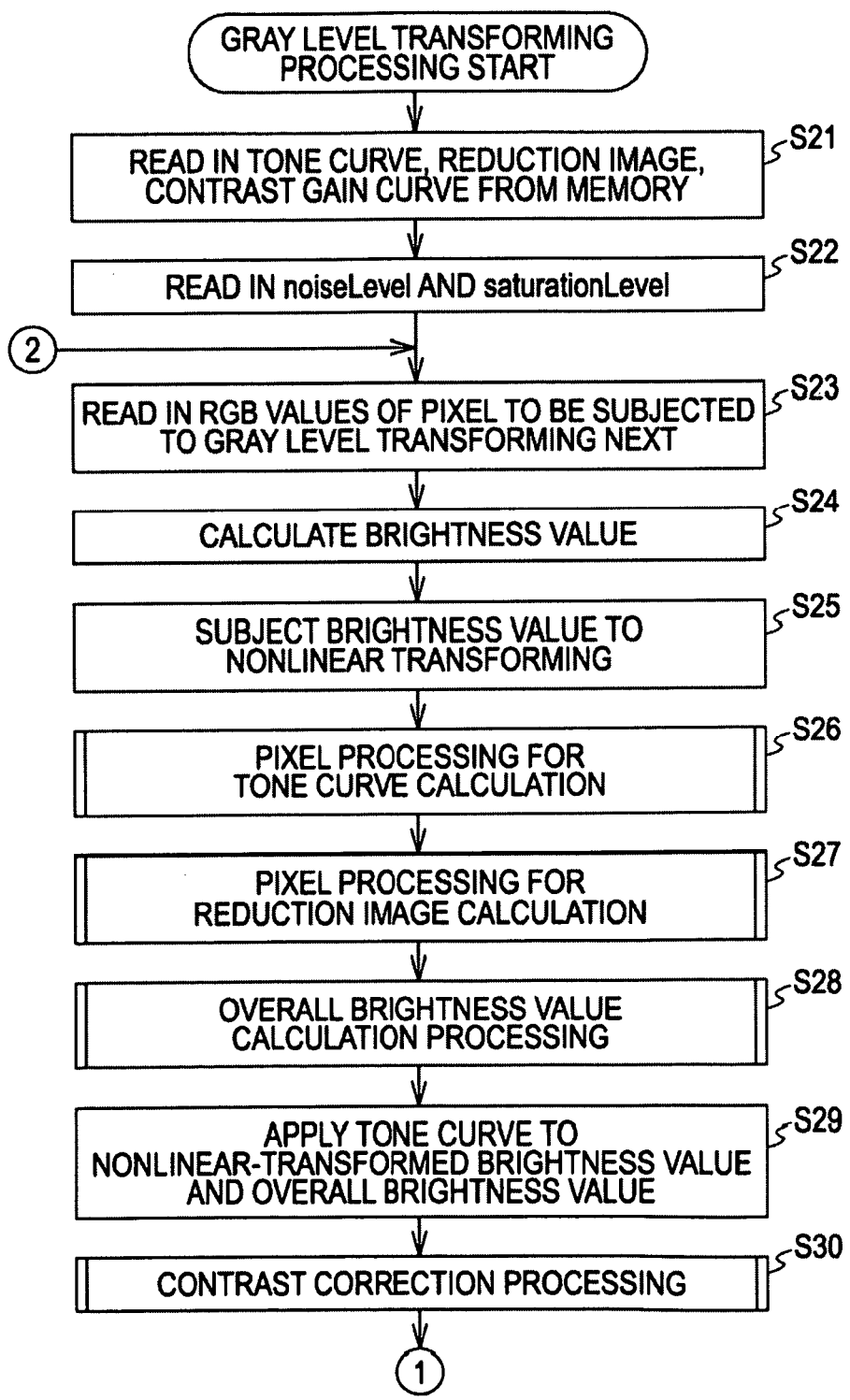
FIG. 22 is a flowchart for describing the details of the gray level transformation processing in step S4 in FIG. 21.
Figure 23:
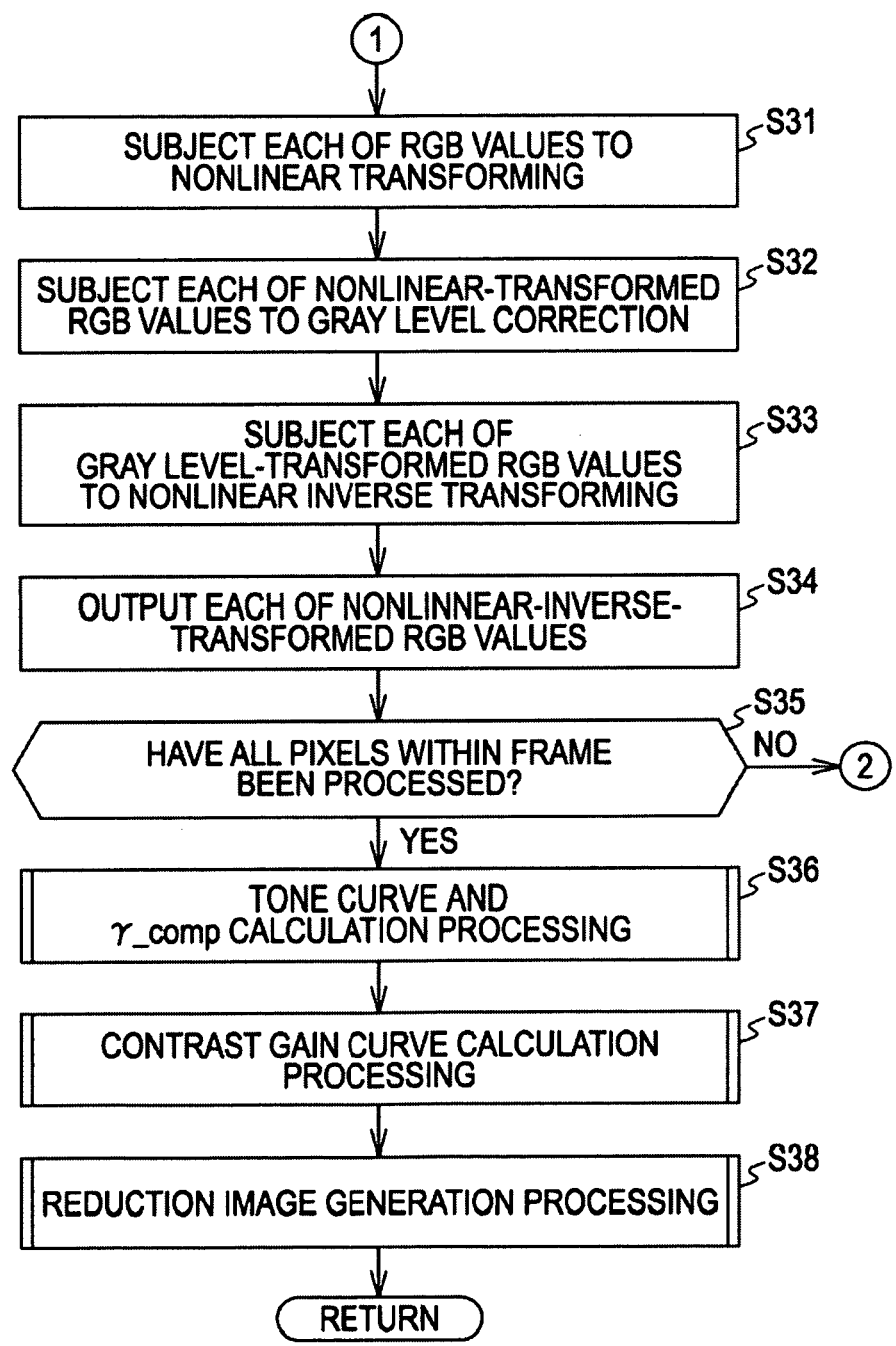
FIG. 23 is a flowchart for describing the details of the gray level transformation processing in step S4 in FIG. 21.
Figure 26:
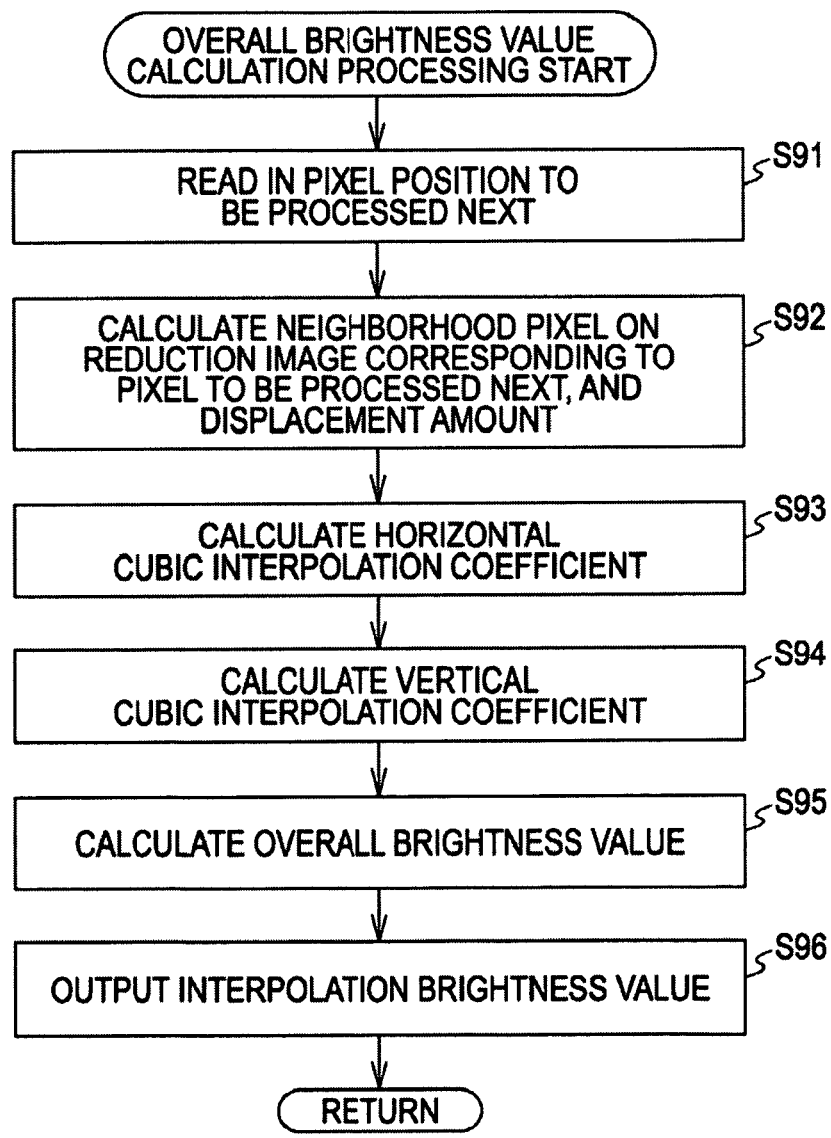
FIG. 26 is a flowchart for describing the details of the overall brightness calculation processing in step S28 in FIG. 22.

Next, the details of the overall brightness calculation processing in step S28 in FIG. 22 with reference to the flowchart in FIG. 26.

In step S91, the neighborhood selection unit 371 (FIG. 16) of the interpolation unit 171 reads in the pixel position of the pixel to be processed next. Specifically, the neighborhood selection unit 371 reads in the pixel position p of the pixel to be processed next from the nonlinear transforming unit 162L.

In step S92, the neighborhood selection unit 371 calculates neighborhood pixels on the reduction image corresponding to the pixel to be processed next, and positional deviation amounts. Specifically, in the case of assuming that the number of pixels of the mosaic image is horizontally $w_m$×vertically $h_m$, and the number of pixels of the reduction image is horizontally $w_r$×vertically $h_r$, the neighborhood selection unit 317 calculates the position q=(qx, qy) on the reduction image corresponding to the pixel position p=(px, py) using the following Expressions (13) through (15).

$$bx = w_m/w_r \quad (13)$$

$$by = h_m/h_r \quad (14)$$

$$q=(qx,qy)=(px/bx-0.5, py/by-0.5) \quad (15)$$

Figure 27:
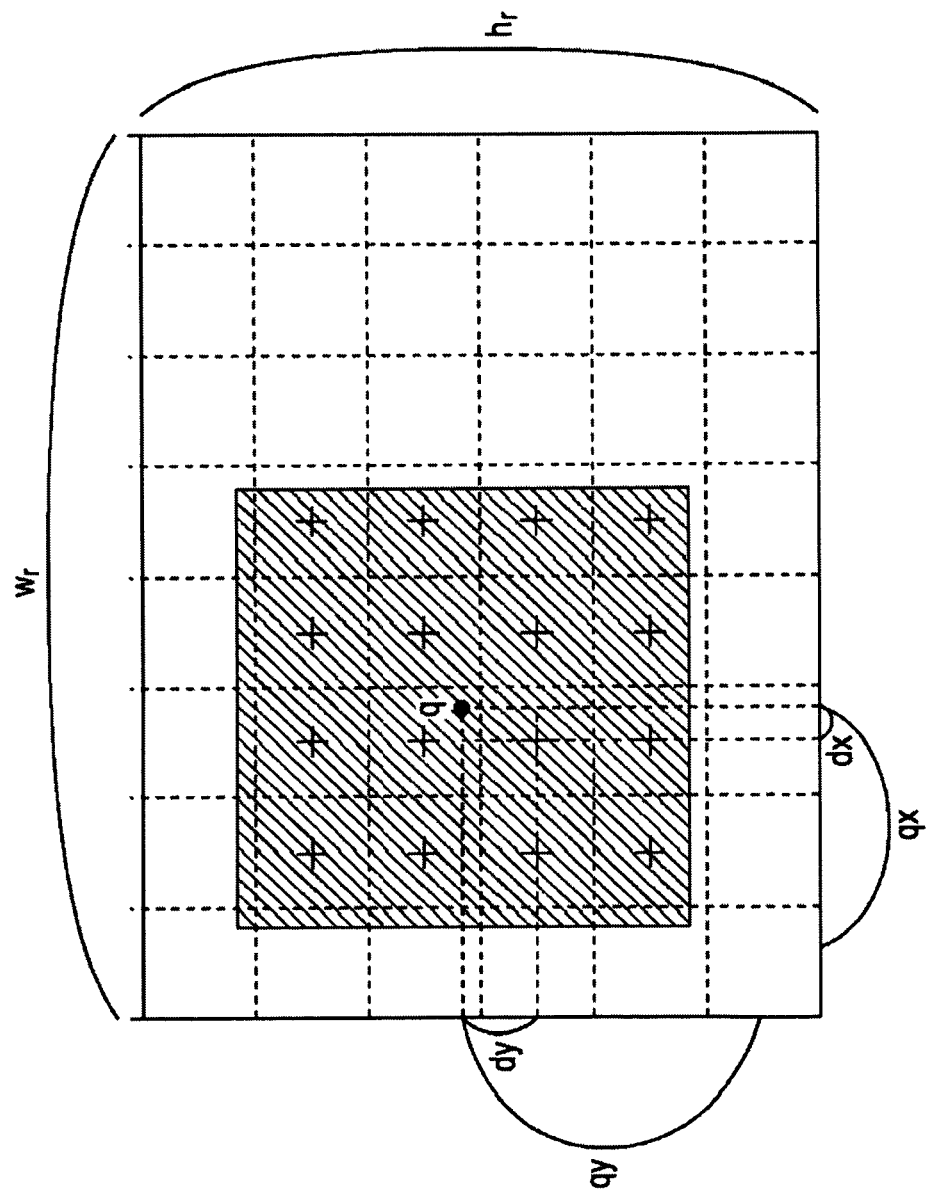
FIG. 27 is a diagram for describing the processing of the interpolation unit in FIG. 7.

Also, the neighborhood selection unit 371 extracts neighborhood pixels which are pixels within a range of horizontally 4×vertically 4 pixels near the position q. For example, in the case of the example shown in FIG. 27, the pixels indicated with a "+" mark are extracted as neighborhood pixels, which are positioned within a range of qx−2≤x≤qx+2, and also qy−2≤y≤qy+2 shown in oblique lines in FIG. 27.

Further, the neighborhood selection unit 371 takes the positional deviation dx in the horizontal direction, and the positional deviation dy in the vertical direction as to the pixel position p as the difference between the pixel positioned closest in the lower left direction from the position q, and the position q, with the reduction image. That is to say, the positional deviation amount (dx, dy)=(decimal portion of qx, decimal portion of qy) holds.

The neighborhood selection unit 371 outputs the positional deviation dx in the horizontal direction to the horizontal coefficient calculating unit 372, outputs the positional deviation dy in the vertical direction to the vertical coefficient calculating unit 373, and outputs the pixel values of the neighborhood pixels a[i][j] (1≤i≤4, 1≤j≤4, however, i and j are natural numbers) to the sum-of-products unit 374.

In step S93, the horizontal coefficient calculating unit 372 calculates cubic interpolation coefficients in the horizontal direction. Specifically, the horizontal coefficient calculating unit 372 calculates cubic interpolation coefficients in the horizontal direction kx[i] (1≤i≤4, however, i is a natural number) based on the positional deviation dx in the horizontal direction using the following Expressions (16) and (17).

$$z = |dx - i + 2| \quad (16)$$

$$k_x[i] = \begin{cases} (3z^3 - 6z^2 + 4)/6 & (z < 1) \\ (-z^3 + 6z^2 - 12z + 8)/6 & (1 <= z < 2) \\ 0 & \text{others} \end{cases} \quad (17)$$

The horizontal coefficient calculating unit 372 outputs the calculated interpolation coefficient kx[i] to the sum-of-products 374.

In step S94, the vertical coefficient calculating unit 373 calculates cubic interpolation coefficients in the vertical direction. Specifically, the vertical coefficient calculating unit 373 calculates cubic interpolation coefficients in the vertical direction ky[j] (1≤j≤4, however, j is a natural number) based on the positional deviation dy in the vertical direction using the following Expressions (18) and (19).

$$z = |dy - j + 2| \quad (18)$$

$$k_y[j] = \begin{cases} (3z^3 - 6z^2 + 4)/6 & (z < 1) \\ (-z^3 + 6z^2 - 12z + 8)/6 & (1 <= z < 2) \\ 0 & \text{others} \end{cases} \quad (19)$$

The vertical coefficient calculating unit 373 outputs the calculated ky[j] to the sum-of-products 374.

Note that the above-mentioned Expressions (16) through (19) are expression examples frequently employed for cubic interpolation, the interpolation coefficients kx[i] and ky[j] may be calculated with other computation expressions in a range where a sufficient smooth interpolation can be obtained.

In step S95, the sum-of-products unit 374 calculates an overall brightness value. Specifically, the sum-of-products unit 374 performs a sum-of-products calculation of the pixel values of the neighborhood pixels a[i][j], interpolation coefficients in the horizontal direction kx[i], and interpolation coefficients in the vertical direction ky[j] using the following Expression (20), thereby calculating the overall brightness value $L_1^{(n1)}(p)$ of the pixel position p.

$$L_l^{(n1)}(p) = \sum_{i=1}^{4} \sum_{j=1}^{4} a[i][j] \cdot k_x[i] \cdot k_y[j] \quad (20)$$

In step S96, the sum-of-products unit 374 outputs the overall brightness value $L_1^{(n1)}(p)$ to the mapping unit 172-2, and the overall brightness value calculation processing ends.

Note that an overall brightness image made up of the overall brightness value $L_1^{(n1)}(p)$ is an image wherein a reduction image of horizontally $w_r$×vertically $h_r$ pixels is expanded to the original size (number of pixels), which is an image wherein only low-frequency components are extracted from the original image (image made up of the brightness value $L_1^{(n1)}(p)$).

Next, the details of the contrast correction processing in step S30 in FIG. 22 will be described with reference to the flowchart in FIG. 28.

In step S111, the contrast correction unit 173 reads in the gray level-compressed brightness value and overall brightness value of the pixel to be processed next. Specifically, the gain-value calculating unit 391 and contrast emphasizing unit 392 (FIG. 17) of the contrast correction unit 173 reads in the brightness value $L_c^{(n1)}(p)$ of which the gray level has been compressed with the tone curve in step S29 in FIG. 22 described above from the mapping unit 172-1, and reads in the overall brightness value $L_{c1}^{(n1)}(p)$ of which the gray level has been compressed with the tone curve in step S29 in FIG. 22 described above from the mapping unit 172-2.

In step S112, the gain-value calculating unit 391 performs gain-value calculation processing. The details of the gain-value calculation processing will be described later with reference to FIG. 29, but according to this processing, the gain value g(p) is calculated.

In step S113, the contrast emphasizing unit 392 calculates a contrast-corrected brightness value. Specifically, the contrast emphasizing unit 392 employs the gray level-compressed brightness value $L_c^{(n1)}(p)$, overall brightness value $L_{c1}^{(n1)}(p)$, and gain value g(p) to calculate a contrast-corrected brightness value $L_u^{(n1)}(p)$ using the following Expression (21).

$$L_u^{(n1)}(p) = (g(p) + 1) \cdot (L_c^{(n1)}(p) - L_{c1}^{(n1)}(p)) + L_{c1}^{(n1)}(p) \quad (21)$$
$$= g(p) \cdot (L_c^{(n1)}(p) - L_{c1}^{(n1)}(p)) + L_c^{(n1)}(p)$$

Note that the image made up of the brightness value ($L_c^{(n1)}(p) - L_{c1}^{(n1)}(p)$) is an image obtained by subtracting an overall brightness image made up of only low-frequency components of the image made up of the brightness value $L_c^{(n1)}(p)$ from the image made up of the brightness value $L_c^{(n1)}(p)$. Accordingly, the image made up of the brightness value $L_u^{(n1)}(p)$ is an image where the contrast components from which only the low-frequency components are removed of the image made up of the brightness value $L_c^{(n1)}(p)$ are emphasized with the gain value g(p).

Also, with the image of which the gray level of the brightness value has been compressed with the tone curve (the image made up of the brightness value $L_c^{(n1)}(p)$), the contrast is suppressed as compared with the original image (the image made up of the brightness value $L^{(n1)}(p)$). Also, the level wherein the contrast is suppressed depends on the inclination of the tone curve, i.e., the more moderate the inclination of the tone curve is, the greater the level of suppression is. Accordingly, the contrast of the gray level-compressed image is emphasized according to the inverse number of the inclination of the tone curve, whereby the contrast close to the image before gray level compression can be obtained. Note however, in the case of the pixel of the brightness value $L_c^{(n1)}(p)$ around noiseLevel$^{(n1)}$ or saturationLevel$^{(n1)}$ being subjected to the same correction as well, clipping occurs such that the brightness value after correction is smaller than noiseLevel$^{(n1)}$, or is greater than saturationLevel$^{(n1)}$, and conversely, the details of the image are lost in some cases.

Figure 34:
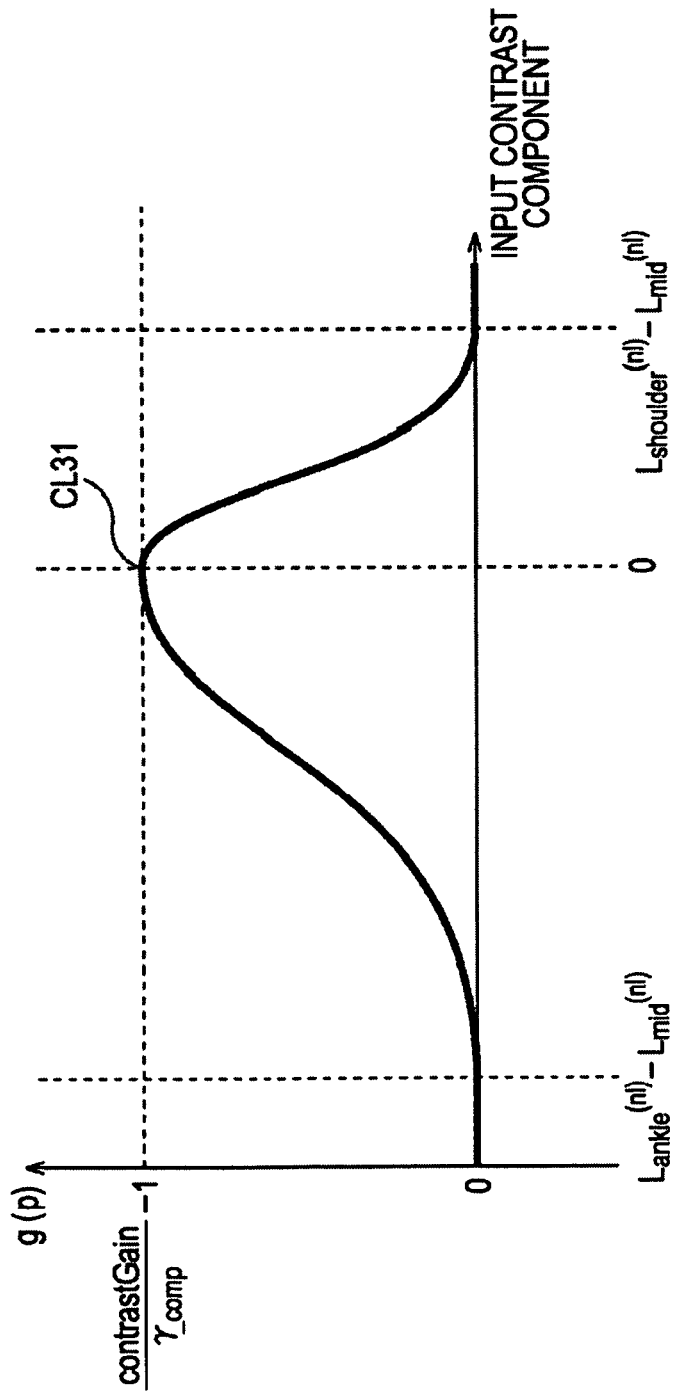
FIG. 34 is a graph illustrating a contrast gain curve example.

As described later with reference to FIG. 34, the contrast gain curve generated by the contrast gain-curve calculating unit 165 has properties wherein when the input contrast component ($L_c^{(n1)}(p) - L_{c1}^{(n1)}(p)$) is zero, the gain value g(p) is the maximum, and the more the absolute value of the input contrast component increases, the more the gain value g(p) monotonously decreases, and ultimately becomes zero. That is to say, the greater the input contrast component is, the more the level for emphasizing the contrast is suppressed with contrast correction. Also, the contrast gain curve has properties wherein as the absolute value of the input contrast component increases, the rate of change of the gain value g(p) as to the input contrast component increases halfway, and subsequently, decreases. Accordingly, for example, saturation of brightness is suppressed from occurring with a low-brightness area where pixels having great contrast exist in a spot form.

Also, as described later with reference to FIGS. 33 and 34, the gain value g(p) is set such that the output contrast component $(L_u^{(n1)}(p)-L_{c1}^{(n1)}(p))$ monotonously increases as to the input contrast component $(L_c^{(n1)}(p)-L_{c1}^{(n1)}(p))$, and accordingly, gray level inversion is suppressed from occurring.

In step S114, the contrast emphasizing unit 392 outputs the contrast-corrected brightness value, and the contrast correction processing ends. Specifically, the contrast emphasizing unit 392 outputs the contrast-corrected brightness value $L_u^{(n1)}(p)$ to the gray level correction units 181R through 181B.

Thus, according to the contrast correction unit 173, the contrast of low-middle-frequency through high-frequency area components excluding only low-frequency area of the image made up of the brightness value $L_u^{(n1)}(p)$ is emphasized. Accordingly, local overshoot of an edge portion does not occur, which is conspicuous when the contrast of the high-frequency area component alone is emphasized, and an image can be obtained wherein the contrast is naturally emphasized even in appearance. Also, as described above, occurrence of saturation of brightness can be suppressed, and occurrence of whiteout or blackout of an image can be suppressed.

Next, the details of the gain-value calculation processing in step S112 in FIG. 28 will be described with reference to the flowchart in FIG. 29.

In step S121, the mapping unit 412-1 (FIG. 18) of the gain-value calculating unit 391 calculates a gain value based on the difference between the gray level-compressed brightness value and intermediate brightness level. Specifically, the subtracting unit 411-1 calculates the difference between the gray level-compressed brightness value $L_c^{(n1)}(p)$ and intermediate brightness level $L_{mid}^{(n1)}$, and outputs the calculated difference value to the mapping unit 412-1. The mapping unit 412-1 reads in the look-up table representing the contrast gain curve from the contrast gain-curve memory 166. The mapping unit 412-1 obtains the gain value g(p) corresponding to the difference value between the brightness value $L_c^{(n1)}(p)$ and intermediate brightness level $L_{mid}^{(n1)}$ based on the read look-up table. That is to say, the mapping unit 412-1 obtains the gain value g(p) based on the contrast gain curve, and the difference value between the brightness value $L_c^{(n1)}(p)$ and intermediate brightness level $L_{mid}^{(n1)}$. Note that the intermediate brightness level $L_{mid}^{(n1)}$ is a constant, so in other words, we can say that the mapping unit 412-1 obtains the gain value g(p) based on the contrast gain curve, and brightness value $L_c^{(n1)}(p)$. The mapping unit 412-1 supplies the obtained gain value g(p) to the subtracting unit 413 and selection unit 414.

In step S122, the mapping unit 412-2 calculates the gain value based on the difference between the gray level-compressed brightness value and overall brightness value. Specifically, the subtracting unit 411-2 calculates the difference value between the gray level-compressed brightness value $L_c^{(n1)}(p)$ and overall brightness value $L_{c1}^{(n1)}(p)$, and supplies the calculated difference value to the mapping unit 412-2. The mapping unit 412-2 reads in the look-up table representing the contrast gain curve from the contrast gain-curve memory 166. The mapping unit 412-2 obtains the gain value g(p) corresponding to the difference value between the brightness value $L_c^{(n1)}(p)$ and overall brightness value $L_{c1}^{(n1)}(p)$ based on the read look-up table. That is to say, the mapping unit 412-1 obtains the gain value g(p) based on the contrast gain curve, and the difference value (contrast component) between the brightness value $L_c^{(n1)}(p)$ and overall brightness value $L_{c1}^{(n1)}(p)$. The mapping unit 412-2 supplies the obtained gain value g(p) to the subtracting unit 413 and selection unit 414.

In step S123, the selection unit 414 selects the gain value, and the gain-value calculation processing ends. Specifically, the subtracting unit 413 calculates the difference between the gain value g(p) from the mapping unit 412-1 and the gain value g(p) from the mapping unit 412-2, and supplies the calculated difference value to the selection unit 414. The selection unit 414 selects smaller one of the gain value g(p) from the mapping unit 412-1 and the gain value g(p) from the mapping unit 412-2, supplies this to the contrast emphasizing unit 392 as the ultimate gain g(p).

That is to say, this processing selects smaller one of the gain value g(p) corresponding to the difference value between the brightness value $L_c^{(n1)}(p)$ and intermediate brightness level $L_{mid}^{(n1)}$, and the difference value between the brightness value $L_c^{(n1)}(p)$ and overall brightness value $L_{c1}^{(n1)}(p)$. That is to say, in addition to the contrast component $(L_c^{(n1)}(p)-L_{c1}^{(n1)}(p))$, the gain value g(p) is controlled based on the brightness value $L_c^{(n1)}(p)$, and with a high-brightness pixel wherein the brightness value $L_c^{(n1)}(p)$ is great and a low-brightness pixel wherein the brightness value $L_c^{(n1)}(p)$ is small, the gain value g(p) is attenuated regardless of the size of the contrast component, and accordingly, saturation of brightness can be suppressed in a sure manner.

Next, the details of the tone curve and γ_comp calculation processing in step S36 in FIG. 23 will be described with reference to the flowchart in FIG. 30.

In step S131, the brightness area calculating unit 221 (FIG. 9) of the tone curve calculating unit 163 obtains base values at the dark and bright brightness sides from the sorting results at the dark and bright brightness sides. Specifically, the sorting unit 243 (FIG. 10) of the brightness area calculating unit 221 sets the brightness value stored in the resistor 252-k to the base value $L_{dark}^{(n1)}$ at the dark brightness side. Also, the sorting unit 244 of the brightness area calculating unit 221 sets the brightness value stored in the resistor 262-k to the base value $L_{bright}^{(n1)}$ at the bright brightness side.

For example, if we say that the number of pixels to be sampled per one frame by the thinning unit 241 is 1200, and the number of resistors 252 of the sorting unit 243 is 6 (k 6), after all the pixels within one frame have been processed, of the sampled pixels, the brightness values $L^{(n1)}(p)$ of the pixels of from the darkest pixel to the 6'th dark pixel (strictly, the pixels of which the brightness value $L^{(n1)}(p)$ is smaller than $noiseLevel^{(n1)}$ are omitted, so the last pixel is not necessarily restricted to the 6'th) are stored in the resistors 252-1 through 252-6. Accordingly, the brightness value $L^{(n1)}(p)$ stored in the resistor 252-6 occupying the number of pixels of the entire frame, i.e., the rate of the number of pixels of which the brightness values are equal to or smaller than the base value $L_{dark}^{(n1)}$ is estimated to be 0.5% (=6/1200). Similarly, the brightness value $L^{(n1)}(p)$ stored in the resistor 262-6 occupying the number of pixels of the entire frame, i.e., the rate of the number of pixels of which the brightness values are equal to or greater than the base value $L_{bright}^{(n1)}$ is estimated to be 0.5% (=6/1200).

Note that the rate of the number of pixels employed for setting the base value $L_{dark}^{(n1)}$ or $L_{bright}^{(n1)}$ may be a value other than the above-mentioned 0.5%. Also, the number of resistors of the sorting unit 243 or 244 is set according to the rate of the number of pixels employed for setting the base value $L_{dark}^{(n1)}$ or $L_{bright}^{(n1)}$.

The sorting unit 243 outputs the base value $L_{dark}^{(n1)}$ to the time smoothing unit 223-1, and the sorting unit 244 outputs the base value $L_{bright}^{(n1)}$ to the time smoothing unit 223-2.

In step S132, the average-level calculating unit 222 (FIG. 9) of the tone-curve calculating unit 163 calculates an average level based on the brightness sum value. Specifically, the dividing unit 294 (FIG. 11) of the average-value calculating unit 282 of the average-level calculating unit 222 reads in the brightness sum value stored in the resistor 292, and the counter value (number of pixels) of the counter 293. The dividing unit 294 calculates the average level $L_{average}^{(n1)}$ of the brightness value $L^{(n1)}(p)$ by dividing the brightness sum value by the counter value of the counter 293. The dividing unit 294 outputs the average level $L_{average}^{(n1)}$ to the time smoothing unit 223-3.

In step S133, the time smoothing unit 223 subjects the base value and average level to time smoothing. Specifically, the multiplying unit 311 (FIG. 12) of the time smoothing unit 223-1 multiplies the base value $L_{dark}^{(n1)}$ by a predetermined smoothing coefficient sc1, and outputs the result thereof to the adding unit 313. The multiplying unit 312 of the time smoothing unit 223 reads in the base value $L_{dark-ts-pre}^{(n1)}$ subjected to time smoothing with the frame before the current frame from the resistor 314. The multiplying unit 312 multiplies the base value $L_{dark-ts-pre}^{(n1)}$ by a smoothing coefficient sc2, and outputs the result thereof to the adding unit 313. The adding unit 313 adds the value output from the multiplying unit 311 and the value output from the multiplying unit 312, thereby calculating the base value $L_{dark-ts}^{(n1)}$ wherein the base value $L_{dark}^{(n1)}$ is subjected to time smoothing. That is to say, the base value $L_{dark-ts}^{(n1)}$ is represented with the following Expression (22).

$$L_{dark-ts}^{(n1)} = sc1 \cdot L_{dark}^{(n1)} + sc2 \cdot L_{dark-ts-pre}^{(n1)} \quad (22)$$

That is to say, smoothing is carried out between the base value $L_{dark}^{(n1)}$ of the current frame and base value $L_{dark-ts-pre}^{(n1)}$ of the frame before the current frame based on the smoothing coefficients sc1 and sc2.

The adding unit 313 outputs the base value $L_{dark}^{(n1)}$ to the spline generating unit 224, and stores this in the resistor 314.

Similarly, the time smoothing unit 223-2 calculates the base value $L_{bright-ts}^{(n1)}$ wherein the base value $L_{bright}^{(n1)}$ is subjected to time smoothing using the following Expression (23), and outputs the calculated base value $L_{bright-ts}^{(n1)}$ to the spline generating unit 224, and also stores this in the resistor 314.

$$L_{bright-ts}^{(n1)} = sc1 \cdot L_{bright}^{(n1)} + sc2 \cdot L_{bright-ts-pre}^{(n1)} \quad (23)$$

$L_{bright-ts}^{(n1)}$ is the base value $L_{bright}^{(n1)}$ subjected to time smoothing of the frame before the current frame.

Similarly, the time smoothing unit 223-3 calculates the average level $L_{average-ts}^{(n1)}$ wherein the average level $L_{average}^{(n1)}$ is subjected to time smoothing using the following Expression (24), and outputs the calculated average level $L_{average-ts}^{(n1)}$ to the spline generating unit 224, and also stores this in the resistor 314.

$$L_{average-ts}^{(n1)} = sc1 \cdot L_{average}^{(n1)} + sc2 \cdot L_{average-ts-pre}^{(n1)} \quad (24)$$

$L_{average-ts-pre}^{(n1)}$ is the average level $L_{average}^{(n1)}$ subjected to time smoothing of the frame before the current frame.

Thus, the values of the base value and average level are prevented from drastically changing between frames or oscillating.

Figure 31:
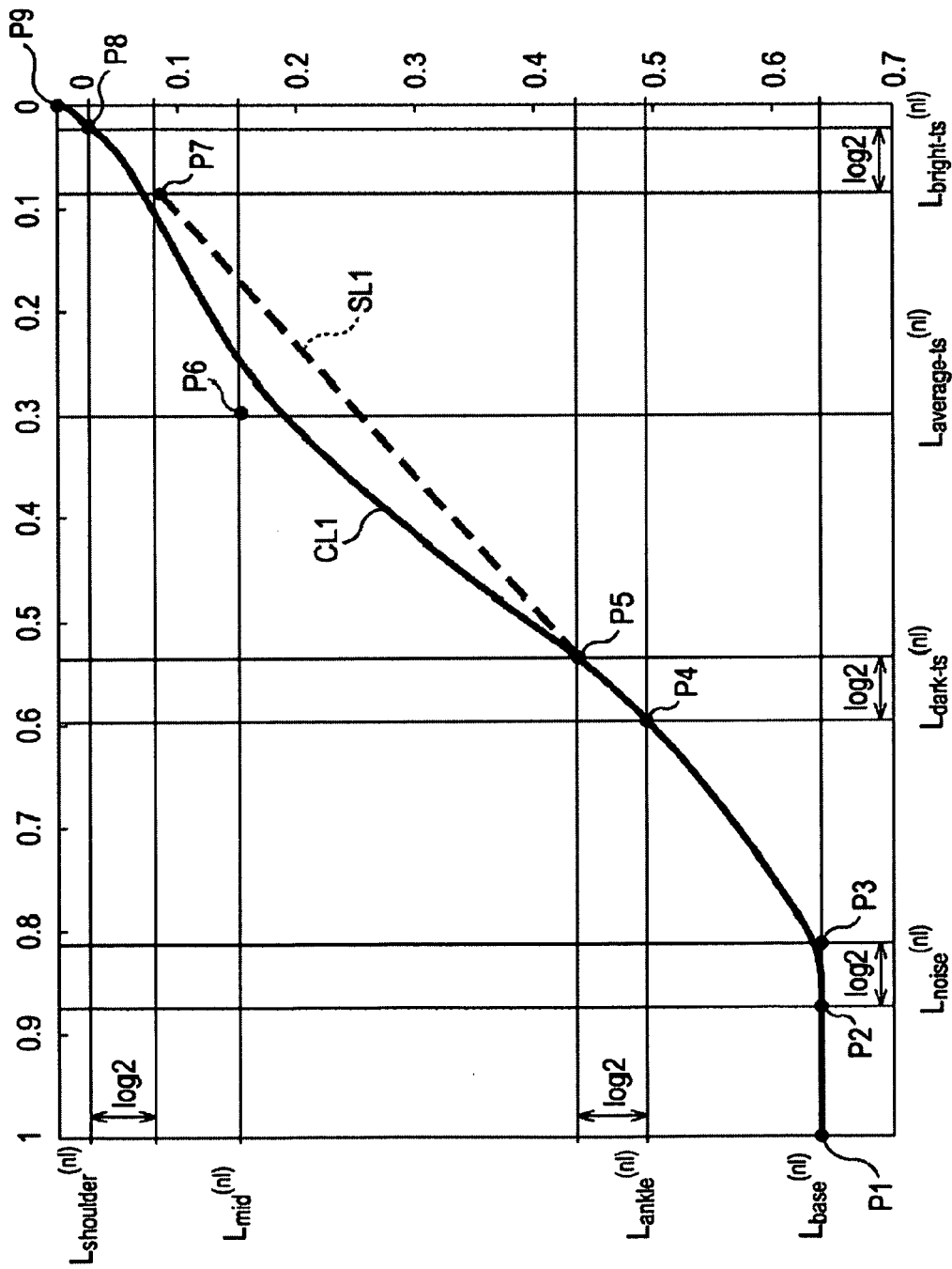
FIG. 31 is a graph illustrating a tone curve example.

In step S135, the spline generating unit 224 generates a tone curve. Description will be made below regarding a tone curve generating method, with reference to FIG. 31. FIG. 31 illustrates an example of a tone curve generated by the spline generating unit 224. Note that the horizontal axis direction of the graph in FIG. 31 represents the logarithmic value of input brightness before gray level correction, and the vertical axis direction represents the logarithmic value of output brightness after gray level correction with a tone curve CL1.

First, the control point setting unit 331 (FIG. 13) of the spline generating unit 224 sets nine control points P1 through P9. The control point P1 is set to a point wherein input brightness has a predetermined minimum level, and output brightness has a predetermined minimum level $L_{base}^{(n1)}$. The control point P2 is set to a point wherein input brightness has a predetermined noise level $L_{nise}^{(n1)}$, which is brightness that can be regarded as a noise level, and output brightness has the minimum level $L_{base}^{(n1)}$. The control point P3 is set to a point wherein input brightness has a brightness value that is double the noise level $L_{base}^{(n1)}$, and output brightness has the minimum level $L_{base}^{(n1)}$.

The control pint P4 is set to a point wherein input brightness has the base value $L_{dark-ts}^{(n1)}$ at the dark brightness side, and output brightness has a brightness value $L_{ankle}^{(n1)}$, which is the brightness value of generally a black level. The control point P5 is set to a point wherein input brightness has a brightness value that is double the base value $L_{dark-ts}^{(n1)}$, and output brightness has a brightness value that is double the brightness value $L_{ankle}^{(n1)}$. The control point P6 is set to a point wherein input brightness has the average level $L_{average-ts}^{(n1)}$ of input brightness, and output brightness has an intermediate brightness level $L_{mid}^{(n1)}$ which is generally predetermined middle of the brightness range. The control point P7 is set to a point wherein input brightness has a half brightness value of the base value $L_{bright-ts}^{(n1)}$ at the bright brightness side, and output brightness has a half brightness value of the brightness value $L_{shoulder}^{(n1)}$ which is the brightness value of generally a white level. The control point P8 is set to a point wherein input brightness has the base value $L_{bright-ts}^{(n1)}$, and output brightness has the brightness value $L_{shoulder}^{(n1)}$. The control point P9 is set to a point wherein input brightness has the maximum value of predetermined input brightness, and output brightness is the maximum value of predetermined output brightness.

The control point setting unit 331 supplies a control point set indicating the positions of the set control points P1 through P9 to the curve drawing unit 332 and gamma calculating unit 333. The curve drawing unit 332 calculates a coordinate on a cubic spline curve for interpolating between the respective points of the control points P1 through P9, thereby generating the look-up table of the tone curve CL1.

Note that the control point P3 is set as an auxiliary point, whereby the tone curve CL1 passes through the control point P2 or the neighborhood thereof. That is to say, in a case wherein input brightness is generally the noise level $L_{nise}^{(n1)}$, the input brightness is gray level-transformed into a value generally equal to the minimum level $L_{base}^{(n1)}$ of output brightness. Also, the control point P5 is set as an auxiliary point, whereby input brightness has generally the base value $L_{dark-ts}^{(n1)}$ and the inclination of the tone curve CL1 around the brightness value $L_{ankle}^{(n1)}$ (around the control point P4) where output brightness has generally a black level is prevented from enormously becoming steep or moderate. Also, the control point P7 is set as an auxiliary point, whereby input brightness has generally the base value $L_{dark-ts}^{(n1)}$, and the inclination of the tone curve CL1 around the brightness value $L_{shoulder}^{(n1)}$ (around the control point P8) where output brightness has generally a white level is prevented from enormously becoming steep or moderate.

Accordingly, the tone curve CL1 becomes an inverse-S-latter-shaped curve monotonously increasing wherein the inclination slope becomes moderate around the control point P6, and becomes generally one around the control point P4 and P8. That is to say, when output brightness has around the intermediate brightness level $L_{mid}^{(n1)}$, the gray level compression rate is increased, and the higher (greater) or lower (smaller) brightness level output brightness has around, the compression rate is decreased. This is because after the gray level is compressed using the tone curve CL1, when contrast correction is carried out, as described above, the closer to around the intermediate brightness level $L_{mid}^{(n1)}$ the contrast of the brightness component is emphasized, the contrast similar to the image before gray level compression can be obtained, and on other hand, in order to prevent clipping of the brightness value, the contrast of the brightness component around the minimum value $L_{min}^{(n1)}$ or maximum value $L_{max}^{(n1)}$ is almost not corrected.

Accordingly, the gray level compression using the tone curve CL1 and the contrast correction in step S30 are combined, whereby the gray level compression of an image can be carried out without causing blackout and whiteout while generally maintaining the details of the image.

Also, the tone curve CL1 is generated for each image based on the base value $L_{dark\text{-}ts}^{(n1)}$, base value $L_{bright\text{-}ts}^{(n1)}$, and average level $L_{average\text{-}ts}^{(n1)}$ which have been calculated from input image data, whereby the gray level of the image can be compressed suitably according to the distribution of the pixel values (brightness values) of the input image data.

Note that hereafter, the processing will be described assuming that the tone curve CL1 shown in FIG. 31 has been generated in step S134.

In step S135, the gamma calculating unit 333 calculates the γ_comp parameter based on the shape of tone curve. Specifically, the gamma calculating unit 333 calculates the inclination of a segment SL1 connecting the control points P5 and P7 to obtain a value similar to the inclination of the tone curve CL1 at around the control point P6, and sets the calculated inclination as the γ_comp parameter.

In step S136, the curve drawing unit 332 stores the tone curve in the memory. That is to say, the curve drawing unit 332 stores the look-up table representing the generated tone curve CL1 in the tone-curve memory 164.

In step S137, the gamma calculating unit 333 outputs the γ_comp parameter, and the tone curve and γ_comp calculation processing ends. That is to say, the gamma calculating unit 333 outputs γ_comp parameter to the input/output property setting unit 341 of the contrast gain-curve calculating unit 165.

Next, the details of the contrast gain-curve calculation processing in step S37 in FIG. 23 will be described with reference to the flowchart in FIG. 32.

In step S141, the input/output property setting unit 341 generates an input/output property curve representing input/output properties assuming that $L_c^{(n1)}(p) - L_{c1}^{(n1)}(p)$ (input contrast component) of the right side of the following Expression (25) which is a modification of Expression (21) is taken as input, and $L_c^{(n1)}(p) - L_{c1}^{(n1)}(p)$ (output contrast component) of the left side is taken as output.

$$L_u^{(n1)}(p) - L_{c1}^{(n1)}(p) = (g(p)+1) \cdot (L_c^{(n1)}(p) - L_{c1}^{(n1)}(p)) \quad (25)$$

An input/output property curve is generated, which has properties wherein the output contrast component monotonously increases as to the input contrast component so as not to invert the size relation between the brightness value before contrast correction and the brightness value after contrast correction, i.e., so as not to cause gray level inversion, and further in other words, so as not to cause the value of the right side of the above-mentioned Expression (4) to be equal to or smaller than zero within a valid brightness range.

Also, an input/output property curve is generated, which has properties wherein at around the value of the input contrast component which is zero, the inclination becomes the maximum and also greater than one, and within a predetermined range of the value of the input contrast component, the greater the absolute value of the input contrast component is, the more moderate the inclination slope is, and also with a range where the value of the input contrast exceeds the predetermined range thereof, the inclination is generally one, such that the brightness value $L_u^{(n1)}(p)$ after contrast correction is not saturated.

Figure 33:
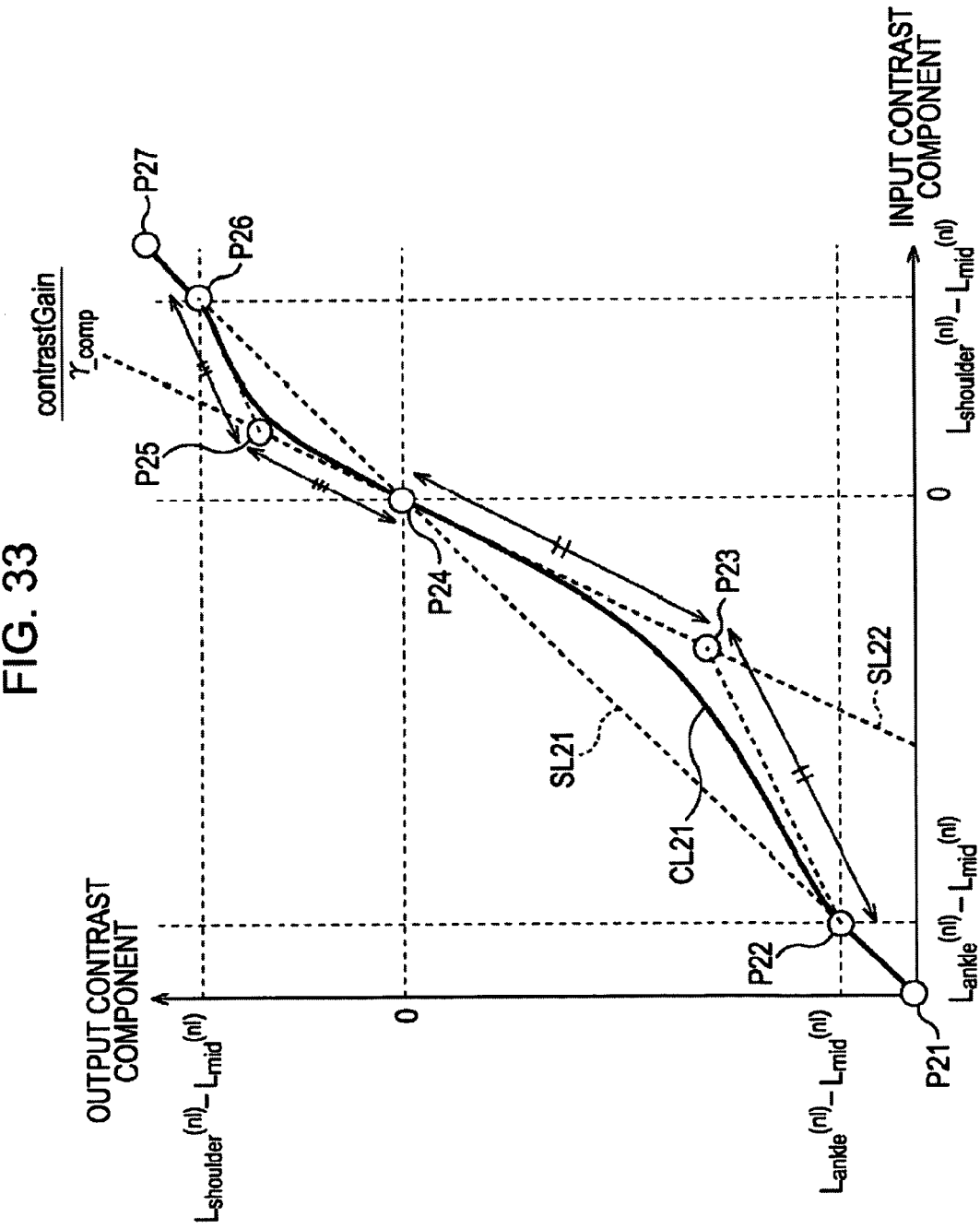
FIG. 33 is a graph illustrating an input/output property curve.

FIG. 33 illustrates an example of such an input/output property curve. Note that the horizontal axis direction in FIG. 33 indicates the input contrast component, i.e., the value of the brightness value before contrast correction $L_c^{(n1)}(p)$—the overall brightness value $L_{c1}^{(n1)}(p)$, and the vertical axis direction indicates the output contrast component, i.e., the value of the brightness value after contrast correction $L_u^{(n1)}(p)$—the overall brightness value $L_{c1}^{(n1)}(p)$. Also, a straight line SL21 indicates a straight line which passes through the origin (0, 0), and has inclination of one, and a straight line SL22 indicates a straight line which passes through the origin (0, 0), and has inclination of contrastGain/γ_comp.

Note that contrastGain is a constant which is set beforehand, setting contrastGain more greatly than one enables contrast correction to be carried out so as to emphasize the contrast rather than the image made up of the brightness value before gray level compression $L^{(n1)}(p)$.

The input/output property curve CL21 in FIG. 33 is an S-letter-shaped curve which passes through the origin (0, 0), has inclination which is set so as to be generally along the straight line SL22 with the value of the input contrast component being zero, and has inclination which is set so as to be similar to the straight line SL21 with an area where the absolute value of the input contrast component is great.

Now, description will be made regarding a method for generating the input/output property curve CL21 in FIG. 33.

First, the input/output property setting unit 341 sets seven control points P21 through P27.

The control point P21 is set to a point on the straight line SL21 wherein with an area where the value of the input contrast component is negative, the absolute value of the input contrast component is sufficiently greater than the control point P22.

The control point P22 is set at a position where the input/output property curve CL21 is in contact with the straight line SL21 with an area where the value of the input contrast component is negative. When taking into consideration the fact that the inclination of the above-mentioned tone curve CL1 in FIG. 31 is generally one at around the control point P4 where the output brightness is $L_{ankle}^{(n1)}$ for example, it is desirable to set the value of the input contrast component of the control point P22 to the brightness value $L_{ankle}^{(n1)}$—intermediate brightness level $L_{mid}^{(n1)}$.

The control point P23 is set to a point on the straight line SL22 where the absolute value of the input contrast component is smaller than the control point P22 with an area where the value of the input contrast component is negative. For example, as shown in FIG. 33, a point on the straight line SL22 where the distance from the control point P22 is equal to the distance from the control point P24 is suitable as the control point P23.

The control point P24 is set to the origin (0, 0). Thus, the input/output property curve CL21 necessarily passes through the origin (0, 0) or the neighborhood thereof.

The control point P25 is set to a point on the straight line SL22 where the value of the input contrast component is smaller than the control point P26 with an area where the value of the input contrast component is positive. For example, as shown in FIG. 33, a point on the straight line SL22 where the distance from the control point P24 is equal to the distance from the control point P26 is suitable as the control point P25.

The control point P26 is set at a position where the input/output property curve CL21 is in contact with the straight line SL21 with an area where the value of the input contrast component is positive. When taking into consideration the fact that the inclination of the above-mentioned tone curve CL1 in FIG. 31 is generally one at around the control point P8 where the output brightness is $L_{shoulder}^{(n1)}$, for example, it is desirable to set the value of the input contrast component of the control point P26 to the brightness value $L_{shoulder}^{(n1)}$__ intermediate brightness level $L_{mid}^{(n1)}$.

The control point P27 is set to a point on the straight line SL21 wherein with an area where the value of the input contrast component is positive, the absolute value of the input contrast component is sufficiently greater than the control point P26.

Subsequently, the input/output property setting unit 341 generates a piecewise polynomial curve (e.g., such as B-Spline curve or Bezier curve or the like) based on the respective points of the control points P21 through P27 as the input/output property curve CL21, and generates the look-up table of the input/output property curve CL21.

That is to say, the input/output property curve CL21 has properties wherein the output contrast component monotonously increases as the input contrast component, and at around the value of the input contrast component which is zero, the inclination is generally equal to contrastGain/γ_comp which is the maximum and the inclination of the straight line SL22, and with a range stipulated with the control points P22 and P26 (hereafter, also referred to as a correction range), within a range of the values of the input contrast component from $L_{ankle}^{(n1)}-L_{mid}^{(n1)}$ to $L_{shoulder}^{(n1)}-L_{mid}^{(n1)}$, the greater the absolute value of the input contrast component is, the more moderate the inclination is, and the absolute value of the output contrast component as to the input contrast component is equal to or greater than the absolute value of the input contrast component thereof, and with a range exceeding a correction range, the inclination is generally one.

The input/output property setting unit 341 stores the look-up table of the generated input/output property curve in the input/output property carve memory 342.

Note that description will be made below assuming that the input/output property curve CL21 shown in FIG. 33 has been generated in step S141.

In step S142, the gain properties calculating unit 343 converts the input/output property curve into a contrast gain curve. Specifically, the gain properties calculating unit 343 reads out the look-up table representing the input/output property curve CL21 from the input/output property curve memory 342. The gain properties calculating unit 343 substitutes a value combination of the input contrast component and output contrast component with the input/output property curve CL21 for the following Expression (26), thereby generating a contrast gain curve CL31 representing the relation between the input contrast component and gain value g(p) shown in FIG. 34.

$$G(p)=|L_u^{(n1)}(p)-L_{c1}^{(n1)}(p)|/|L_c^{(n1)}(p)-L_{c1}^{(n1)}(p)|-1 \quad (26)$$

Note that Expression (26) is an expression wherein Expression (25) is modified, and further, $L_u^{(n1)}(p)-L_{c1}^{(n1)}(p)$ and $L_c^{(n1)}(p)-L_{c1}^{(n1)}(p)$ are substituted for the absolute values of the respective values thereof.

With the contrast gain curve CL31, when the input contrast component is zero, the gain value g(p) is a peak value contrastGain/γ_comp−1, and within a range of the values of the input contrast component from $L_{ankle}^{(n1)}-L_{mid}^{(n1)}$ to $L_{shoulder}^{(n1)}-L_{mid}^{(n1)}$, as the absolute value of the input contrast component increases, the gain value g(p) approximates zero, and with a range where the value of the input contrast component exceeds a range of from $L_{ankle}^{(n1)}-L_{mid}^{(n1)}$ to $L_{shoulder}^{(n1)}-L_{mid}^{(n1)}$, the gain value g(p) is zero. Also, the contrast gain curve CL31 has properties wherein within a range of the values of the input contrast component from $L_{ankle}^{(n1)}-L_{mid}^{(n1)}$ to $L_{shoulder}^{(n1)}-L_{mid}^{(n1)}$, as the absolute value of the input contrast component increases, the change rate of the gain value g(p) as to the input contrast component increases halfway, and subsequently, decreases.

In step S143, the gain properties calculating unit 343 stores the contrast gain curve in the memory, and the contrast gain-curve calculation processing ends. That is to say, the gain properties calculating unit 343 stores the look-up table representing the generated contrast gain curve CL31 in the contrast gain-curve memory 166.

Next, the details of the reduction image generating processing in step S38 in FIG. 23 will be described with reference to the flowchart in FIG. 35.

In step S151, the reduction image generating unit 167 calculates the average value of the brightness of the pixels within a block. Specifically, for example, the average-value calculating unit 352-1 (FIG. 15) of the reduction image generating unit 167 calculates the average value of the brightness of the first block by dividing the brightness sum value of the pixels within the first block held by itself by the number of pixels within the block.

In step S152, the reduction image generating unit 167 stores the average value of the brightness of the block in the position of the corresponding pixel on the memory. Specifically, for example, the average-value calculating unit 352-1 stores the calculated average value of the brightness of the first block at the position of the corresponding pixel (e.g., most left upper pixel) on the reduction image memory 168.

In step S153, the reduction image generating unit 167 determines whether or not all the blocks have been processed. In the case of determining that all the blocks have not been processed yet, the processing returns to step S151, and the processing in steps S151 through S153 is repeatedly executed until determination is made in step S153 that all the blocks have been processed. That is to say, the average value of brightness is calculated in the same way in order regarding the second block and thereafter, and the calculated average value is stored at the position of the pixel corresponding onto the reduction image memory 168.

In the case of determination being made in step S153 that all the blocks have been processed, the reduction image generating processing ends.

Thus, the image made up of the brightness value $L^{(n1)}(p)$ is divided into horizontally $w_r$×vertically $h_r$ blocks, and the average value of the brightness value $L_{(n1)}(p)$ for each divided block is arrayed in order of the blocks, thereby generating a reduction image of horizontally $w_r$×vertically $h_r$ pixels.

Thus described above, gray level compression of an image can be carried out almost without causing blackout and whiteout, and without causing gray level inversion, while maintaining the details of an image. Also, the gray level of an image can be compressed suitably according to the distribution of the pixel values (brightness values) of input image data.

Further, gray level transformation is carried out employing the reduction image, tone curve, and contrast gain curve generated or calculated in the processing of the frame before the current frame, whereby there is almost no caused time delay of the processing for generating a reduction image, and calculating a tone curve and a contrast gain curve as compared with a case wherein gray level transformation is carried out employing the reduction image, tone curve, and contrast gain curve generated or calculated within the same frame, and accordingly, processing time can be shortened. Also, completion of generation of the reduction image, or calculation of the tone curve and contrast gain curve is awaited, so for example, there is no need to hold one frame worth of image, whereby the amount of memory used can be reduced.

Note that the reduction image, tone curve, and contrast gain curve are all information not depending on the details of an image, which causes almost no problem regarding time deviation due to employing the information of the frame before the current frame. For example, information including a high-frequency component such as the edge information of a subject sometimes causes positional deviation of a subject between frames with a moving image, in such a case, processing such as interpolating the positional deviation is needed, but with regard to the reduction image, tone curve, and contrast gain curve, such a problem is not caused.

Also, even in the case of carrying out gray level transformation employing the reduction image, tone curve, and contrast gain curve generated or calculated within the same frame, generation of the reduction image, and calculation of the tone curve and contrast gain curve can be carried out in parallel, whereby processing time can be shortened.

Now, description will be made regarding another embodiment of the gain-value calculating unit 391 in FIG. 17 with reference to FIG. 36.

Figure 36:
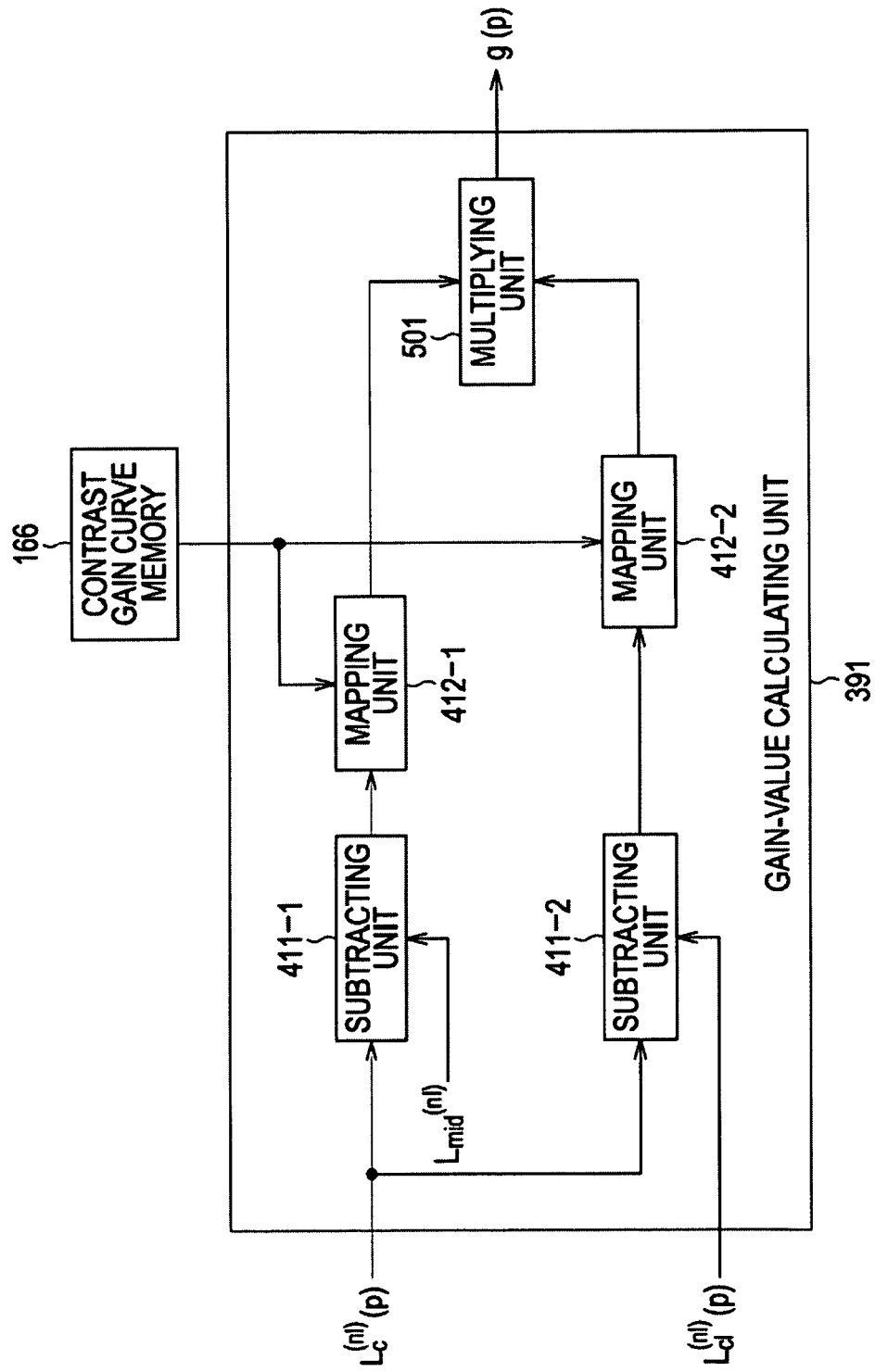
FIG. 36 is a block diagram illustrating another embodiment of the functional configuration of the gain-value calculating unit in FIG. 17.

FIG. 36 is a block diagram illustrating another embodiment of the gain-value calculating unit 391 in FIG. 17. The gain-value calculating unit 391 in FIG. 36 is configured so as to include subtracting units 411-1 and 411-2, mapping units 412-1 and 412-2, and a multiplying unit 501. Note that in the drawing, the components corresponding to those in FIG. 18 are denoted with the same reference numerals, and with regard to the components having the same processing, the description thereof is redundant, so will be omitted.

The multiplying unit 501 multiplies the gain value g(p) from the mapping unit 412-1 and the gain value g(p) from the mapping unit 412-2, and supplies the multiplication result to the contrast emphasizing unit 392 as the ultimate gain value g(p).

In a situation wherein brightness saturation is readily caused, the input contrast component is increased, or the brightness value approximates the minimum value or maximum value, so any one of the gain value g(p) obtained by the mapping unit 412-1 and the gain value g(p) obtained by the mapping unit 412-2 approximates a value close to zero. Accordingly, the product between those two gain values g(p) is calculated, and the calculated product is taken as the ultimate gain value g(p), whereby the gain value g(p) is prevented from increasing in a situation wherein brightness saturation is readily caused.

Note that with above description, the example has been shown wherein the mapping unit 412-1 and mapping unit 412-2 obtain the gain value g(p) employing the same contrast gain curve, but each may obtain the gain value g(p) based on different gain properties. For example, an arrangement can be made wherein the mapping unit 412-1 obtains the gain value g(p) based on the gain properties in FIG. 3 of the above-mentioned Japanese Unexamined Patent Application Publication No. 2007-049540, and the brightness value $L_c^{(n1)}(p)$, and the mapping unit 412-2 obtains the gain value g(p) based on the contrast gain curve CL31 in FIG. 34, and the difference value (contrast component) between the brightness value $L_c^{(n1)}(p)$ and overall brightness value $L_{c1}^{(n1)}(p)$ in the same way as with the above-mentioned processing in step S122.

Next, description will be made regarding a second embodiment of the present invention with reference to FIGS. 37 through 43.

Figure 37:
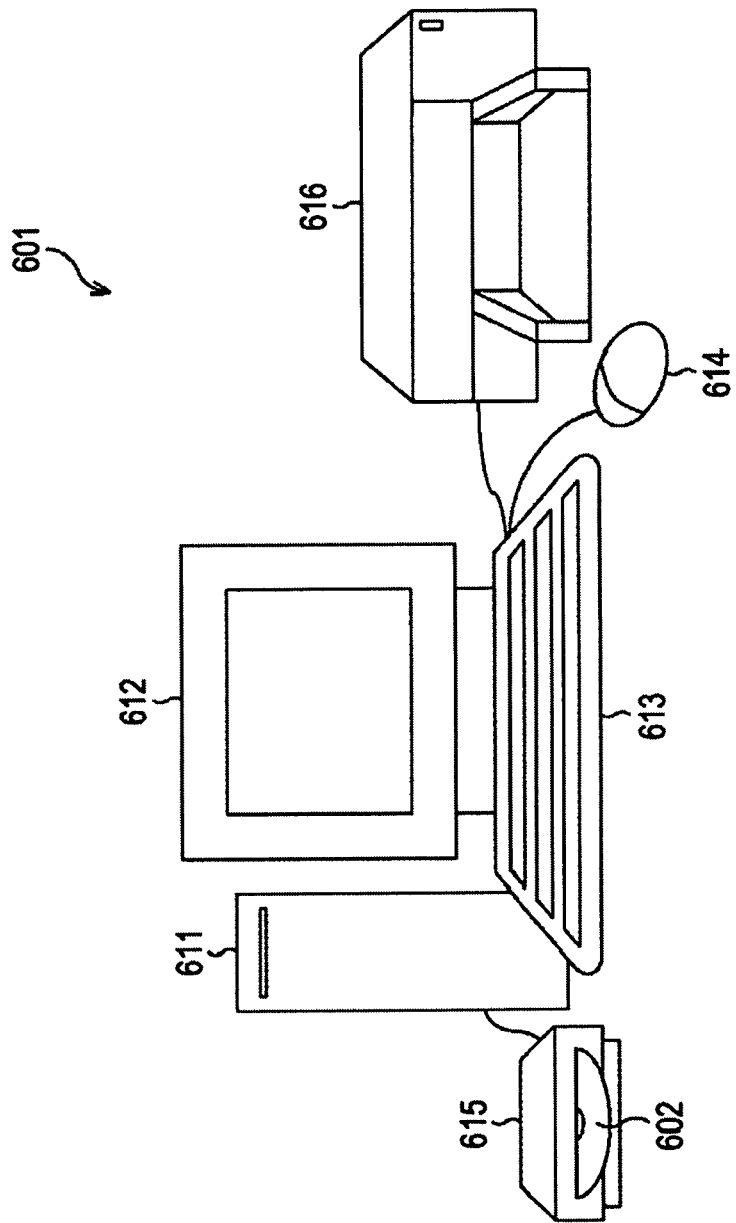
FIG. 37 is an external configuration view illustrating an embodiment of a PC system to which the present invention is applied.
Figure 38:
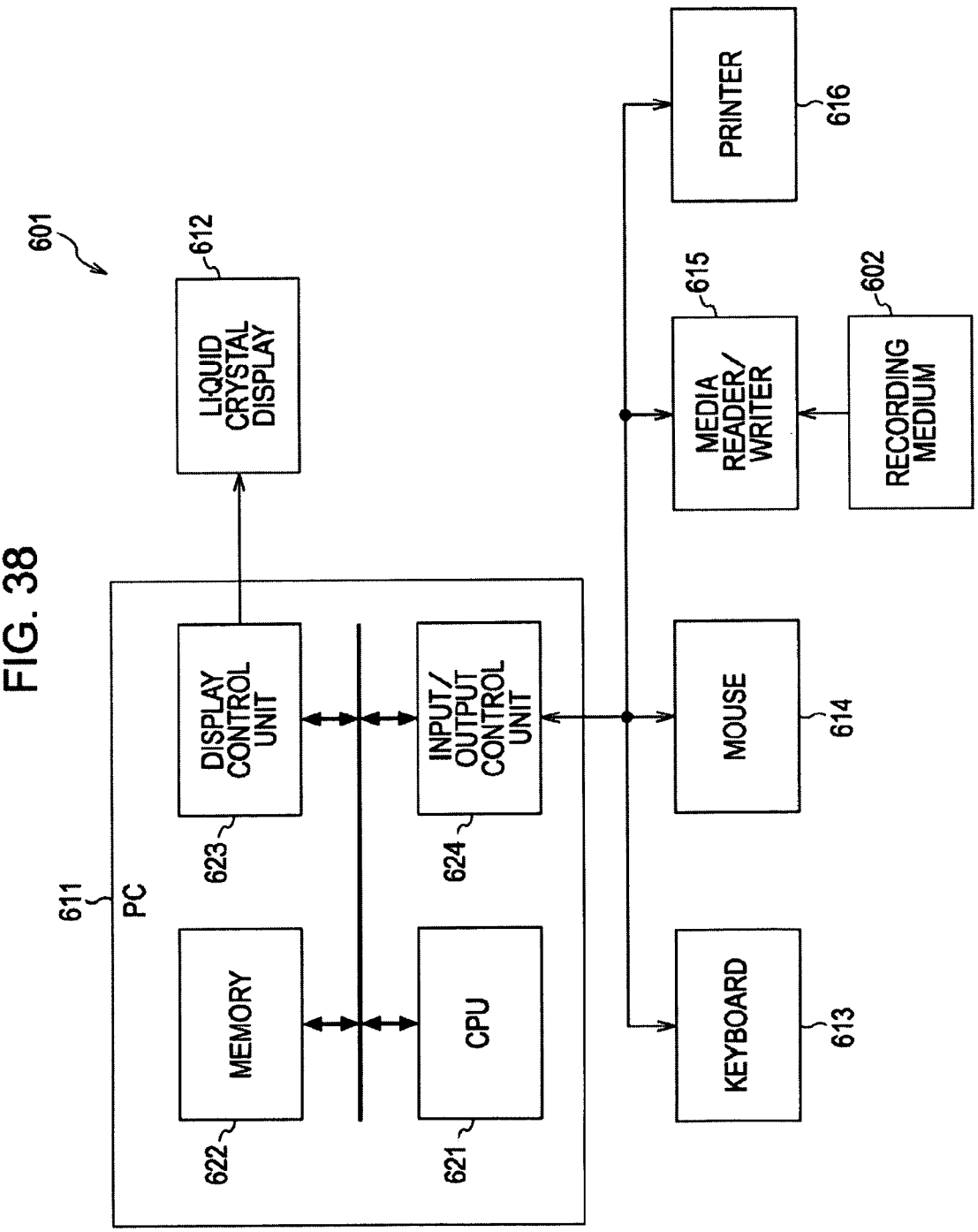
FIG. 38 is a block diagram illustrating an embodiment of a PC system to which the present invention is applied.

FIG. 37 is an external configuration view illustrating an external configuration example of a PC (personal computer) system 601 which is a second embodiment of the present invention, and FIG. 38 is a block diagram illustrating the functional configuration of the PC system 601.

The PC system 601 is configured, for example, in the same way as with a marketed common PC system, so as to include a PC (personal computer) 611, a liquid crystal display 612, a keyboard 613, a mouse 614, a media reader/writer 615, and a printer 616.

The PC 611 is configured of, for example, a PC having a marketed common architecture, and is configured so as to include a CPU 621, memory 622, a display control unit 623, and an input/output control unit 624, such as a portion thereof shown in FIG. 38. The CPU 621, memory 622, display control unit 623, and input/output control unit 624 are mutually connected through a bus.

The CPU 621 is an arithmetic unit for performing execution of a program, control of each unit within the PC 611 and each device connected to the PC 611, and so forth.

The memory 622 is configured of, for example, a hard disk, RAM, or the like, stores various types of programs executed by the CPU 621, and temporarily stores data necessary for the processing of the CPU 621.

The display control unit 623 is configured of, for example, a graphic controller and video interface and so forth, generates an image to be displayed on the liquid crystal display 612 connected to the display control unit 623, and supplies the generated image to the liquid crystal display 612 to display this.

The input/output control unit 624 is configured of, for example, a USB (Universal Serial Bus) controller, a USB interface, and so forth, which is connected with the keyboard 613, mouse 614, media reader/writer 615, and printer 616. The input/output control unit 624 controls communication between the CPU 622 and the devices connected to the input/output control unit 624 under the control of the CPU 621.

Also, a predetermined image correction program is installed in the PC 611. As described later with reference to FIG. 41 and the like, when a recording medium 602 in which an image is recorded is mounted on the media reader/writer 615, the CPU 621 activates the image correction program thereof, executes processing for correcting the contrast of the image according to the operations of a user, and records the contrast-corrected image in the recording medium 602. Note that this contrast correction processing realizes processing wherein the above-mentioned contrast correction technique of the gray level transformation unit 143 is combined with existing unsharp masking processing as base.

Figure 39:
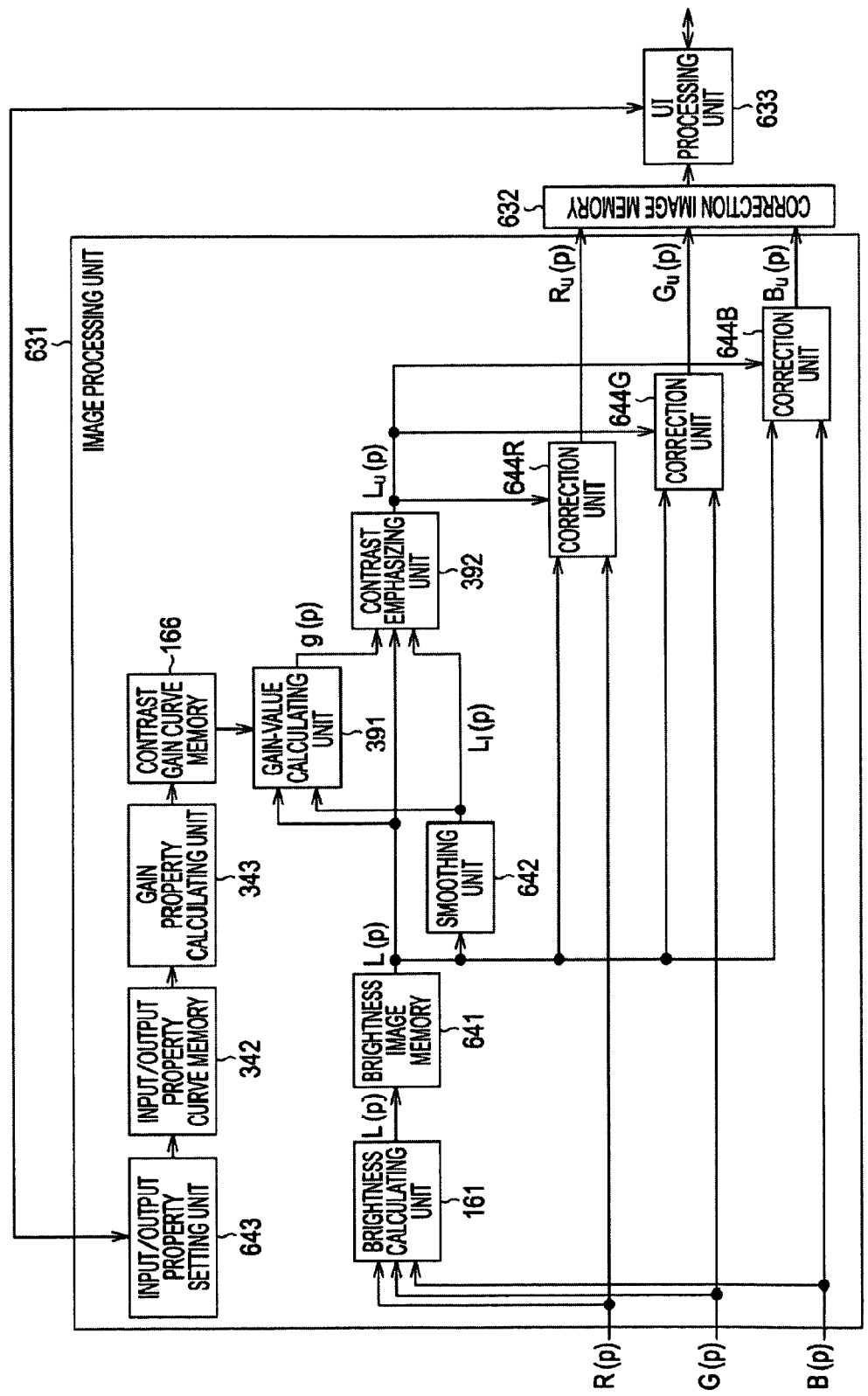
FIG. 39 is a block diagram illustrating a functional configuration example to be realized by the CPU in FIG. 38 executing an image correction program.

FIG. 39 is a block diagram illustrating a functional configuration example to be realized by the CPU 621 executing the image correction program. The CPU 621 executes the image correction program, whereby functions including an image processing unit 631 and a UI processing unit 633 are realized. Note that in the drawing, the components corresponding to those in FIGS. 7, 14, and 17 are denoted with the same reference numerals, and with regard to the components having the same processing, the description thereof is redundant, so will be omitted.

Figure 41:
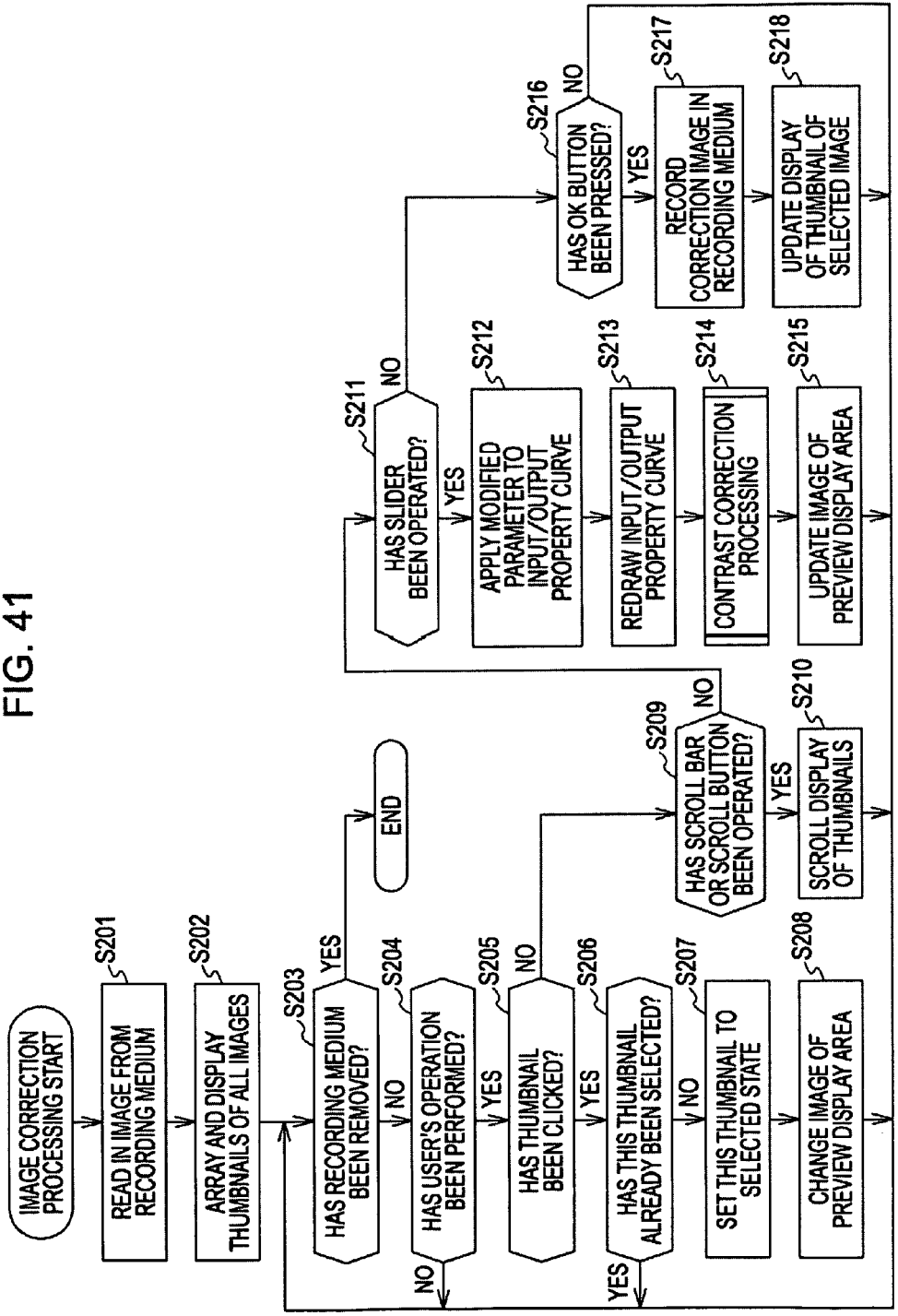
FIG. 41 is a flowchart for describing image correction processing to be executed by the PC system in FIG. 38.

As described later with reference to FIG. 41 and the like, the image processing unit 631 executes processing for correcting the contrast of an image. The image processing unit 631 is configured so as to include the brightness calculating unit 161, brightness image memory 641, a smoothing unit 642, an input/output property setting unit 643, the input/output property curve memory 342, the gain properties calculating unit 343, the contrast gain curve memory 166, the gain-value calculating unit 391, the contrast emphasizing unit 392, correction units 644R through 644B.

The brightness calculating unit 161 reads out pixel values R(p), G(p), and B(p) of the image (hereafter, referred to the selected image) selected by the user, of the images read out from the recording medium 602 and stored in the memory 622, and as described later with reference to FIG. 43, calculates the brightness value L(p) corresponding to the pixel position p thereof from the pixel values R(p), G(p), and B(p), and stores this in the brightness image memory 641.

The smoothing unit 642 is configured of, for example, a smoothing filter for extracting the low-frequency area component of an input image by performing smoothing processing of a predetermined technique. The smoothing unit 642 subjects the image (hereafter, also referred to as the brightness image) made up of the brightness value L(p) stored in the brightness image memory 641 to smoothing to calculate a brightness low-frequency component $L_1(p)$ which is the low-frequency component of each pixel of the brightness image, and outputs this to the gain-value calculating unit 391 and contrast emphasizing unit 392.

As described later with reference to FIG. 41, the input/output property setting unit 643 acquires the inclination of the straight line SL22, the position of the control point P22, and the position of the control point P26 which are the parameters for generating the input/output property curve CL21 in FIG. 33, from the UI processing unit 633, and generates an input/output property curve CL21 based on the acquired parameter. That is to say, the input/output property setting unit 643 generates an input/output property curve CL21 based on the inclination of the input/output property curve CL21 around the input contrast component which is zero, and the correction range stipulated with the control points P22 and P26, which are specified by the user. The input/output property setting unit 643 supplies the look-up table representing the generated input/output property curve CL21 to the UI processing unit 633, and stores this in the input/output property curve memory 342.

The gain properties calculating unit 343 reads out the look-up table representing the input/output property curve CL21 from the input/output property curve memory 342. The gain properties calculating unit 343 generates the above-mentioned contrast gain curve CL31 shown in FIG. 34 based on the input/output property curve CL21. The gain properties calculating unit 343 stores the look-up table representing the generated contrast gain curve CL31 in the contrast gain-curve memory 166.

The gain-value calculating unit 391 reads out the brightness value L(p) from the brightness image memory 641, reads out the look-up table representing the contrast gain curve CL31 from the contrast gain-curve memory 166. As described later with reference to FIG. 43, the gain-value calculating unit 391 calculates the gain value g(p) based on the brightness value L(p), brightness low-frequency component $L_1(p)$, and the contrast gain curve CL31. The gain-value calculating unit 391 outputs the calculated gain value g(p) to the contrast emphasizing unit 392.

Note that whichever configuration of the abovementioned FIG. 18 and FIG. 36 may be employed as the gain-value calculating unit 391 of the image processing unit 631.

The contrast emphasizing unit 392 reads out the brightness value L(p) from the brightness image memory 641. As described later with reference to FIG. 43, the contrast emphasizing unit 392 corrects the contrast of the brightness image, and supplies the contrast-corrected brightness value $L_c(p)$ to the correction units 644R through 644B.

The correction units 644R through 644B read out the pixel values R(p), G(p), and B(p) of the selected image from the memory 622, and as described later with reference to FIG. 43, correct the contrast of the pixel values R(p), G(p), and B(p), respectively. The correction units 644R through 644B store the contrast-corrected pixel values R(p), G(p), and B(p) to the correction image memory 632, respectively.

Note that hereafter, in a case wherein there is no need to distinguish each of the correction units 644R through 644B, the correction units 644R through 644B will simply be referred to as the correction unit 644.

As described later with reference to FIG. 41 and the like, the UI processing unit 633 performs processing for the user interface portion of the image correction program. For example, the UI processing unit 633 controls the display control unit 623 to display a GUI panel 701 (described later with reference to FIG. 42) which is the GUI (Graphical User Interface) of the image correction program, and the image (hereafter, also referred to as the correction image) made up of the contrast-corrected pixel values $R_u(p)$, $G_u(p)$, and $B_u(p)$, and so forth on the liquid crystal display 612. Also, for example, in the case of the user operating the keyboard 613 or mouse 614, the UI processing unit 633 acquires information relating to the operation thereof through the input/output control unit 624, modifies the display content of the GUI panel 701, or supplies the parameters for generating the input/output property curve CL21 which are set by the user to the input/output property setting unit 643.

Note that each of the contrast gain-curve memory 166, input/output property curve memory 342, correction image memory 632, and brightness image memory 641 is realized with, for example, a part of the area of the memory 622.

Figure 40:
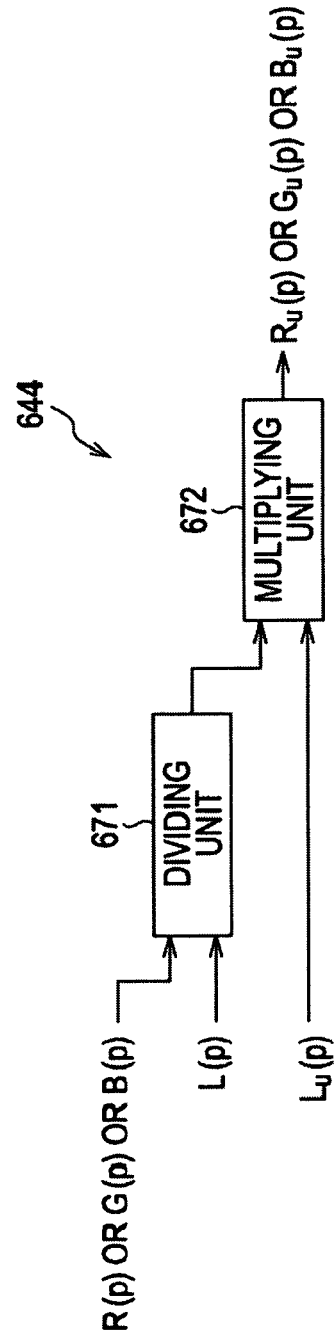
FIG. 40 is a block diagram illustrating a functional configuration example of the correction unit in FIG. 39.

FIG. 40 is a block diagram illustrating a functional configuration example of the correction unit 644. The correction unit 644 is configured so as to include a dividing unit 671 and a multiplying unit 672.

The dividing unit 671 obtains a division value by dividing the pixel values R(p), G(p), and B(p) by the brightness value L(p), and outputs this to the multiplying unit 672.

The multiplying unit 672 multiplies the division value calculated by the dividing unit 671 by the brightness low-frequency component $L_1(p)$, and stores the value obtained as a result thereof in the correction image memory 632 as the contrast-corrected pixel values $R_u(p)$, $G_u(p)$, and $B_u(p)$.

Next, description will be made regarding the image correction processing executed by the PC system 601 with reference to the flowchart in FIG. 41. Note that this processing is started, for example, when the recording medium 602 is mounted on the media reader/writer 615, and the CPU 621 of the PC 611 activates the image correction program.

In step S201, the media reader/writer 615 reads in the image form the recording medium 602 under the control of the UI processing unit 633. Specifically, the UI processing unit 633 acquires information indicating the content of the data recorded in the recording medium 602 through the media reader/writer 615 and input/output control unit 624. The UI processing unit 633 reads the image recorded in the recording medium 602 in the media reader/writer 615 based on the acquired information, and stores this in the memory 622 through the input/output control unit 624.

In step S202, the UI processing unit 633 arrays and displays the thumbnails of all the images. Specifically, the UI processing unit 633 generates a thumbnail wherein the display size of each image is reduced, regarding all the images read in the memory 622. The UI processing unit 633 controls the display control unit 623 to display the GUI panel which is the GUI of the image correction program on the liquid crystal display 612.

Figure 42:
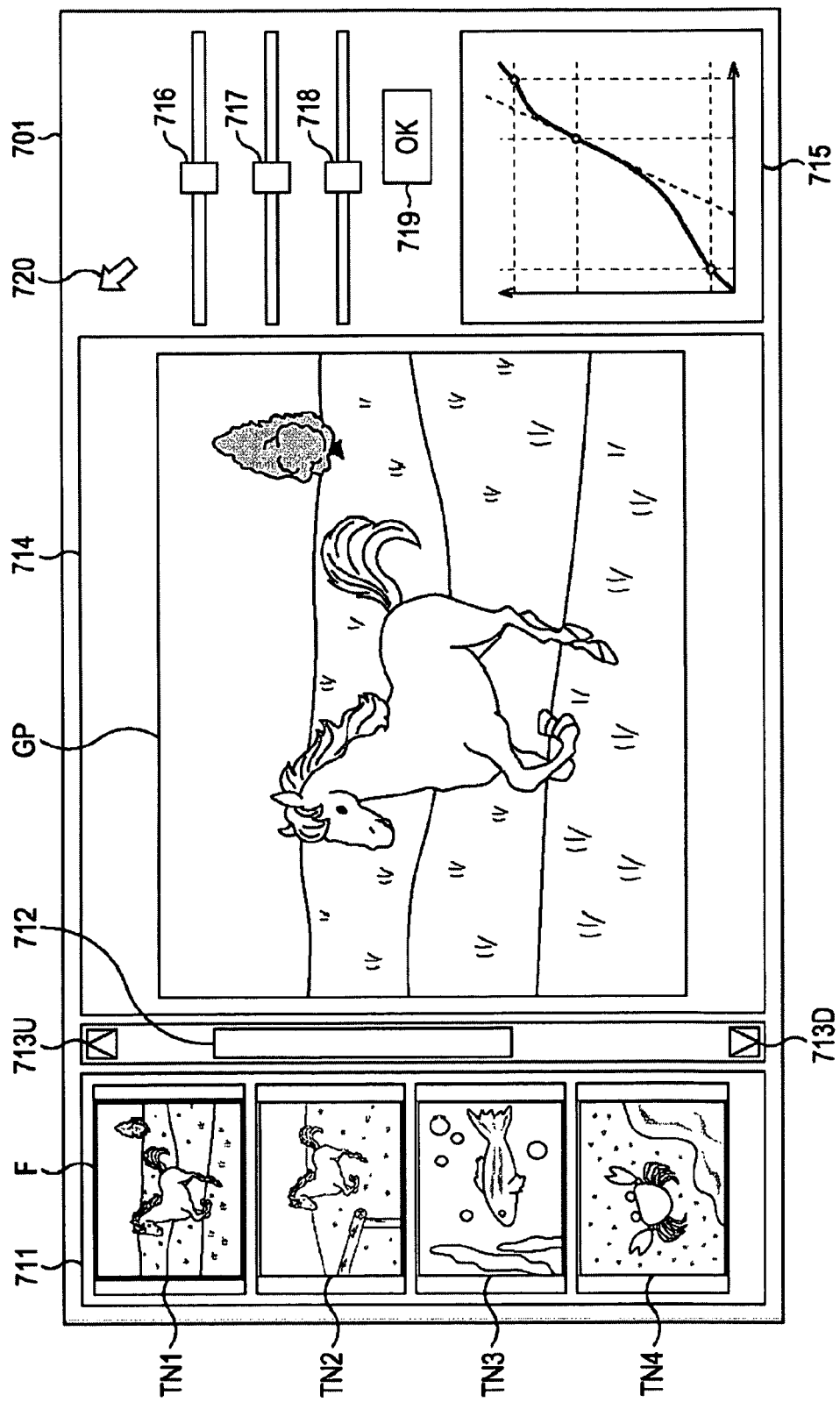
FIG. 42 is a diagram illustrating a GUI panel example displayed at the image correction processing.

FIG. 42 illustrates an example of the GUI panel displayed at this time. The GUI panel 701 in FIG. 42 is, for example, displayed on the full screen of the liquid crystal display 612, and within the GUI panel 701, a thumbnail display area 711, a scroll bar 712, scroll buttons 713U and 713D, a preview display area 714, a correction property display area 715, sliders 716 through 718, and an OK button 719 are displayed.

Within the thumbnail display area 711 of the left end of the GUI panel 701 the thumbnails of the images recorded in the recording medium 602 are arrayed vertically in a row and displayed. In FIG. 42, an example is illustrated wherein four thumbnails of thumbnail images TN1 through TN4 are displayed within the thumbnail display area 711. In a case wherein there are five or more thumbnails, the user can scroll display of thumbnails displayed within the thumbnail display area 711 down or up by operating the scroll bar 712, scroll button 713U, or scroll button 713D disposed at the right side of the thumbnail display area 711.

Also, the user can select one of the thumbnails displayed on the thumbnail display area 711, and a frame F is displayed on the circumference of the selected thumbnail. In FIG. 42, an example is illustrated wherein the thumbnail TN1 is selected, and the frame F is displayed on the circumference of the thumbnail TN1.

Within the preview display area 714 disposed generally at the center of the GUI panel 701 the preview image corresponding to the thumbnail selected within the thumbnail display area 711, i.e., the preview image of the selected image selected by the user is displayed with a size greater than the size of the thumbnails. In FIG. 42, a preview image GP corresponding to the thumbnail TN1 being selected now is displayed within the preview display area 714. Note that in the case of no thumbnail being selected within the thumbnail display area 711, no preview image is displayed within the preview display area 714.

Within the correction property display area 715 disposed at the lower right of the GUI panel 701 the input/output property curve CL21 described above with reference to FIG. 33 is displayed. The user makes the sliders 716 through 718 disposed above the correction property display area 715 slide to right or left, whereby the inclination of the straight line SL22 (i.e., the value of contrastGain/γ_comp), the position of the control point P22, and the position of the control point P26 can be adjusted respectively, and accordingly, the shape of the input/output property curve CL21 can be adjusted. Also, along therewith, the shape of the input/output property curve CL21 displayed within the correction property display area 715 is also changed, and the preview image of the preview display area 714 is updated to the image subjected to contrast correction using the adjusted input/output property curve CL21. In other words, the user can actually perform adjustment of each parameter employed for contrast correction while visually confirming the image and input/output property curve CL21. Subsequently, the user determines execution of contrast correction using the input/output property curve CL21 displayed within the correction property display area 715 by pressing the OK button disposed below the slider 718, whereby the image subjected to contrast correction can be recorded in the recording medium 602.

Also, on the GUI panel 701 the cursor 720 is displayed, for example, the user uses the keyboard 613 or mouse 614 to move the cursor 720, or specify an arbitrary position using the cursor 720, thereby performing operations as to the GUI panel 701.

In step S203, the UI processing unit 633 determines whether or not the recording medium 602 has been detached. In a case wherein information indicating that the recording medium 602 has been detached is not output from the media reader/writer 615, the UI processing unit 633 determines that the recording medium 602 has not been detached, and the processing proceeds to step S204.

In step S204, the UI processing unit 633 determines whether or not the user has performed an operation. In a case wherein information relating to the operation performed by the user as to the GUI panel 701 has not been output from the key board 613 and mouse 614, the UI processing unit 633 determines that the user has performed no operation, and the processing returns to step S203.

Subsequently, until determination is made in step S203 that the recording medium 602 has been detached, or until determination is made in step S204 that the user has performed an operation, the processing in steps S203 and S204 is repeatedly performed.

On the other hand, for example, in a case wherein the user uses the keyboard 613 or mouse 614 to perform an operation as to the GUI panel 701, and the information relating to the operation thereof is input to the UI processing unit 633 from the keyboard 613 or mouse 614 via the input/output control unit 624, the UI processing unit 633 determines in step S204 that the user has performed an operation, and the processing proceeds to step S205.

In step S205, the UI processing unit 633 determines whether or not any thumbnail has been clicked based on the information from the keyboard 613 or mouse 614. In a case wherein determination is made that any of the thumbnails displayed within the thumbnail display area 711 has been clicked with the cursor 720, the processing proceeds to step S206.

In step S206, the UI processing unit 633 determines whether or not the thumbnail clicked by the user is the thumbnail which has already been selected. In a case wherein the UI processing unit 633 determines that the thumbnail clicked by the user is not currently selected based on the information from the keyboard 613 or mouse 614, the processing proceeds to step S207.

In step S207, the UI processing unit 633 changes the thumbnail to a selected state. Specifically, the UI processing unit 633 controls the display control unit 623 to display the frame F on the circumference of the thumbnail clicked by the user within the thumbnail display area 711. Also, in a case wherein another thumbnail has been selected so far, the UI processing unit 633 controls the display control unit 623 to eliminate the frame F displayed on the circumference of the thumbnail which has been selected so far.

In step S208, the UI processing unit 633 changes the image within the preview display area 714. Specifically, the UI processing unit 633 controls the display control unit 623 to display the preview image corresponding to the newly selected thumbnail within the preview display area 714. Subsequently, the processing returns to step S203, and the processing in step S203 and thereafter is executed.

On the other hand, in a case wherein determination is made in step S206 that the thumbnail clicked by the user is the thumbnail which has already been selected, the processing returns to step S203, and the processing in step S203 and thereafter is executed.

Also, in a case wherein determination is made in step S205 that none of the thumbnails displayed within the thumbnail display area 711 has been clicked with the cursor 720, the processing proceeds to step S209.

In step S209, the UI processing unit 633 determines whether or not the scroll bar 712, or scroll button 713U or 713D has been operated based on the information from the keyboard 613 or mouse 614. In a case wherein determination is made that the scroll bar 712, or scroll button 713U or 713D has been operated, the processing proceeds to step S210.

In step S210, the UI processing unit 633 scrolls through a display of the thumbnails. Specifically, the UI processing unit 633 controls the display control unit 623 to scroll display of the thumbnails within the thumbnail display area 711 upward or downward according to the operation as to the scroll bar 712, scroll button 713U, or scroll button 713D. Subsequently, the processing returns to step S203, and the processing in step S203 and thereafter is executed.

On the other hand, in a case wherein determination is made in step S209 that none of the scroll bar 712 and scroll buttons 713U and 713D has been operated, the processing proceeds to step S211.

In step S211, the UI processing unit 633 determines whether or not the sliders 716 through 718 have been operated based on the information from the keyboard 613 or mouse 614. In a case wherein determination is made that one of the sliders 716 through 718 has been operated, the processing proceeds to step S212.

In step S212, the input/output property setting unit 643 applies the modified parameters to the input/output property curve CL21. Specifically, the UI processing unit 633 supplies the information indicating the values of the parameters (the inclination of the straight line SL22, the position of the control point P22, or the position of the control point P26) modified by the user making one of the sliders 716 through 718 to the input/output property setting unit 643. The input/output property setting unit 643 changes the shape of the input/output property curve CL21 based on the obtained parameters. The input/output property setting unit 643 supplies the look-up table of the modified input/output property curve CL21 to the UI processing unit 633, and stores this in the input/output property curve memory 342.

In step S213, the UI processing unit 633 redraws the input/output property curve CL21. Specifically, the UI processing unit 633 controls the display control unit 623 to display the input/output property curve CL21 to which the modified parameters have been applied within the correction property display area 715 of the GUI panel 701 based on the look-up table obtained from the input/output property setting unit 643.

In step S214, the image processing unit 631 executes contrast correction processing. The details of the contrast correction processing will be described later with reference to FIG. 43, but according to this processing, a corrected image is generated wherein the selected image is subjected to contrast correction based on the input/output property curve CL21 displayed within the correction property display area 715, and is stored in the correction image memory 632.

In step S215, the UI processing unit 633 updates the image within the preview display area 714. Specifically, the UI processing unit 633 controls the display control unit 623 to display the preview image based on the corrected image stored in the correction image memory 632, within the preview display area 714. Subsequently, the processing returns to step S203, and the processing in step S203 and thereafter is executed.

On the other hand, in a case wherein determination is made in step S211 that none of the sliders 716 through 718 has been operated, the processing proceeds to step S216.

In step S216, the UI processing unit 633 determines whether or not the OK button 719 has been pressed based on the information from the keyboard 613 or mouse 614. In a case wherein determination is made that the OK button 719 has been pressed, the processing proceeds to step S217.

In step S217, the UI processing unit 633 records the corrected image in the recording medium 602. Specifically, the UI processing unit 633 reads out the corrected image from the correction image memory 632, and supplies this to the media reader/writer 615 through the input/output control unit 624. The media reader/writer 615 replaces the selected image before contrast correction stored in the recording medium 602 with the corrected image.

In step S218, the UI processing unit 633 updates display of the thumbnail of the selected image. Specifically, the UI processing unit 633 generates the thumbnail of the corrected image, and controls the display control unit 623 to replace the thumbnail of the selected image being displayed now within the thumbnail display area 711 with the thumbnail based on the newly generated corrected image, and display this. Subsequently, the processing returns to step S203, and the processing in step S203 and thereafter is executed.

On the other hand, in a case wherein determination is made in step S216 that the OK button 719 has not been pressed, the processing returns to step S203, and the processing in step S203 and thereafter is executed.

Also, in a case wherein determination is made in step S203 that the recording medium 602 has been detached from the media reader/writer 615, the image correction processing ends.

Next, description will be made regarding the details of the contrast correction processing in step S214 in FIG. 41 with reference to the flowchart in FIG. 43.

Figure 32:
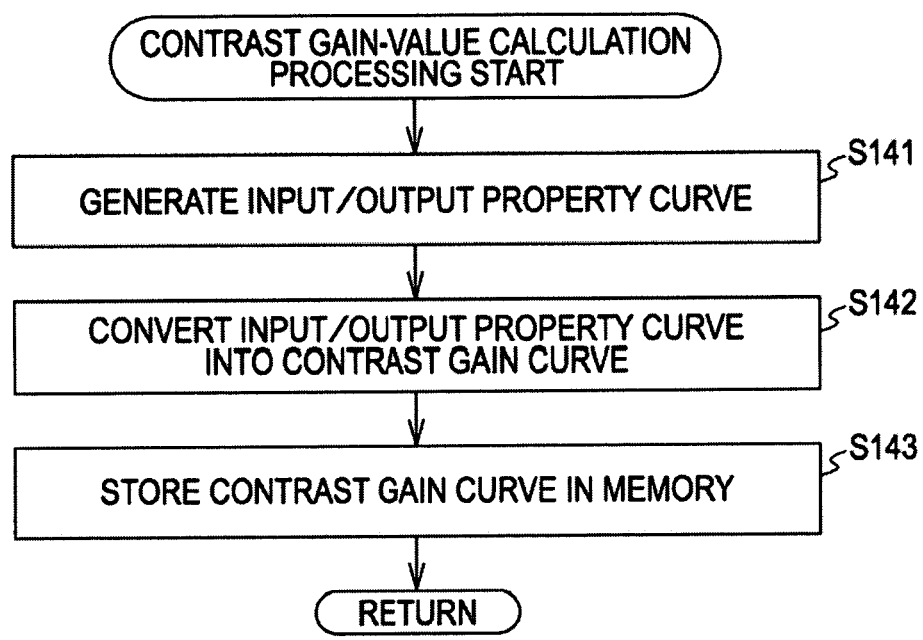
FIG. 32 is a flowchart for describing the details of the contrast gain curve calculation processing in step S37 in FIG. 23.

In step S231, the gain properties calculating unit 343 converts the input/output property curve CL21 stored in the input/output property curve memory 342 into the contrast gain curve CL31 according to the same processing as the above-mentioned step S142 in FIG. 32. The gain properties calculating unit 343 stores the look-up table representing the generated contrast gain curve CL31 in the contrast gain curve memory 166.

In step S232, the brightness calculating unit 161 calculates a brightness value according to the same processing as the above-mentioned step S24 in FIG. 22. Note however, the brightness calculating unit 161 reads in the pixel values $R(p)$, $G(p)$, and $B(p)$ of the pixel position p of the selected image from the memory 622 instead of the pixel values $R_w(p)$, $G_w(p)$, and $B_w(p)$ of the pixel position p in step S24, and calculates the brightness value $L(p)$ corresponding to the pixel position p using the pixel values $R(p)$, $G(p)$, and $B(p)$. The brightness calculating unit 161 stores the calculated brightness value $L(p)$ in the brightness image memory 641.

In step S233, the brightness calculating unit 161 determines whether or not all the pixels within the frame have been processed. In a case wherein determination is made that all the pixels within the frame have not been processed yet, the processing returns to step S232, and in step S233, the processing in steps S232 and S233 is repeatedly executed until determination is made that all the pixels within the frame have been processed. That is to say, the brightness values of all the pixels of the selected image are calculated in order one pixel at a time (e.g., in raster scan order), and a brightness image made up of the brightness values of the selected image is stored in the brightness image memory 641.

On the other hand, in a case wherein determination is made in step S233 that all the pixels within the frame have been processed, the processing proceeds to step S234.

In step S234, the smoothing unit 642 calculates a brightness low-frequency component. Specifically, the smoothing unit 642 reads out the pixel position p of the brightness image to be subjected to smoothing next, and the brightness values of the neighborhood pixels thereof from the brightness image memory 641. The smoothing unit 642 subjects the read brightness values to predetermined smoothing processing, calculates the brightness low-frequency component $L_1(p)$ at the pixel position p, and supplies this to the gain-value calculating unit 391 and contrast emphasizing unit 392.

In step S235, the gain-value calculating unit 391 performs gain-value calculation processing according to the same processing as the above-mentioned step S112 in FIG. 28. Note however, the gain-value calculating unit 391 obtains the gain value g(p) as to the pixel position p using the brightness value L(p) and brightness low-frequency component $L_1(p)$ instead of the brightness value $L_c^{(n1)}(p)$ and overall brightness value $L_{c1}^{(n1)}(p)$ in step S112. The gain-value calculating unit 391 supplies the calculated gain value g(p) to the contrast emphasizing unit 392.

In step S236, the contrast emphasizing unit 392 calculates a contrast-corrected brightness value in the same way as with the above-mentioned processing in step S113 in FIG. 28. Note however, the contrast emphasizing unit 392 calculates the contrast-corrected brightness value $L_u^{(n1)}(p)$ of the pixel position p according to the following Expression (27) using the brightness value L(p) and brightness low-frequency component $L_1(p)$ instead of the brightness value $L_c^{(n1)}(p)$ and overall brightness value $L_{c1}^{(n1)}(p)$ in step S113.

$$L_u^{(n1)}(p) = (g(p)+1) \cdot (L^{(n1)}(p) - L_1^{(n1)}(p)) + L_1^{(n1)}(p) \quad (25)$$
$$= g(p) \cdot (L^{(n1)}(p) - L_1^{(n1)}(p)) + L^{(n1)}(p)$$

Therefore, the image made up of the brightness value $L_u^{(n1)}(p)$ is an image wherein the contrast components which are the frequency components excluding the low-frequency component of the brightness image made up of the brightness value $L^{(n1)}(p)$ are emphasized. Accordingly, in the same way as with the above-mentioned processing in step S113 in FIG. 28, gray level inversion associated with contrast correction, and saturation of brightness values are suppressed from occurring.

The contrast emphasizing unit 392 supplies the calculated brightness value $L_u^{(n1)}(p)$ to the multiplying units 672 of the correction units 644R through 644B.

In step S237, the correction units 644R through 644B calculate contrast-corrected RGB values. Specifically, the dividing unit 671 of the correction unit 644R reads out the pixel value R(p) of the pixel position p of the selected image from the memory 622, obtains the division value by dividing the pixel value R(p) by the brightness value L(p), and supplies this to the multiplying unit 672. The multiplying unit 672 obtains a multiplication value by multiplying the division value calculated by the dividing unit 671 by the contrast-corrected brightness value $L_u(p)$, and stores the obtained multiplication value in the correction image memory 632 as the contrast-corrected pixel value $R_u(p)$. That is to say, as shown in the following Expression (28), the pixel value $R_u(p)$ is a value obtained by multiplying the pixel value R(p) by the ratio between the brightness value $L_u(p)$ after contrast correction and the brightness value L(p) before contrast correction.

$$R_u(p) = R(p) \cdot (L_u(p)/L(p)) \quad (28)$$

Similarly, the correction units 644G and 644B also obtain contrast-corrected brightness values $G_u(p)$ and $B_u(p)$ according to the following Expressions (29) and (30), and store the calculated brightness values $G_u(p)$ and $B_u(p)$ in the correction image memory 632, respectively.

$$G_u(p) = G(p) \cdot (L_u(p)/L(p)) \quad (29)$$

$$B_u(p) = B(p) \cdot (L_u(p)/L(p)) \quad (30)$$

In step S238, the smoothing unit 642 determines whether or not all the pixels within the frame have been processed. In a case wherein determination is made that all the pixels within the frame have not been processed yet, the processing returns to step S234, and the processing in steps S234 through S238 is repeatedly executed until determination is made in step S238 that all the pixels within the frame have been processed. That is to say, all the pixels of the selected image are subjected to contrast correction in order (e.g., in raster scan order) one pixel at a time.

On the other hand, in a case wherein determination is made in step S238 that all the pixels within the frame have been processed, the contrast correction processing ends.

Thus described above, the contrast of the image can be corrected almost without causing blackout and whiteout, and without causing gray level inversion.

Note that the sequences of the processing described above with reference to the flowcharts are examples thereof, the processing sequences may be exchanged, or the plurality of processing may be performed simultaneously in parallel in a range without departing from the essence of the present invention. For example, with the first embodiment of the present invention, an arrangement may be made wherein after the R, G, and B components are subjected to nonlinear transforming, the brightness values are calculated. Also, an arrangement may be made wherein before nonlinear transforming is performed, a reduction image is generated. Further, an arrangement may be made wherein after the base value and average level of the histogram of the brightness values are obtained from the histogram of the brightness values before nonlinear transforming, nonlinear transforming is performed.

Also, configurations for performing similar processing may be integrated or may be shared. For example, the mapping units 172-1 and 172-2, the mapping unit 201 of the nonlinear transforming unit 162, and the inverse mapping unit 451 of the nonlinear inverse transforming unit 182 can be realized with a common circuit.

Further, with the above description, the average value of the brightness values of the entire image has been taken as the average level of the brightness values necessary for generating a tone curve, but for example, the average value of the brightness values of a reduction image may be taken as the average level of the brightness values necessary for generating a tone curve. Thus, the calculation time of the average level is shortened. Also, for example, an arrangement may be made wherein an AE (Auto Exposure) control mechanism which is provided in a great number of camera control systems is employed to measure the whole or a part of brightness of an image using the AE control system, or to measure the brightness of a subject area where the AE control system determines as a principal subject, and the brightness value based on the measured brightness is taken as the average level. Further, an arrangement may be made wherein a desired area within an image is specified by a user, an average level with a particular emphasis on the specified area is calculated, whereby a tone curve more similar to the tone curve which the user desires can be generated.

Note that the present invention can be applied to a device for performing gray level compression of brightness or color values (pixel values) of an image, or contrast correction of an image (e.g., image playing device, image recording device, image display device, image output device, etc.), a computer program, and so forth other than the above-mentioned embodiments. For example, the present invention can be applied to a gray level compression technique for enabling an input image having a wide dynamic range to be output with suitable brightness and colors to a display or printer or the like having a narrower dynamic range than that of the input image.

The above-mentioned series of processing can be executed by hardware, and can also be executed by software. In a case of executing the series of processing by software, a program making up the software thereof is installed from a network or recording medium to a computer embedded in dedicated hardware, or a device capable of executing various types of functions by various types of programs being installed, such as a general-purpose personal computer for example.

Figure 44:
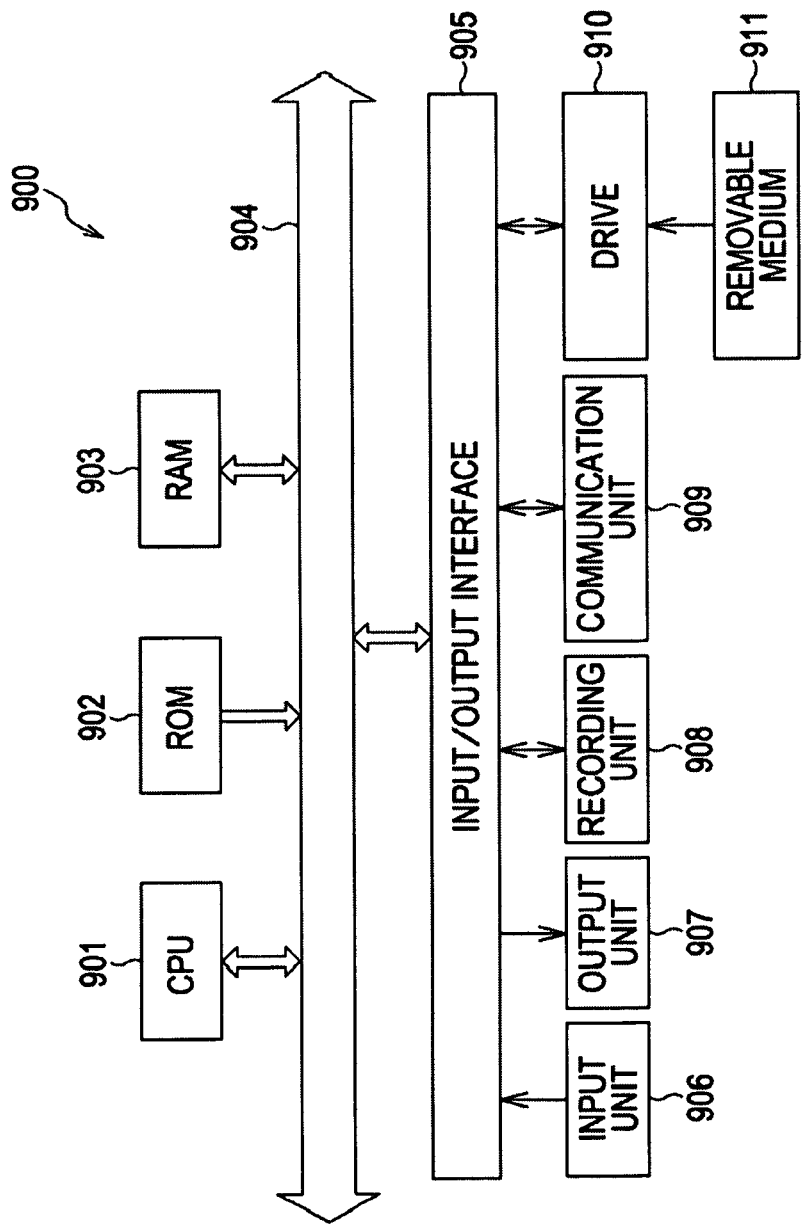
FIG. 44 is a block diagram illustrating a configuration example of a personal computer.

FIG. 44 is a diagram illustrating an internal configuration example of a general-purpose personal computer 900. A CPU (Central Processing Unit) 901 executes various types of processing in accordance with the program stored in ROM (Read Only Memory) 902, or the program loaded to RAM (Random Access Memory) 903 from a recording unit 908. Also, data or the like necessary for the CPU 901 executing various types of processing is also stored in the RAM 903 as appropriate.

The CPU 901, ROM 902, and RAM 903 are mutually connected through a bus 904. This bus 904 is also connected with an input/output interface 905.

The input/output interface 905 is connected with an input unit 906 configured of buttons, switches, a keyboard, a mouse, and so forth, an output unit 907 configured of a display such as a CRT (Cathode Ray Tube), LCD (Liquid Crystal Display), or the like, speakers, and so forth, a recording unit 908 configured of a hard disk unit or the like, and a communication unit 909 configured of a modem, a terminal adapter, and so forth. The communication unit 909 performs communication processing via a network including the Internet.

The input/output interface 905 is also connected with a drive 910 as necessary, in which a removable medium 911 configured of a magnetic disk, optical disc, magneto-optic disc, semiconductor memory, or the like is mounted as appropriate, and a computer program read out therefrom is installed in the recording unit 908.

As shown in FIG. 44A, the recording medium for recording the program, which is installed in the computer and placed in an executable state by the computer is not restricted to being configured of the removable medium 911 made up of a magnetic disk (including flexible disk), optical disc (including CD-ROM (Compact Disc-Read Only Memory) and DVD (Digital Versatile Disc)), magneto-optic disc (including MD (Mini-Disc) (registered trademark)), semiconductor memory, or the like, in which the program is recorded, which is distributed to provide the program to a user separately from the device main unit, and also may include the ROM 903 or a hard disc included in the recording unit 908 in which the program is recorded, which is provided to a user in a state of being built into the main unit of the device beforehand.

Note that the program executed by the computer may be a program wherein processing is performed in time-sequence in accordance with the sequence described in the present Specification, or a program wherein processing is performed in parallel or at a necessary timing such as upon call-up or the like.

Also, with the present Specification, the term "system" is assumed to mean the entirety of equipment configured of multiple devices, units, and so forth.

Further, the embodiments of the present invention are not restricted to the above-mentioned embodiments, and various modifications can be made without departing from the essence of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device configured to extract a contrast component for each pixel of an input image by removing a low-frequency component of said input image and to correct said contrast component for each pixel based on a gain value, comprising:
    input/output-property generating means configured to generate an input/output property curve, assuming an input contrast component which is said contrast component before correction as input, and an output contrast component which is said contrast component after correction as output, which is an input/output property curve of which said output contrast component monotonously increases as to said input contrast component;
    gain properties generating means configured to generate a gain property curve representing properties as to said input contrast component of said gain value for correcting said input contrast component to obtain said output contrast component based on said input/output property curve;
    gain-value calculating means configured to calculate said gain value for each pixel of said input image based on said gain property curve, a brightness value with gray level suppressed, and an overall brightness value;
    contrast emphasizing means configured to calculate a contrast-corrected brightness value for each pixel of said input image based on the gain value for each pixel of said input image, a brightness value of each pixel of said input image, and an overall brightness value of each pixel of an overall brightness image, the overall brightness image derived by extracting only low frequency components from the input image; and
    gray level correcting means configured to calculate a gray level corrected value for each pixel of said input image based on the brightness value of each pixel of said input image and the contrast-corrected brightness value of each pixel of said input image.

2. The image processing device according to claim 1, wherein said input/output property generating means generate said input/output property curve of which the inclination is the maximum and greater than one when the value of said input contrast component is around zero, becomes moderate as the absolute value of said input contrast component becomes great when the value of the input contrast component is within a predetermined correction range, and is generally one in a range where the absolute value of said output contrast component as to said input contrast component is equal to or greater than the absolute value of said input contrast component, and said input contrast value exceeds said correction range.

3. The image processing device according to claim 1, further comprising:
- obtaining means configured to obtain the maximum inclination which is the inclination of said input/output property curve when the value of said input contrast component is around zero and said correction range, which are specified by a user;
- wherein said input/output property generating means generate said input/output property curve based on said maximum inclination and said correction range specified by the user.

4. The image processing device according to claim 1, wherein said gain-value calculating means calculate said gain value regarding each pixel of said input image based on the difference value between the brightness value of the pixel thereof and an intermediate brightness value which is generally a central value of the range that the brightness value of said input image can take.

5. The image processing device according to claim 1, wherein said gain-value calculating means calculate said gain value regarding each pixel of said input image based on said contrast component of the pixel thereof.

6. The image processing device according to claim 1, wherein said gain-value calculating means calculate a first gain value regarding each pixel of said input image based on the difference value between the brightness value of the pixel thereof and an intermediate brightness value which is generally a central value of the range that the brightness value of said input image can take, calculate a second gain value based on said contrast component of the pixel thereof, and calculate an ultimate third gain value based on said first gain value and said second gain value.

7. An image processing method for an image processing device configured to extract a contrast component for each pixel of an input image by removing a low-frequency component of said input image and to correct said contrast component for each pixel based on a gain value, comprising the steps of:
- generating an input/output property curve, assuming that an input contrast component which is said contrast component before correction is taken as input, and an output contrast component which is said contrast component after correction is taken as output, which is an input/output property curve of which said output contrast component monotonously increases as to said input contrast component;
- generating a gain property curve representing properties as to said input contrast component of said gain value for correcting said input contrast component to obtain said output contrast component based on said input/output property curve;
- calculating said gain value for each pixel of said input image based on said gain property curve, a brightness value with gray level suppressed, and an overall brightness value;
- calculating a contrast-corrected brightness value for each pixel of said input image based on the gain value for each pixel of said input image, a brightness value of each pixel of said input image, and an overall brightness value of each pixel of an overall brightness image, the overall brightness image derived by extracting only low frequency components from the input image; and
- calculating a gray level corrected value for each pixel of said input image based on the brightness value of each pixel of said input image and the contrast-corrected brightness value of each pixel of said input image.

8. A non-transitory computer-readable medium comprising a program configured to execute processing for extracting a contrast component for each pixel of an input image by removing a low-frequency component of said input image and correcting said contrast component for each pixel based on a gain value, comprising the steps of:
- generating an input/output property curve, assuming that an input contrast component which is said contrast component before correction is taken as input, and an output contrast component which is said contrast component after correction is taken as output, which is an input/output property curve of which said output contrast component monotonously increases as to said input contrast component;
- generating a gain property curve representing properties as to said input contrast component of said gain value for correcting said input contrast component to obtain said output contrast component based on said input/output property curve;
- calculating said gain value for each pixel of said input image based on said gain property curve, a brightness value with gray level suppressed, and an overall brightness value;
- calculating a contrast-corrected brightness value for each pixel of said input image based on the gain value for each pixel of said input image, a brightness value of each pixel of said input image, and an overall brightness value of each pixel of an overall brightness image, the overall brightness image derived by extracting only low frequency components from the input image; and
- calculating a gray level corrected value for each pixel of said input image based on the brightness value of each pixel of said input image and the contrast-corrected brightness value of each pixel of said input image.

9. An image processing device configured to extract a contrast component for each pixel of an input image by removing a low-frequency component of said input image and to correct said contrast component for each pixel based on a gain value, comprising:
- an input/output-property generating unit configured to generate an input/output property curve, assuming an input contrast component which is said contrast component before correction as input, and an output contrast component which is said contrast component after correction as output, which is an input/output property curve of which said contrast component monotonously increases as to said input contrast component;
- a gain property generating unit configured to generate a gain property curve representing properties as to said input contrast component of said gain value for correcting said input contrast component to obtain said output contrast component based on said input/output property curve;
- a gain-value calculating unit configured to calculate said gain value for each pixel of said input image based on said gain property curve, a brightness value with gray level suppressed, and an overall brightness value;
- a contrast emphasizing unit configured to calculate a contrast-corrected brightness value for each pixel of said input image based on the gain value for each pixel of said input image, a brightness value of each pixel of said input image, and an overall brightness value of each pixel of an overall brightness image, the overall brightness image derived by extracting only low frequency components from the input image; and
- a gray level correcting unit configured to calculate a gray level corrected value for each pixel of said input image based on the brightness value of each pixel of said input image and the contrast-corrected brightness value of each pixel of said input image.

* * * * *